(12) United States Patent
Lacapra et al.

(10) Patent No.: US 8,041,735 B1
(45) Date of Patent: Oct. 18, 2011

(54) DISTRIBUTED FILE SYSTEM AND METHOD

(75) Inventors: Francesco Lacapra, Cupertino, CA (US); Fiorenzo Cattaneo, Santa Clara, CA (US); Simon L. Benham, Bracknell (GB); Trevor E. Willis, Aylesbury (GB); Christopher J. Aston, High Wycombe (GB)

(73) Assignee: BlueArc UK Limited, Bracknell, Berkshire (GB)

( * ) Notice: Subject to any disclaimer, the term of this patent is extended or adjusted under 35 U.S.C. 154(b) by 1883 days.

(21) Appl. No.: 10/286,153

(22) Filed: Nov. 1, 2002

(51) Int. Cl.
*G06F 17/30* (2006.01)
(52) U.S. Cl. ........................ 707/783; 707/947
(58) Field of Classification Search .................. 707/783
See application file for complete search history.

(56) References Cited

U.S. PATENT DOCUMENTS

| | | | | |
|---|---|---|---|---|
| 3,588,831 A | 6/1971 | Figueroa et al. | ........... | 340/172.5 |
| 3,699,532 A | 10/1972 | Schaffer et al. | ................ | 710/48 |
| 3,702,462 A | 11/1972 | England | ...................... | 340/172.5 |
| 4,074,072 A | 2/1978 | Christensen | .............. | 179/15 AQ |
| 4,075,691 A | 2/1978 | Davis et al. | .................... | 364/200 |
| 4,079,452 A | 3/1978 | Larson et al. | ................. | 364/200 |
| 4,080,649 A | 3/1978 | Calle et al. | .................... | 364/200 |
| 4,096,567 A | 6/1978 | Millard et al. | ................. | 364/200 |
| 4,101,960 A | 7/1978 | Stokes | .......................... | 364/200 |
| 4,123,795 A | 10/1978 | Dean, Jr. | ........................ | 364/200 |
| 4,130,866 A | 12/1978 | Ono | ................................ | 364/200 |
| 4,156,906 A | 5/1979 | Ryan | .............................. | 364/200 |
| 4,156,907 A | 5/1979 | Rawlings et al. | ............. | 364/200 |
| 4,228,496 A | 10/1980 | Katzman | ....................... | 364/200 |
| 4,240,143 A | 12/1980 | Besemer et al. | .............. | 710/104 |
| 4,253,144 A | 2/1981 | Bellamy et al. | ............... | 364/200 |
| 4,323,967 A | 4/1982 | Peters et al. | ................... | 710/107 |
| 4,326,248 A | 4/1982 | Hinai et al. | .................... | 364/200 |
| 4,333,144 A | 6/1982 | Whiteside et al. | ............. | 364/200 |
| 4,377,843 A | 3/1983 | Garringer et al. | ............. | 364/200 |
| 4,385,206 A | 5/1983 | Bradshaw | ................. | 179/18 ES |
| 4,394,727 A | 7/1983 | Hoffman | ....................... | 364/200 |
| 4,396,983 A | 8/1983 | Segarra et al. | ................ | 364/200 |

(Continued)

FOREIGN PATENT DOCUMENTS

EP 0321723 A2 11/1988

(Continued)

OTHER PUBLICATIONS

Chang et al., "Haploinsufficient Bmp4 ocular phenotypes include anterior segment dysgenesis with elevated intraocular pressure", BioMed Central, BMC Genetics, 2:18 (2001).

(Continued)

*Primary Examiner* — Charles Rones
*Assistant Examiner* — Mellissa M Chojnacki
(74) *Attorney, Agent, or Firm* — Sunstein Kann Murphy & Timbers LLP

(57) ABSTRACT

A distributed file system and method distributes file system objects across multiple self-contained volumes, where each volume is owned by a unique file system node. Logical links are used to reference a file system object between volumes. Each file system node includes a relocation directory in which is maintained hard links to locally-stored file system objects that are referenced from another file system node using logical links. Various file system operations that involve multiple volumes are performed without having to place a write lock on more than one volume at a time. Various caching schemes allow the various file system nodes to cache file system object data and metadata.

53 Claims, 14 Drawing Sheets

U.S. PATENT DOCUMENTS

| | | | |
|---|---|---|---|
| 4,399,503 A | 8/1983 | Hawley | 364/200 |
| 4,412,285 A | 10/1983 | Neches et al. | 364/200 |
| 4,414,624 A | 11/1983 | Summer et al. | 364/200 |
| 4,442,487 A | 4/1984 | Fletcher | 364/200 |
| 4,445,174 A | 4/1984 | Fletcher | 364/200 |
| 4,448,419 A | 5/1984 | Telnaes | 273/143 R |
| 4,456,957 A | 6/1984 | Schieltz et al. | 364/200 |
| 4,459,664 A | 7/1984 | Pottier et al. | 364/200 |
| 4,488,231 A | 12/1984 | Yu et al. | 364/200 |
| 4,494,188 A | 1/1985 | Nakane et al. | 364/200 |
| 4,500,960 A | 2/1985 | Babecki et al. | 364/200 |
| 4,507,728 A | 3/1985 | Sakamoto | 364/200 |
| 4,527,232 A | 7/1985 | Bechtolsheim | 364/200 |
| 4,536,874 A | 8/1985 | Stoffel et al. | 370/85 |
| 4,550,368 A | 10/1985 | Bechtolsheim | 364/200 |
| 4,558,413 A | 12/1985 | Schmidt et al. | 364/300 |
| 4,590,556 A | 5/1986 | Berger | 364/200 |
| 4,608,631 A | 8/1986 | Stiffler et al. | 364/200 |
| 4,614,841 A | 9/1986 | Babecki et al. | 179/18 ES |
| 4,626,634 A | 12/1986 | Brahm et al. | 379/28 |
| 4,628,508 A | 12/1986 | Sager et al. | 371/9 |
| 4,633,245 A | 12/1986 | Blount et al. | 340/825.03 |
| 4,638,427 A | 1/1987 | Martin | 364/200 |
| 4,649,473 A | 3/1987 | Hammer et al. | 364/200 |
| 4,654,654 A | 3/1987 | Butler et al. | 340/825.2 |
| 4,685,125 A | 8/1987 | Zave | 379/96 |
| 4,694,396 A | 9/1987 | Weisshaar et al. | 719/313 |
| 4,709,325 A | 11/1987 | Yajima | 364/200 |
| 4,710,868 A | 12/1987 | Cocke et al. | 364/200 |
| 4,714,995 A | 12/1987 | Materna et al. | 364/200 |
| 4,719,569 A | 1/1988 | Ludemann et al. | 364/200 |
| 4,727,538 A | 2/1988 | Furchtgott et al. | 370/85 |
| 4,754,395 A | 6/1988 | Weisshaar | 364/200 |
| 4,766,534 A | 8/1988 | DeBenedictis | 364/200 |
| 4,769,772 A | 9/1988 | Dwyer | 364/300 |
| 4,780,821 A | 10/1988 | Crossley | 364/200 |
| 4,783,705 A | 11/1988 | Moon et al. | 360/77 |
| 4,783,730 A | 11/1988 | Fischer | 364/200 |
| 4,797,854 A | 1/1989 | Nakazaki et al. | 364/900 |
| 4,803,621 A | 2/1989 | Kelly | 364/200 |
| 4,809,169 A | 2/1989 | Sfarti et al. | 364/200 |
| 4,816,989 A | 3/1989 | Finn | 364/200 |
| 4,819,159 A | 4/1989 | Shipley et al. | 364/200 |
| 4,825,354 A | 4/1989 | Agrawal et al. | 364/200 |
| 4,845,609 A | 7/1989 | Lighthart et al. | 364/200 |
| 4,872,157 A | 10/1989 | Hemmady et al. | 370/60 |
| 4,872,159 A | 10/1989 | Hemmady et al. | 370/60 |
| 4,875,206 A | 10/1989 | Nichols et al. | 370/85.15 |
| 4,887,204 A | 12/1989 | Johnson et al. | 364/200 |
| 4,894,825 A | 1/1990 | Kobayashi et al. | 370/124 |
| 4,897,781 A | 1/1990 | Chang et al. | 364/200 |
| 4,899,333 A | 2/1990 | Roediger | 370/60 |
| 4,903,258 A | 2/1990 | Kuhlmann et al. | 370/58.2 |
| 4,914,583 A | 4/1990 | Weisshaar et al. | 364/200 |
| 4,922,486 A | 5/1990 | Lidinky et al. | 370/60 |
| 4,945,470 A | 7/1990 | Takahashi | 364/200 |
| 4,991,133 A | 2/1991 | Davis et al. | 364/900 |
| 4,993,017 A | 2/1991 | Bachinger et al. | 370/58.2 |
| 5,001,628 A | 3/1991 | Johnson et al. | 364/200 |
| 5,008,814 A | 4/1991 | Mathur | 709/221 |
| 5,012,405 A | 4/1991 | Nishikado et al. | 707/8 |
| 5,036,459 A | 7/1991 | Den Haan et al. | 364/200 |
| 5,050,070 A | 9/1991 | Chastain et al. | 364/200 |
| 5,058,110 A | 10/1991 | Beach et al. | 370/464 |
| 5,067,071 A | 11/1991 | Schanin et al. | 395/275 |
| 5,073,852 A | 12/1991 | Siegel et al. | 395/700 |
| 5,109,487 A | 4/1992 | Ohgomori et al. | 395/200 |
| 5,109,515 A | 4/1992 | Laggis et al. | 395/725 |
| 5,113,496 A | 5/1992 | McCalley et al. | 710/305 |
| 5,113,500 A | 5/1992 | Talbott et al. | 710/305 |
| 5,113,522 A | 5/1992 | Dinwiddie, Jr. et al. | 713/375 |
| 5,113,523 A | 5/1992 | Colley et al. | 712/12 |
| 5,118,975 A | 6/1992 | Hillis et al. | 307/602 |
| 5,129,093 A | 7/1992 | Muramatsu et al. | 395/800 |
| 5,133,053 A | 7/1992 | Johnson et al. | 395/200 |
| 5,155,809 A | 10/1992 | Baker et al. | 395/200 |
| 5,163,131 A | 11/1992 | Row et al. | 395/200 |
| 5,175,825 A | 12/1992 | Starr | 395/325 |
| 5,179,702 A | 1/1993 | Spix et al. | 395/650 |
| 5,185,857 A | 2/1993 | Rozmanith et al. | 395/148 |
| 5,201,040 A | 4/1993 | Wada et al. | 395/400 |
| 5,210,824 A | 5/1993 | Putz et al. | 395/145 |
| 5,214,776 A | 5/1993 | Bagnoli et al. | 395/425 |
| 5,218,697 A | 6/1993 | Chung | 395/650 |
| 5,230,065 A | 7/1993 | Curley et al. | 395/200 |
| 5,243,699 A | 9/1993 | Nickolls et al. | 395/275 |
| 5,255,369 A | 10/1993 | Dann | 395/200 |
| 5,262,965 A | 11/1993 | Putnam et al. | 395/101 |
| 5,276,860 A | 1/1994 | Fortier et al. | 395/575 |
| 5,283,868 A | 2/1994 | Baker et al. | 395/200 |
| 5,355,453 A | 10/1994 | Row et al. | 395/200 |
| 5,359,713 A | 10/1994 | Moran et al. | 395/200 |
| 5,367,698 A | 11/1994 | Webber et al. | 395/800 |
| 5,371,885 A | 12/1994 | Letwin | 395/600 |
| 5,388,231 A | 2/1995 | Starr | 395/325 |
| 5,452,448 A | 9/1995 | Sakuraba et al. | 395/600 |
| 5,457,796 A | 10/1995 | Thompson | 395/600 |
| 5,485,579 A | 1/1996 | Hitz et al. | 395/200.12 |
| 5,506,988 A | 4/1996 | Weber et al. | 395/650 |
| 5,513,314 A | 4/1996 | Kandasamy et al. | 395/182.04 |
| 5,519,853 A | 5/1996 | Moran et al. | 395/550 |
| 5,557,798 A | 9/1996 | Skeen et al. | 395/650 |
| 5,561,807 A | 10/1996 | Verplanken et al. | 395/800 |
| 5,613,058 A | 3/1997 | Koppolu et al. | 395/376 |
| 5,613,105 A | 3/1997 | Zbikowski et al. | 395/611 |
| 5,613,124 A | 3/1997 | Atkinson et al. | 395/133 |
| 5,625,815 A | 4/1997 | Maier et al. | 395/608 |
| 5,628,005 A | 5/1997 | Hurvig | 395/608 |
| 5,634,050 A | 5/1997 | Krueger et al. | 395/616 |
| 5,673,394 A | 9/1997 | Fenwick et al. | 395/200.08 |
| 5,675,782 A | 10/1997 | Montague et al. | 395/609 |
| 5,699,518 A | 12/1997 | Held et al. | 395/200.11 |
| 5,701,462 A | 12/1997 | Whitney et al. | 395/610 |
| 5,701,491 A | 12/1997 | Dunn et al. | 395/712 |
| 5,701,516 A | 12/1997 | Cheng et al. | 395/842 |
| 5,742,818 A | 4/1998 | Shoroff et al. | 395/616 |
| 5,745,752 A | 4/1998 | Hurvig et al. | 395/616 |
| 5,754,771 A | 5/1998 | Epperson et al. | 395/200.33 |
| 5,761,669 A | 6/1998 | Montague et al. | 707/103 |
| 5,764,922 A | 6/1998 | Peacock et al. | 710/6 |
| 5,794,230 A | 8/1998 | Horadan et al. | 707/2 |
| 5,802,288 A | 9/1998 | Ekanadham et al. | 395/200.8 |
| 5,802,366 A | 9/1998 | Row et al. | 395/683 |
| 5,819,292 A | 10/1998 | Hitz et al. | 707/203 |
| 5,819,306 A | 10/1998 | Goldman et al. | 711/100 |
| 5,832,205 A | 11/1998 | Kelly et al. | 395/185.06 |
| 5,832,527 A * | 11/1998 | Kawaguchi | 1/1 |
| 5,835,953 A | 11/1998 | Ohran | 711/162 |
| 5,845,280 A | 12/1998 | Treadwell, III et al. | 707/8 |
| 5,867,657 A | 2/1999 | Bolosky et al. | 395/200.49 |
| 5,875,297 A | 2/1999 | Yugawa et al. | 395/200.32 |
| 5,889,952 A | 3/1999 | Hunnicutt et al. | 395/200.49 |
| 5,892,917 A | 4/1999 | Myerson | 395/200.54 |
| 5,898,868 A | 4/1999 | Krueger et al. | 395/621 |
| 5,905,855 A | 5/1999 | Klaiber et al. | 395/183.07 |
| 5,907,703 A | 5/1999 | Kronenberg et al. | 395/681 |
| 5,923,846 A | 7/1999 | Gage et al. | 395/200.43 |
| 5,926,832 A | 7/1999 | Wing et al. | 711/141 |
| 5,929,655 A | 7/1999 | Roe et al. | 326/82 |
| 5,930,831 A | 7/1999 | Marsh et al. | 711/173 |
| 5,931,918 A | 8/1999 | Row et al. | 709/300 |
| 5,931,920 A | 8/1999 | Ghaffari et al. | 710/5 |
| 5,941,969 A | 8/1999 | Ram et al. | 710/128 |
| 5,948,110 A | 9/1999 | Hitz et al. | 714/6 |
| 5,950,225 A | 9/1999 | Kleiman | 711/111 |
| 5,958,061 A | 9/1999 | Kelly et al. | 714/1 |
| 5,960,180 A | 9/1999 | Gates | 395/309 |
| 5,963,962 A | 10/1999 | Hitz et al. | 707/202 |
| 5,978,863 A | 11/1999 | Gates et al. | 710/18 |
| 6,006,228 A | 12/1999 | McCollum et al. | 707/9 |
| 6,012,107 A | 1/2000 | Young | 710/39 |
| 6,018,744 A | 1/2000 | Mamiya et al. | 707/104 |
| 6,034,963 A | 3/2000 | Minami et al. | 370/401 |
| 6,038,570 A | 3/2000 | Hitz et al. | 707/204 |
| 6,047,332 A * | 4/2000 | Viswanathan et al. | 709/245 |
| 6,065,037 A | 5/2000 | Hitz et al. | 709/200 |
| 6,070,200 A | 5/2000 | Gates et al. | 710/20 |

| | | | |
|---|---|---|---|
| 6,081,883 A | 6/2000 | Popelka et al. | 712/28 |
| 6,085,278 A | 7/2000 | Gates et al. | 710/263 |
| 6,088,740 A | 7/2000 | Ghaffari et al. | 710/5 |
| 6,105,075 A | 8/2000 | Ghaffari | 710/5 |
| 6,119,244 A | 9/2000 | Schoenthal et al. | 714/4 |
| 6,122,674 A | 9/2000 | Olnowich | 709/250 |
| 6,192,375 B1 | 2/2001 | Gross | 707/200 |
| 6,192,408 B1 | 2/2001 | Vahalia et al. | 709/229 |
| 6,226,680 B1 | 5/2001 | Boucher et al. | 709/230 |
| 6,230,200 B1 | 5/2001 | Forecast | 709/226 |
| 6,247,060 B1 | 6/2001 | Boucher et al. | 709/238 |
| 6,256,642 B1 | 7/2001 | Krueger et al. | 707/205 |
| 6,263,445 B1 | 7/2001 | Blumenau | 713/201 |
| 6,269,252 B1 | 7/2001 | Hutchings et al. | 455/552 |
| 6,275,867 B1 | 8/2001 | Bendert et al. | 709/316 |
| 6,317,844 B1 | 11/2001 | Kleiman | 714/6 |
| 6,334,153 B2 | 12/2001 | Boucher et al. | 709/230 |
| 6,351,725 B1 | 2/2002 | Willis et al. | 703/25 |
| 6,389,479 B1 | 5/2002 | Boucher et al. | 709/243 |
| 6,393,487 B2 | 5/2002 | Boucher et al. | 709/238 |
| 6,425,034 B1 | 7/2002 | Steinmetz et al. | 710/129 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,442,617 B1 | 8/2002 | Lowe et al. | 709/250 |
| 6,446,141 B1 | 9/2002 | Nolan et al. | 710/8 |
| 6,457,130 B2 | 9/2002 | Hitz et al. | 713/201 |
| 6,466,978 B1 | 10/2002 | Mukherjee et al. | 709/225 |
| 6,470,415 B1 | 10/2002 | Starr et al. | 711/104 |
| 6,484,177 B1 | 11/2002 | Van Huben et al. | 707/10 |
| 6,487,644 B1 | 11/2002 | Huebsch et al. | 711/162 |
| 6,564,252 B1 | 5/2003 | Hickman et al. | 709/214 |
| 6,591,302 B2 | 7/2003 | Boucher et al. | 709/230 |
| 6,604,118 B2 | 8/2003 | Kleiman et al. | 707/203 |
| 6,640,233 B1 | 10/2003 | Lewis et al. | 707/205 |
| 6,665,689 B2 | 12/2003 | Muhlestein | 707/204 |
| 6,668,264 B1 | 12/2003 | Patterson et al. | 707/205 |
| 6,721,764 B2 | 4/2004 | Hitz et al. | 707/202 |
| 6,728,735 B1 | 4/2004 | Fong | 707/200 |
| 6,745,286 B2 | 6/2004 | Staub et al. | 711/114 |
| 6,748,380 B2 | 6/2004 | Poole et al. | 707/9 |
| 6,748,510 B1 | 6/2004 | Coatney | 711/170 |
| 6,751,635 B1 | 6/2004 | Chen et al. | 707/200 |
| 6,754,773 B2 | 6/2004 | Ulrich et al. | 711/118 |
| 6,775,792 B2 | 8/2004 | Ulrich et al. | 714/6 |
| 6,785,822 B1 | 8/2004 | Sadhwani-Tully | 713/201 |
| 6,799,284 B1 | 9/2004 | Patel et al. | 714/6 |
| 6,826,615 B2 | 11/2004 | Barrall et al. | 709/227 |
| 6,829,720 B2 | 12/2004 | Schoenthal et al. | 714/4 |
| 6,871,224 B1 | 3/2005 | Chu et al. | 709/224 |
| 6,894,976 B1 | 5/2005 | Banga et al. | 370/235 |
| 6,895,429 B2 | 5/2005 | Banga et al. | 709/215 |
| 6,901,509 B1 | 5/2005 | Kocher | 713/158 |
| 6,910,154 B1 | 6/2005 | Schoenthal | 714/18 |
| 6,920,579 B1 | 7/2005 | Cramer et al. | 714/4 |
| 6,920,580 B1 | 7/2005 | Cramer et al. | 714/4 |
| 6,928,478 B1 | 8/2005 | Gangadharan | 709/226 |
| 6,944,785 B2 | 9/2005 | Gadir et al. | 714/4 |
| 6,961,749 B1 | 11/2005 | Kleiman | 709/203 |
| 6,983,296 B1 | 1/2006 | Muhlestein et al. | 707/206 |
| 7,003,780 B2 | 2/2006 | Peloquin et al. | 719/321 |
| 7,007,046 B2 | 2/2006 | Manley et al. | 707/204 |
| 7,017,084 B2 | 3/2006 | Ng et al. | 714/45 |
| 7,039,827 B2 | 5/2006 | Meyer et al. | 714/4 |
| 7,039,828 B1 | 5/2006 | Scott | 714/4 |
| 7,080,223 B2 | 7/2006 | Dewey | 711/162 |
| 7,373,366 B1 | 5/2008 | Chatterjee et al. | 707/204 |
| 2001/0039550 A1 | 11/2001 | Putzolu | 707/205 |
| 2002/0049718 A1 | 4/2002 | Kleiman et al. | 707/1 |
| 2002/0062387 A1 | 5/2002 | Yetziv | 709/236 |
| 2002/0078066 A1* | 6/2002 | Robinson et al. | 707/104.1 |

FOREIGN PATENT DOCUMENTS

| | | |
|---|---|---|
| EP | 0 321 723 EU | 6/1989 |
| EP | 0 367 182 | 5/1990 |
| EP | 0482851 | 4/1992 |
| EP | 0 367 183 B1 | 3/1996 |
| EP | 0 725 351 A2 | 8/1996 |
| EP | 0388050 B1 | 6/1997 |
| EP | 0490973 B1 | 2/1998 |
| EP | 0837402 A2 | 4/1998 |
| EP | 0837402 A3 | 4/1998 |
| EP | 0 853 413 A2 | 7/1998 |
| EP | 0278315 | 8/1998 |
| EP | 0889422 | 1/1999 |
| EP | 0490980 B1 | 6/1999 |
| EP | 0994425 | 4/2000 |
| IL | 88165 | 10/1988 |
| JP | 62-192850 | 8/1987 |
| JP | 63-200244 | 8/1988 |
| JP | 2945757 | 6/1999 |
| WO | WO 84/03376 | 8/1984 |
| WO | WO 86/03607 | 6/1986 |
| WO | WO 89/03086 | 4/1989 |
| WO | WO 9103788 | 3/1991 |
| WO | WO 9104540 | 4/1991 |
| WO | WO 91/11768 | 8/1991 |
| WO | WO 92/01990 | 2/1992 |
| WO | WO 98/19412 | 5/1998 |
| WO | WO 98/38576 | 9/1998 |
| WO | WO 98/50852 | 11/1998 |
| WO | WO 99/30254 | 6/1999 |
| WO | WO 99/42934 | 8/1999 |
| WO | WO 99/45456 | 9/1999 |
| WO | WO 99/46680 | 9/1999 |
| WO | WO 99/59064 | 11/1999 |
| WO | WO 99/65219 | 12/1999 |
| WO | WO 99/66401 | 12/1999 |
| WO | WO 00/07104 | 2/2000 |
| WO | WO 00/11553 | 3/2000 |
| WO | WO 00/61774 A | 10/2000 |
| WO | WO 00/68247 A | 11/2000 |
| WO | WO 00/77021 A | 12/2000 |
| WO | WO 01/28179 A2 | 4/2001 |
| WO | WO 02/27462 | 4/2002 |
| WO | WO 02/069159 | 9/2002 |
| WO | WO 02/77006 A | 10/2002 |
| WO | WO 2004/042583 | 5/2004 |
| WO | WO 2004/042618 | 5/2004 |

OTHER PUBLICATIONS

Wordinger RJ, et al., "Expression of bone morphogenetic proteins (BMP), BMP receptors, and BMP associated proteins in human trabecular meshwork and optic nerve head cells and tissues", Molecular Vision 8:241-50 (2002).

Advanced Peer-to-Peer Networking (APPN) and High Performance Routing (HPR), the Internet; International Business Machines Website, www-3.ibm.com/software/network/technology/appnhpr/; accessed Aug. 8, 2003.

Advanced Program-to-Program Communication (APPC), the Internet, International Business Machines website, www-3.ibm.com/software/network/ technology/appnhpr/appc.html.; accessed Aug. 8, 2003.

ARPENET Information Brochure, the Internet, www.undergroundnews.com/files/texts/under-ground/hacking/arpa.htm, Dec. 1985.

Auslander et al., *The Evolution of the MVS Operating System*; IBM J. Res. Develop.; vol. 25, No. 5, pp. 471-482; Sep. 1981.

Bashe et al., *The Architecture of IBM's Early Computers*; IBM J. Res. Develop., vol. 25, No. 5, pp. 363-375; Sep. 1981.

Chambers et al., *Distributed Computing*; Chapter 9, Sections 9.4.2-9.5.1, p. 144; Chapter 10, Sections 10.3.2-10.3.4, pp. 153-154; Chapter 11, p. 172 and 176-177; Chapter 13, Sections 13.1-13.4, pp. 193-199; Chapter 17, Section 17.1-17.4, pp. 239-250; Chapter 20, Sections 20.1-20.5, pp. 277-288; Academic Press, 1984.

Chesson, G., *Protocol Engine Design*; Proc. 10th Summer 1987 USENIX Conference, pp. 209-215, Phoenix, AZ, Jun. 1987.

Chow et al., *Distributed Control of Computer Systems*, IEEE Transactions on Computers, Vo. C-35, No. 6, pp. 564-567, Jun. 1986.

*Common Program Interface for Communications*(CPI-C), the Internet; International Business Machines Website, www-3.ibm.com/software/net-work/technology/appnhpr/cpic.html; accessed Aug. 8, 2003.

Cooper et al., *Protocol Implementation on the Nectar Communication Processor*, {SIGCOMM} Symposium on Communications Architectures and Protocols, Philadelphia, PA, pp. 135-144, 1990.

Crocker, S., *Initiating the ARPANET*, Matrix News, 10(3), Mar. 2000.

Dittia et al., *The APIC Approach to High Performance Network Interface Design: Protected DMA and Other Techniques*, Washington University Technical Report WUCS-96-12, 1996.

Drapeau et al., RAID-II: A High-Bandwidth Network File Server, "Proceedings of the 21st Annual International Symposium on Computer Architecture", pp. 234-244, 1994.

Druschel et al. *Experiences with a High-Speed Network Adaptor: A Software Perspective*, "SIGCOMM", pp. 2-13, 1994.

Druschel et al., *Network Subsystem Design: A Case for an Integrated Path*, IEEE Network, vol. 7, No. 4, IEEE, pp. 8-17, 1993.

Farley, Marc, *Building Storage Networks*, Chapter 14 Accessing Data on S/390 MVS Mainframes from a SAN, Osborne/McGraw-Hill, 2000.

Hall et al., A Comparative Study of High Speed Networks, www.ieee-infocom.org/1998/papers/06c_3.pdf, 1998.

Hariri, S., ECE 677X: High Performance Distributed Computing Systems, University of Arizona, www.ece.arizona.edu/~hpdc,1999.

*HDLC LAPB & NRM Level 2 Protocols*, IBM HDLC Protocol Tutorial, the Internet, www.jbmelectronics.com/product/hdlc.htm,accessed Aug. 7, 2003.

*Introduction to APPC*, Yale University, the Internet, www.yale.edu/pcIt/COMM/APPC.HTM, Feb. 8, 1995.

*Introduction to SNA*, Yale University, the Internet, www.yale.edu/pcIt/COMM/SNA.HTM, Feb. 2, 1995.

Jarema et al., *IBM Data Communications: A Quarter Century of Evolution and Progress*, IBM J. Res. Develop., vol. 25, No. 5, Sep. 1981.

Kanakia et al., *The VMP Network Adapter Board (NAB): High-Performance Network Communication for Multiprocessors*, Proc. ACM SIGCOMM 88, Aug. 1988.

Kshemkalyani et al., *Scalability of Advanced Peer-to-Peer Networking (APPN) Networks*, the Internet, International Business Machines website, www-3.ibm.com/soft-ware/network/technology/appnhpr/appn_acalability.html, Mar. 21, 1997.

*MicroMAP 1-7*, MicroMAP Manufacturing Automation Protocol Software, Motorola Microsystems Products Technical Data, Motorola, Inc. 1986.

Mukherjee et al., *Making Network Interfaces Less Peripheral*, IEEE Computer, vol. 31, No. 10, pp. 70-76, 1998.

Mullender et al., *Amoeba A Distributed Operating System for the 1990s*, Computer, IEEE, pp. 44-51, Jan. 1990.

Mullender et al., *The Design of a Capability-Based Distributed Operating System*, The Computer Journal, vol. 29, No. 4, 1986.

Mullender et al., *A Distributed File Service Based on Optimistic Concurrency Control*, Proceedings of the 10th ACM SIGOPS Conference, pp. 51-62, Association for Computing Machinery, Inc., 1985.

Mullender et al., *Protection and Resource Control in Distributed Operating Systems*, Computer Networks, vol. 8, pp. 421-432, Oct. 1984.

O'Connell et al., *JFS: A Secure Distributed File System for Network Computers*, the Internet, citeseer.nj.nec.com/392625.html, 1999 and Trinity College Dublin Technical Reports, www.cs.tcd.ie/publications/tech-reports/.

Osadzinski, A., *The Network File System, Computer Standards & Interfaces*, 8, No. 1, pp. 45-48, 1988/1989.

Padegs, A., *System/360 and Beyond*, IBM J. Res. Develop., vol. 25, No. 5, Sep. 1981.

Perkins, A., *Larry Boucher Hangs Ten*, Red Herring, the Internet, www.redherring.com/mag/issue03/_ten.html, Aug. 1993.

Peters, M., What is High Performance Routing?(HPR), the Internet, International Business Machines website, www.3.ibm.com/soft-ware/network/tech-nology/appnhpr/hpr_wp.html, accessed Aug. 8, 2003.

Poor, V., *The Concept of Attached Processing and Attached Resource Computer Systems*, Symposium on Small Systems, Proceedings of the First SIGMINI Symposium on Small Systems, Chairman Paul A.V. Thomas, pp. 109-116, 1978.

Psounis, K., *Active Networks: Applications, Security, Safety, and Architectures*, IEEE Communications Surveys, First Quarter 1999, pp. 1-6, 1999.

Satyanarayanan, M., A Survey of Distributed File Systems, Dept. of Computer Science, Carnegie Mellon University, the Internet, citeseer.ist.psu.edu/ satyanarayanan89survey.html 1989.

*SDLC (HDLC Normal Response Mode)*, JBM SDLC Protocol Tutorial, the Internet, www.jbmelectronics.com/product/sdls.htm, accessed Aug. 7, 2003.

Stankovic, J., *A Perspective on Distributed Computer Systems*, IEEE Transactions on Computers, vol. c-33, No. 12, Dec. 1984.

Sullivan, T., *Communications Network Management Enhancements for SNA Networks: An Overview*, IBM Systems Journal, vol. 22, Nos. 1 2, 1983.

Svobodava, L., *File Servers for Network-Based Distributed Systems*, Computing Surveys, vol. 16, No. 4, pp. 353-398, Dec. 1984.

Tanenbaum, A., *Computer Networks*, Chapter 1, Section 1.7.2 pp. 35-36, Chapter 9, pp. 528-607, Second Edition, Prentice Hall, 1988.

Traw et al., *Hardware/Software Organization of a High Performance ATM Host Interface*, IEEE Journal on Selected Areas in Communications (Special Issue on High Speed Computer/Network Interfaces), vol. 11, No. 2, pp. 240-253, 1993.

Van Renesse et al., *The Design of a High-Performance File Server*, IEEE Transactions on Knowledge and Data Engineering, vol. 1, No. 2, pp. 22-27, Jun. 1989.

Cheriton, An Experiment using Registers for Fast Message-Based Interprocessor Communication, p. 12-20.

Gage, *Real World Implementation of Upper Level Protocols*, Mini/Micro West, Session 3/1, p. 1-5, Nov. 8-11, 1983.

Lien, *Experience in Implementing XNS Protocols*, Mini/Micro West, Session 3/2, p. 1-7, Nov. 8-11, 1983.

Ennis, *Upper Level Protocols for Broadband Local Networks*, Mini/Micro West, Session 3/3, p. 1-5, Nov. 8-11, 1983.

Ennis, *Netbios: IBM's PC interface for distributed applications*, Systems & Software, Dec. 1984.

Cheriton, *Local Networking and Internetworking in the V-System*, ACM, 1983.

Cheriton, *The V Distributed System*, Communications of the ACM, vol. 31, No. 3, Mar. 1988, pp. 314-333.

Hitz et al., *Using Unix as One Component of a Lightweight Distributed Kernel for Multiprocessor File Servers*, USENIX, Jan. 22-26, 1990.

Pawlowski et al., *Network Computing in the UNIX and IBM Mainframe Environment*, UniForum 1989, p. 287-302.

Powers, *A Front-End TELNET/Rlogin Server Implementation*, UniForum 1986 Conference Proceedings, p. 27-40.

Thacker et al., *Firefly: A Multiprocessor Workstation*, Digital Systems Research Center, Dec. 30, 1987.

Van de Goor et al., *UNIX I/O in a Multiprocessor System*, USENIX Winter Conference Feb. 9-12, 1988, 17 pages.

Solomon et al., *Hardware Support for Interprocess Communication*, Association for Computing Machinery, Doc. No. ACM 0084-7495/87/0600-0178$00.75, 1987, 11 pages.

Ramakrishnan et al., *A Model of File Server Performance for a Heterogeneous Distributed System*, Association for Computing Machinery, Doc. No. ACM 0-89791-201-2/86/0800-0338, 1986, 10 pages.

Swinehart et al., *WFS: A Simple Shared File System for a Distributed Environment*, Association for Computing Machinery, Doc. No. ACM 0-89791-009-5/79/1200/0009, 1979, 9 pages.

Tanenbaum et al., *AMOEBA System*, Communications of the ACM, vol. 33, No. 12, Dec. 1990, 46-63, 18 pages.

Schwartz et al., *LFS—A Local File System for Multiprocessor NFS Network Servers*, Auspex Systems Inc., Technical Report 4, Dec. 1989, Internet http://www.concentric.net/~Ams/auspex/Tech4/Tech4.toc.html, Accessed Aug. 11, 2003, 16 pages.

Sunshine et al., *Broad-Band Personal Computer LAN's*, IEEE Journal on Selected Areas in Communications, vol. SAC-3, No. 3, May 1985, Doc. No. 0733-8716/85/0500-0408, 8 pages.

Barrera, *A Fast Mach Network IPC Implementation*, USENIX Association Mach Symposium, 11 pages.

Dally et al., *Architecture of a Message-Driven Processor*, Association for Computing Machinery, Doc. No. ACM 0084-7495/87/0600-0189, 1987, 8 pages.

Giloi, *SUPRENUM: A trendsetter in modern supercomputer development*, Parallel Computing, Elsevier Science Publishers B.V. (North-Holland), 1987, 40 pages.

Spector, *Multiprocessing Architectures for Local Computer Networks*, A Dissertation Submitted to the Dept. of Computer Science and the Com. on Graduate Studies of Stanford University in Partial Fulfillment of the Requirements for the Degree of Doctor of Philosophy, Aug. 1981, 65 pages.

Owicki, *Experience with the Firefly Multiprocessor Workstation*, Digital Equipment Corp., Sep. 15, 1989.

Tanenbaum et al., *Distributed Operating Systems*, Computing Surveys, vol. 17, No. 4, Dec. 1985.

Nelson et al., *The Unix environment merges with a network-distributed system*, Electronics, Feb. 9, 1984, pp. 131-134.

Way, *Front-end processors smooth local network-computer integration*, Electronics, Feb. 9, 1984, pp. 135-139.

Berglund, *An Introduction to the V-System*, IEEE Micro, Aug. 1986, pp. 35-52.

Cheriton, *The V Kernel: A Software Base for Distributed Systems*, IEEE Software, Apr. 1984, pp. 19-40.

Cheriton, *The Design of a Distributed Kernel*, ACM '81, Nov. 9-11, 1981, pp. 46-52.

Dibble et al., *Bridge: A High-Performance File System for Parallel Processors*.

Douglis et al., *A Comparison of Two Distributed Systems: Amoeba and Sprite*.

Sandberg et al., *Design and Implementation of the Sun Network Filesystem*, Summer '85 Usenix.

Tanenbaum et al., *The Amoeba Distributed Operating System*.

Thekkath et al., *Frangipani: A Scalable Distributed File System*, In Proceedings of the 16th ACM Symposium on Operating Systems Principles, Oct. 1997, 14 pages.

Preslan et al., *A 64-bit, Shared Disk File System for Linux, 16th IEEE Symposium on Mass Storage Systems*, Mar. 15-18, 1999, pp. 22-41.

Kim et al., *Volume Management in SAN Environment*, Electronics and Telecommunications Research Institute, IEEE, Doc. No. XP010551728, Jun. 26, 2001, pp. 500-505.

Cardoza et al., *Overview of Digital UNIX Cluster System Architecture*, Digest of Papers of Compcon (Computer Society Conference) 1996 Technologies for the Information Superhighway, Feb. 25-28, 1996, Doc. No. XP010160905, pp. 254-259.

Ousterhout et al., *The Sprite Network Operating System*, University of California Berkeley, IEEE, Feb. 1988, pp. 23-36.

Ennis, *PC Network Services for Distributed System Design, IEEE Compcon Spring 1986*, Mar. 1986, pp. 1-10.

Solomon et al., *The Roscoe Distributed Operating System*, University of Wisconsin, ACM, May 1979, pp. 108-114.

Sandberg, Russel, *The Sun Network Filesystem: Design, Implementation and Experience*, Sun Microsystems, Inc., pp. 1-16.

Kelly, P., *Functional Programming for Loosely-coupled Multiprocessors*, The MIT Press, ISBN 0-273-08804-1,1989, pp. 1-4.

Panjwani, Mahmood, *NFS on ISDN*, UniForum 1988 Conference Proceedings, Dallas, TX, pp. 171-181.

Roy, Paul, *Unix File Access and Caching in a Multicomputer Environment*, OSF Research Institute, Usenix Association, Mach III Symposium, pp. 21-37.

Kupfer, Michael, *Sprite on Mach*, University of California, Berkeley, Usenix Association, Mach III Symposium, pp. 307-322.

Schroder, W., *PEACE: The distributed SUPRENUM operating system*, Parallel Computing 7 (1988) North-Holland, pp. 325-333.

Bechtolsheim et al., *The SUN Workstation Architecture*, Computer Systems Laboratory, Departments of Electrical Engineering and Computer Science, Stanford University, Technical Report No. 229, Mar. 1982, pp. 1-15.

Welch, B., *The File System Belongs in the Kernel*, Xerox PARC, Usenix Association, Mach Symposium, pp. 233-247.

Bechtolsheim et al., *The SUN Workstation Architecture*, Computer Systems Laboratory, Departments of Electrical Engineering and Computer Science, Stanford University, Technical Report No. 229, Jan. 15, 1982, 55 pages.

Kleiman, *Vnodes: An Architecture for Multiple File System types in Sun Unix*, Sun Microsystems, Usenix 1986 Summer Technical Conference & Exhibition, Georgia, Jun. 9-13, 1986, pp. 238-394.

Spanier, S., *Comparing distributed file systems, Excelan Inc.*, Data Communications, Dec. 1987, pp. 173-186.

Lupper, A., *Distributed File Systems*, Department of Computer Science, University of Ulm, 1995, 25 pages.

Howard et al., *Scale and Performance in a Distributed File System*, Carnegie Mellon University, ACM Transactions on Computer Systems, vol. 6, No. 1, Feb. 1988, pp. 51-81.

Rieken et al., *Adventures in . . . UNIX Kernel Structure and Flow*, .sh consulting inc., California, Jun. 1990, 253 pages.

Tannenbaum et al., *Research Issues in Distributed Operating Systems*, Department of Mathematics and Computer Science, Vrije Universiteit, The Netherlands, 10 pages.

Mahalingam, et al., *Data Migration in a Distributed File Service*, Hewlett-Packard Company, HPL-2001-128, May 23, 2001, 12 pages.

Zhang et al., *Cross-Partition Protocols in a Distributed File Service*, Hewlett-Packard Company, HPL-2001-129, May 23, 2001, pp. 1-21.

Karamanolis et al., *An Architecture for Scalable and Manageable File Services*, Hewlett-Packard Company, HPL-2001-173, Jul. 12, 2001, pp. 1-14.

Muntz, D., *Building a Single Distributed File System from Many NFS Servers*, Hewlett-Packard Company, HPL-2001-176, Jul. 12, 2001, 5 pages.

Karamanolis, et al., *DiFFS: a Scalable Distributed File System*, Hewlett-Packard Company, HPL-2001019, Jan. 24, 2001, 7 pages.

Carson, K, *Storage in the WAN*, Ciprico Inc., Jul. 2001, pp. 1-4.

Levy et al., *Distributed File Systems: Concepts and Examples*, ACM Computing Surveys, vol. 22, No. 4, Dec. 1990 54 pages.

*The Cisco Dynamic Feedback Protocol—White Paper*, Cisco Systems, Inc., 1999, 3 pages.

Pai et al., *Locality-Aware Request Distribution in Cluster-based Network Servers*, ASPLOS VII Oct. 1998, pp. 205-216.

Cherkasova, L., *FLEX: Load Balancing and Management Strategy for Scalable Web Hosting Service*, Hewlett-Packard Labs, 6 pages.

*Microsoft Windows NT Load Balancing Service*—White Paper, 1999.

Cheriton, D., *Distributed Systems—CS244B Course Notes*, vol. 1, Stanford University, Mar. 25, 1999.

Garcia-Molina, H., *Elections in a Distributed Computing System*, IEEE Transactions on Computers, C-31(1): Jan. 1982, pp. 48-59.

Halpern et al., *Knowledge and Common Knowledge in a Distributed Environment*, IBM Research Journal 4421, 1986, pp. 1-46.

Microsoft Corp., *Microsoft Windows NT clusters, White Paper*, Nov. 1997.

Siemens Inc., *PRIMECLUSTER—Concepts Guide*, Oct. 2001, pp. 1-80.

Sistine Inc., *GFS Howto/Red Hat Global File System*, 2001, 4 pages.

Stoller, S., *Leader Election in Distributed Systems with Crash Failures*, Indiana University CS Dept., 1997, pp. 1-15.

Nelson et al., *An Overview of Functional Multiprocessing for NFS Network Servers*, Auspex, Technical Report 1, Sixth Edition, Second Printing, Aug. 1992, pp. 1-27.

Berglund et al., *Amaze: A Distributed Multi-Player Game Program using the Distributed V Kernel*, The 4th International Conference on Distributed Computing Systems, May 14-18, 1984, San Francisco, IEEE Computer Society, pp. 248-297.

Theimer et al., *Preemptable Remote Execution Facilities for the V-System*, Computer Science Department, Stanford University, ACM, 1985, pp. 2-12.

Tan et al., *SOS—Stan's Own Server A NFS file server for the IBM PC*, Computer Science Research Department, Information & Computing Sciences Division, Lawrence Berkeley Laboratory, Aug. 1988, pp. 1-4.

*DOD Standard Transmission Control Protocol*, Information Sciences Institute, University of Southern California, Jan. 1980, pp. 1-87.

*Transmission Control Protocol DARPA Internet Program Protocol Specification*, Internet Engineering Task Force RFC 793, Sep. 1981, pp. 1-88.

Postel, J., *User Datagram Protocol*, Internet Engineering Task Force RFC 768, Aug. 28, 1980, pp. 1-3.

An American National Standard IEEE Standard for a Versatile Backplane Bus: VMEbus, The Institute of Electrical and Electronics Engineers, Inc., Mar. 28, 1988, pp. 1-320.
Hornig, C., *A Standard for the Transmission of IP Datagrams over Ethernet Networks*, Internet Engineering Task Force RFC 894, Apr. 1984, 3 pages.
Patterson et al., *A Case for Redundant Arrays of Inexpensive Disks (RAID)*, Computer Science Division, Department of Electrical Engineering and Computer Science, University of California Berkeley, ACM, 1988, pp. 109-116.
Barkley, John, *NISTIR 5277 Comparing Remote Procedure Calls*, online <http://hissa.nist.gov/rbac/5277/titlerpc.html>, Oct. 1993, 2 pages.
Peterson et al., *VMEbus Frequently Asked Questions (FAQ)*, online <http://www.vita.com/vmefaq/>, Dec. 5, 2000, printed Jul. 22, 2003, 17 pages.
*Remote Procedure Call*, WebServices definition, online <http://searchwebservices.techtarget.com/sDefinition/0,,sid26-gci214272,00.html>, printed Jul. 22, 2003, 3 pages.
*NDMP*, searchNetworking definition, online <http://searchnetworking.techtarget.com/sDefinition/0,,sid7_gci837192,00.html>, printed Aug. 2, 2003, 2 pages.
*Remote Procedure Call*, Software Technology Review, online <http://www.sei.cmu.edu/str/descriptions/rpc_body.html>, printed Jul. 22, 2003, 4 pages.
Carriero et al., *The S/Net's Linda Kernel*, ACM Transactions on Computer Systems, vol. 4, No. 2, May 1986, pp. 110-129.
Birrell et al., *A Universal File Server*, IEEE Transactions on Software Engineering, vol., SE-6, No. 5, Sep. 1980, pp. 450-454.
McKusick et al., *Design of a General Purpose Memory Allocator for the 4.3BSD UNIX Kernel*, Summer USENIX '88, San Francisco, Jun. 20-24, 1988, pp. 295-303.
Birrell et al., *Implementing Remote Procedure Calls*, ACM Transactions on Computer Systems, vol. 2, No. 1, Feb. 1984, pp. 39-59.
*NFS: Network File System Protocol Specification*, Internet Engineering Task Force RFC 1094, Mar. 1989, pp. 1-26.
Cheriton et al., *Thoth, a Portable Real-Time Operating System*, Communications of the ACM, vol. 22, No. 2, Feb. 1979 pp. 105-115.
Marzullo et al., *Supplying High Availability with a Standard Network File System*, Department of Computer Science, Cornell University, IEEE, 1988, pp. 447-453.
*The period 1986-1990 Datacommunication and the PC local area network*, online http://www.tno.nl.instit/fel/museum/computer/en/comp863E.html, printed Aug. 11, 2003, 3 pages.
McLeod, B., *Sacrifices to Ra or Learning to Administer a Sun Network*, EUUG Autumn '88—Cascais, Oct. 3-7, 1988, pp. 249-252.
Cheriton et al., *V-System 6.0 Reference Manual* including Part II: V Programming and Part III: V Servers, Jun. 20, 1986, pp. 1-1 to 46-1.
Tanenbaum, et al., *Research Issues in Distributed Operating Systems*, Dept. of Mathematics and Computer Science, Vrije Universiteit, Amsterdam, The Netherlands, 10 pages.
*Computers & peripherals—Small unit has multiprocessor architecture*, Electronics, Feb. 9, 1984, p. 161.
van Renesse et al., *Wide-Area communication under Amoeba*, Vrije Universiteit, Amsterdam, pp. 1-12.
van Renesse et al., *Connecting RPC-Based Distributed Systems Using Wide-Area Networks*, Dept. of Mathematics and Computer Science, Vrije Universiteit, Amsterdam, The Netherlands, pp. 108-119.
Draves, R., *A Revised IPC Interface*, USENIX Association, Mach Workshop, pp. 101-121.
Cheriton, D., *VMTP: Versatile Message Transaction Protocol—Protocol Specification*, Internet Engineering Task Force RFC 1045, Feb. 1988, 128 pages.
*Internet Protocol DARPA Internet Program Protocol Specification*, Internet Engineering Task Force RFC 791, Sep. 1981, pp. 1-49.
*XDR: External Data Representation Standard*, Internet Engineering Task Force RFC 1014, Jun. 1987, 19 pages.
*RPC: Remote Procedure Call Protocol Specification Version 2*, Internet Engineering Task Force RFC 1057, Jun. 1988, 24 pages.
Zwaenepoel, W., *Message Passing on a Local Network*, Department of Computer Science, Stanford University, Report No. STAN-CS-85-1083, Oct. 1985, pp. 1-101.

*Abstract—Communications Controller for bi-directional data transfer includes separate bus segments operating to interconnect microprocessor with communication network and arbitration logic*, Derwent Publications Ltd, London, England, 1986, 1 page.
Ennis, G., *The LocalNet/PC Protocols: An Overview*, Sytek, Incorporated, Aug. 3, 1984, 22 pages.
Cardinal, D., *File Server Offers Transparent Access to Design Tools*, Computer Design, Jun. 1985, 5 pages.
Coronminas et al., *A VLSI Implementation of a SMDS Attachment Unit over an ICI interface*, Melecon '96, XP-001001248, May 13, 1996, pp. 373-376.
Jovanov et al., *Hardware Implementation of Some DBMS Functions using SPR*, System Sciences, 1992, Jan. 7, 1992, pp. 328-337.
Bowman, R., *Multitasking keys SCSI control of large SMD-compatible disks*, Electronic Design, Jun. 25, 1987, pp. 89-94.
Strang, C., *A New Family of SCSI Protocol Controller Chips, Designed with Modular Standard Cell Approach*, Texas Instrument, Inc., pp. 119-124.
Taylor et al., *VLSI Node Processor Architecture for Ethernet*, IEEE Journal on Selected Areas in Communications, vol. SAC-1, No. 5, Nov. 1983, pp. 733-739.
Hennessy et al., *Computer Organization and Design the Hardware/Software Interface*, Morgan Kaufmann Publishers, Inc., Chapters 8 and 9, 1998, pp. 655-740, plus Glossary.
Culler et al., *Parallel Computer Architecture, A Hardware/Software Approach*, Morgan Kaufmann Publishers, Inc., Chapter 1, 1999, pp. 25-42.
Nowicki, B., *Transport Issues in the Network File System*, Sun Microsystems, Mar. 8, 1989, 5 page.
*Computer Design Special Report: Advanced Digital ICs*, A PennWell Publication, Feb. 1983, 7 pages.
*Ethernet compatible frontend processor*, Computer Design, PennWell, Apr. 5, 1983, 7 pages.
Wright, M., *Intelligent Ethernet Boards*, EDN, vol. 33 No. 13, 5 pages.
McGraw, T., *New hardware cuts price of graphics power*, Government Computer News, vol. 7, No. 8, Apr. 15, 1998, 2 pages.
Martin, S., *Peripheral controller ICs gain speed and flexibility*, Computer Design, Jun. 15, 1988, pp. 41-45.
Martin, S., *IC vendors keep pace with peripheral control requirements*, Computer Design, Jun. 15, 1987, 9 pages.
Fong et al., *Build a high-performance SCSI bridge controller*, Electronic Design, Jul. 9, 1987, pp. 107-111.
Israel et al., *Eliminating Data Copies in UNIX-based NFS Servers*, UniForum 1989 Conference Proceedings, San Francisco, pp. 261-272.
Poor, V., *The Concept of Attached Processing and Attached Resource Computer Systems*, Datapoint Corporation, pp. 110-116.
Row, J., *LAN Software Links Diverse Machines, OS's*, Mini-Micro Systems, Sep. 1985, 4 pages.
West et al., *Local networks for computer communications*, IFIP Working Group 6.4, International Workshop on Local Networks, Aug. 27-29, 1980, North-Holland Publishing Company, 1980, 20 pages.
*Network controllers grow smarter/smaller*, Computer Design, Dec. 1983, 4 pages.
Vizard, M., *1988 Sees DEC Take a New Tack: Won't Go It Alone*, Digital Review, Dec. 19, 1998, 4 pages.
*Le reseau local d'ordinateurs personnels*, IBM, Oct. 26, 1985, 8 pages (French).
Stein, M., *The Sun Network File System*, Sun Microsystems, Inc., Jan. 1987, 1 page.
Didio, L., *Sun eases networking of diskless workstations*, Network World, vol. 5, No. 15, Apr. 11, 1999, 2 pages.
Reid et al., *TCP/IP PrintServer: Print Server Protocol*, WRL Technical Note TN-4, Sep. 1988, 16 pages.
Kent. C., *TCP/IP PrintServer: Server Architecture and Implementation*, WRL Technical Note TN-7, Nov. 1988, 22 pages.
*NX 200 Network Executive Reference Manual*, Excelan Inc., Publication No. 4200036-00, May 28, 1986, 234 pages.
Scott, K., *IBM Software Lets Host Act as NFS File Server*, Connectivity, Aug. 29, 1988, 1 page.

Coulouris et al., *Distributed Systems, Concepts and Design*, International Computer Science Series, 1988, pp. 1-366.

Williams, T., *Serial buses provide small area networks between system ICs, and modules*, Computer Design, Jan. 1983, p. 40.

Associated Computer Consultants, *Protocol package accesses transparently*, Computer Design, May 1983, pp. 30, 32 and 34.

Taylor et al., *Secure Networking in the Sun Environment*, Sun Microsystems, Inc., USENIX Association Conference Proceedings, 1986 Summer, pp. 28-37.

Rifkin et al., *RFS Architectural Overview*, AT&T, USENIX Association Conference Proceedings, 1986 Summer, pp. 248-259.

Rodriguez et al., *The Generic File System*, ULTRIX Engineering and Advanced Development Group, Digital Equipment Corporation, USENIX Association Conference Proceedings, 1986 Summer, pp. 260-269.

Gould, E., *The Network File System Implemented on 4.3BSD*, MT XINU, USENIX Association Conference Proceedings, 1986 Summer, pp. 294-298.

Rosen et al., *NFS Portability*, The Instruction Set Ltd., USENIX Association Conference Proceedings, 1986 Summer, pp. 299-305.

Hughes, R., *The Transparent Remote File System*, Integrated Solutions, Inc., USENIX Association Conference Proceedings, 1986 Summer, pp. 306-317.

Ghodssi et al., *A Global Optimizer for Sun FORTRAN, C& Pascal*, Sun Microsystems, Inc., USENIX Association Conference Proceedings, 1986 Summer, p. 318-334.

Hitz et al., *A Mail File System for Eighth Edition UNIX*, Computer Science Department, Princeton University, USENIX Association Conference Proceedings, 1986 Summer, pp. 28-37.

Chang, J., *SunNet*, Sun Microsystems, Inc., USENIX Association Conference Summer 1985, pp. 71-78.

Ferrin, T., *A Recipe for Establishing Point-to-Point TCP/IP Network Links with 4.2 BSD UNIX*, Computer Graphics Laboratory School of Pharmacy, University of California, USENIX Association Conference Summer 1985, pp. 113-118.

Cole, et al., *An Implementation of an Extended File System for UNIX*, MASSCOMP, USENIX Association Conference Summer 1985, pp. 131-149.

Lyon et al., *All the Chips that Fit*, Sun Microsystems, Inc. USENIX Association Conference Summer 1985, pp. 557-561.

Finger, et al., *A Multi-CPU Version of the Unix Kernel of Technical Aspects and Market Need*, MASSCOMP Engineering, USENIX Association Conference Winter 1985, pp. 11-21.

Requa, J., *UNIX Kernel Networking Support and the Lincs Communications Architecture*, Lawrence Livermore National Laboratory, USENIX Association Conference Winter 1985, pp. 98-103.

Uttal, et al., *Transparent Integration of UNIX and MS-DOS*, Locus Computing Corporation, USENIX Association Conference Winter 1985, pp. 104-116.

Walsh, et al., *Overview of the Sun Network File System*, Sun Microsystems, Inc., USENIX Association Conference Winter 1985, pp. 117-124.

Lichtenstein, W., *The Architecture of the Culler 7*, Culler Scientific Systems Corporation, IEEE computer Society Compcon Spring '86, Mar. 3-6, 1986, pp. 467-470.

*Culler Announces First Personal Supercomputer*, The Journal Record, May 7, 1986, 1 page.

*Sun Microsystems Inc. and Culler Scientific Systems Announce Joint Sales and Marketing Venture*, PR Newswire, Oct. 25, 1985, 1 page.

Gosling, J., *SunDew: A Distributed and Extensible Window System*, Sun Microsystems, USENIX Technical Conference, Winter 1986, pp. 98-103.

Straathof et al., *UNIX Scheduling for Large Systems*, Department of Computer Science University of Maryland, USENIX Technical Conference, Winter 1986, pp. 111-139.

Probert et al., *A Straightforward Implementation of 4.2BDS on a High-performance Multiprocessor*, Culler Scientific Systems Corporation, USENIX Technical Conference, Winter 1986, pp. 140-156.

Test et al., *Multi-Processor Management in the Concentrix Operating System*, Alliant Computer Systems Corporation, USENIX Technical Conference, Winter 1986, pp. 172-182.

Jacobs, H., *A User-tunable Multiple Processor Scheduler*, Alliant Computer Systems, USENIX Technical Conference, Winter 1986, pp. 183-191.

Edler et al., *Considerations for Massively Parallel UNIX Systems on the NYU Ultracomputer and IBM RP3*, Ultracomputer Research Laboratory Courant Institute of Mathematical Sciences, USENIX Technical Conference, Winter 1986, pp. 193-210.

Welch et al., *Pseudo-File-Systems*, Computer Science Division, Electrical Engineering and Computer Sciences, University of California, Report No. UCB/CSD 89/499, Apr. 1989, pp. 1-12.

*Kinetics FastPath™ 4 Gateway Installation Guide*, Kinetics, Inc., Publication No., 4200094-00 Revision A, 1988, 146 pages.

*PrestoServe™ Network File System Server Accelerator*, Legato Systems, Inc., 4 pages.

*Presto Disk™ Network File System Server Accelerator*, Legato Systems, Inc., 2 pages.

*Prestoserve Beta Test Customer Report*, 1 page.

Kabashima et al., *Implementing the Protocol Validation System on Sun Workstations*, Kokusai Denshin Denwa Co., Ltd., UniForum 1988 Conference Proceedings—Dallas, Texas, Feb. 8-11, 1988, pp. 81-93.

Shipley, M., *The Virtual Home Environment*, Hewlett-Packard Company, UniForum 1988 Conference Proceedings—Dallas, Texas, Feb. 8-11, 1988, pp. 117-181.

Wang, S., *Discless HP-US Workstations*, Hewlett-Packard Journal, Oct. 1988, vol. 39, No. 5, pp. 6-9.

Bartlett et al., *A Discless HP-UX System*, Hewlett-Packard Journal, Oct. 1988, vol. 39, No. 5, pp. 10-14.

Hwang et al., *Discless Program Execution and Virtual Memory Management*, Hewlett-Packard Journal, Oct. 1988, vol. 39, No. 5, pp. 15-20.

Gutierrez et al., *The Design of Network Functions for Discless Clusters*, Hewlett-Packard Journal, Oct. 1988, vol. 39, No. 5, pp. 20-26.

Randel, A., *Crash Detection and Recovery in a Discless HP-UX System*, Hewlett-Packard Journal, Oct. 1988, vol. 39, No. 5, pp. 27-32.

Scott, et al., *Boot Mechanism for Discless HP-UX*, Hewlett-Packard Journal, Oct. 1988, vol. 39, No. 5, pp. 33-36.

Wagner, K., *Discless System Configuration Tasks*, Hewlett-Packard Journal, Oct. 1988, vol. 39, No. 5, pp. 37-39.

Perlmutter, P., *Small Computer System Interface*, Hewlett-Packard Journal, Oct. 1988, vol. 39, No. 5, pp. 39-45.

Hall et al., *X: A Windows System Standard for Distributed Computing Environments*, Hewlett-Packard Journal, Oct. 1988, vol. 39, No. 5, pp. 46-50.

Hall et al., *The Sun Technology Papers*, Sun Microsystems, Inc., Sun Technical Reference Library, 1990, pp. 1-239.

Nowicki, W., *Partitioning of Function in a Distributed Graphics System*, Department of Computer Science, Stanford University, Mar. 1985, pp. 1-136.

Malcolm et al., *Coping with Network Partitions an Processor Failures in a Distributed System*, Software Portability Laboratory, University of Waterloo, IEEE 1984 Fourth Symposium on Reliability in Distributed Software and Database Systems, Oct. 15-17, 1984, pp. 36-44.

Spector et al., *Support for Distributed Transactions in the TABS Prototype*, Department of Computer Science, Carnegie-Mellon University, IEEE 1984 Fourth Symposium on Reliability in Distributed Software and Database Systems, Oct. 15-17, 1984, pp. 186-206.

Cheriton, D., *Problem-oriented Shared Memory: A Decentralized Approach to Distributed System Design*, Computer Science Department, Stanford University, IEEE Computer Society, The 6th International Conference on Distributed Computing Systems, May 19-23, 1986, pp. 190-197.

Cheriton, D., *VMTP: A Transport Protocol for the Next Generation of Communication Systems*, Computer Science Department, Stanford University, ACM, 1986, pp. 406-415.

Cheriton, et al., *VMTP as the Transport Layer for High-Performance Distributed Systems*, IEEE Communications Magazine, Jun. 1989, pp. 37-44.

Williamson, et al., *An Overview of the VMTP Transport Protocol*, Computer Science Department, Stanford University, IEEE, Jun. 1989, pp. 415-420.

*Prestoserve™ User's Guide*, Legato Systems, Inc., Feb.-May 1989, Chapters 0-5, 30 pages.

*SLIC Technology Overview*, Alacritech, online <http://alacritech.com/html/tech_review.shtml>, Printed Jul. 11, 2005, 3 pages.

*SiliconServer White Paper*, BlueArc Corporation, 2002, pp. 1-18.

Chau, V., *Technical Brief: Titan & Alacritech iSCSI Accelerator on Microsoft Windows®*, BlueArc Corporation, 2005, pp. 1-21.

*Memorandum & Order Re: Plaintiff's Motions for Summary Judgment of Infringement; Defendant's Motions for Summary Judgment of Noninfringement, Network Appliance, Inc. v. BlueArc Corp.*, Case No. C 03-5665 MHP, May 16, 2005, 27 pages.

*Memorandum & Order Re: Cross-Motions for Summary Judgment of Infringement and Noninfringement; Defendant's Motion for Summary Judgment on Damages, Network Appliance, Inc. v. BlueArc Corp.*, Case No. C 03-5665 MHP, Jun. 27, 2005, 25 pages.

*Sun™ Cluster 3.0 Concepts*, Sun Microsystems, Inc., Part No. 806-1424-10, Nov. 2000.

Pfister, G., *In Search of Clusters*, Prentice Hall PTR, ISBN 0-13899709-8, Second Edition, 1998.

Mullender, S., *Distributed Systems*, ACM Press New York, ISBN 0-201-62427-3, Second Edition, 1993.

Davis, R., *VAXCluster Principles*, Digital Press, ISBN 1-55558-112-9, 1993.

*The Next Step in Server Load Balancing*, White Paper, Alteon WebSystems, Inc., Nov. 1999.

*Solstice HM 1.2 Software Administration Guide*, Sun Microsystems, Inc., Appendix C, 1996.

*Sun Cluster System Administration Guide for Solaris OS*, Sun Microsystems, Inc., Part No. 819-0580-10, printed online <http://docs.sun.com> on Aug. 26, 2005.

*The Case for Storage Virtualization Using Intelligent Routers*, White Paper, Crossroads Systems, Inc, Doc. No. XP-002200766, 2001, pp. 1-10.

*Boosting Network Server Adapter Performance by 800%*, Technology White Paper, Alacritech, Inc., http://www.alacritech.com/html/pci_traffic.html, printed Aug. 8, 2000, 2 pages.

*Alacritech 100x4 Quad-Port Server Adapter*, Alacritech, Data Sheet, 1 page.

*Alacritech 100x4 Quad-Port Server Adapter*, Alacritech, http://www.alacritech.com/html/4port.html, printed Aug. 28, 2000, 2 pages.

*Boosting Network Server Adapter Performance by 800%*, Technology White Paper, Alacritech, Inc., 2000, 14 pages.

Ponomarev et al., *A Comparative Study of Some Network Subsystem Organizations*, Department of Computer Science, State University of New York, IEEE, Doc. No. 0-8186-9194-8/98, 1998, 8 pages.

Vuillemin et al., *Programmable Active Memories: Reconfigurable Systems Come of Age*, IEEE Transactions on Very Large Scale Integration (VLSI) Systems, vol. 4, No. 1, Doc. No. 1063-8210/96, Mar. 1996, 14 pages.

Cheriton et al., *Uniform Access to Distributed Name Interpretation in the V-System*, Computer Science Dept., Stanford Univ., The 4th International Conference on Distributed Computing Systems, May 14-18, 1984, San Francisco, IEEE Computer Society, pp. 290-297.

Cheriton et al., *A Decentralized Naming Facility*, Dept. of Computer Science, Stanford Univ., Feb. 1986, pp. 1-28.

Cheriton, *Dissemination-Oriented Communication Systems*, Computer Science Dept., Stanford Univ., 1992, pp. 1-8.

Cheriton, *Distributed I/O using an Object based Protocol*, Dept. of Computer Science, Univ. of British Columbia, Technical Report 81-1, Jan., 1981.

Cheriton et al., *Distributed Process Groups in the V Kernel*, ACM Transactions on Computer Systems, vol. 3, No. 2, May 1985, pp. 77-107.

Cheriton et al., *The Distributed V Kernel and its Performance for Diskless Workstations*, Association for Computing Machinery, Jul. 1983, pp. 129-140.

Cheriton, *Exploiting Recursion to Simplify RPC Communication Architectures*, Dept. of Computer Science, Stanford Univ., Report No. STAN-CS-88-1213, Jun. 1988.

Cheriton et al., *Host Groups: A Multicast Extension for Datagram Internetworks*, Dept. of Computer Science, Stanford Univ., Report No. STAN-CS-85-1058, Jul. 1985.

Cheriton et al., *Multi-Level Shared Caching Techniques for Scalability in VMP-MC*, Dept. of Computer Science, Stanford Univ., Report No. STAN-CS-89-1266, May 1989.

Cheriton, *Multi-Process Structuring and the Thoth Operating System*, Dept. of Computer Science, Univ. of British Columbia, Mar. 1979.

Cheriton et al., *Network Measurement of the VMTP Request-Response Protocol in the V Distributed System*, Dept. of Computer Science, Stanford Univ., Report No. STAN-CS-87-1145, Feb. 1987.

Row, *LAN Software Links Diverse Machines*, OS's, Mini-Micro Systems, Sep. 1985, 4 pages.

Hindin, *Micro Operating Systems Yield Mixed Blessings*, Computer Design, Jul. 1984, pp. 155-170.

Row et al., *Operating System Extensions Link Disparate Systems*, Computer Design, Jul. 1984, pp. 171-183.

Shoens et al., *Research Report Amoeba Project*, IBM Research Laboratory, San Jose, CA, RJ 4465 (48253), Oct. 12, 1984.

Weinberger, *Distributed File Access*, ACM Thirteenth Annual Computer Science Conference, New Orleans, LA, Mar. 1985, pp. 299-301.

Zwaenepoel, *Implementation and Performance of Pipes in the V-System*, Dept. of Computer Science, Rice Univ., COMP TR85-14, Mar. 1985.

Finlayson et al., *Log Files: An Extended File Service Exploiting Write-Once Storage*, Dept. of Computer Science, Stanford University, Report No. STAN-CS-87-1177, Sep. 1987, pp. 1-12.

Greenstein, *A dedicated server may help cure your network performance headaches*, Networking Management, Apr. 1991, pp. 75-79.

Haas et al., *Blazenet: A Phototonic Implementable Wide-Area Network*, Dept. of computer Science, Stanford University, Report No. STAN-CS-87-1185, Oct. 1987, pp. 1-21.

Hurwicz, *Superservice with a smile*, Network World, Feb. 12, 1990, pp. 43-46.

Hurwicz, *Souped-up servers*, Network World, Oct. 21, 1991, 5 pages.

Lazowska et al., *File Access Performance of Diskless Workstations*, Dept. of Computer Science, Stanford University, Report No. STAN-CS-84-1010, Jun. 1984, 1-26.

Lobelle, *Integration of Diskless Workstations in UNIX* United, Software—Practice & Experience, vol. 15(10), Oct. 1985, pp. 997-1010.

Mason, *Distributed Processing: The State of the Art*, Byte, Nov. 1987, pp. 291-297.

Marshall, *Auspex NFS Server Separates NFS From Unix Kernel to Increase I/O*, Infoworld, Oct. 16, 1989, pp. 40 and 42.

Almes, *The Impact of Language and System on Remote Procedure Call Design*, Dept. of Computer Science, Rice Univ., Technical Report 85-26, Oct. 23, 1985.

Almes, *Understanding and Exploiting Distribution*, Dept. of Computer Science, Rice Univ., Technical Report 85-12, Feb. 1985.

Breidenbach, *Auspex superserver ups I/O processing*, Network World, Oct. 2, 1989, pp. 21, 25.

Chorafas, *Designing and Implementing Local Area Networks*, McGraw-Hill Book Company, New York, pp. 214-229.

Cheriton et al., *One-to-Many Interprocess Communication in the V-System*, Dept. of Computer Science, Stanford University, Report No. STAN-CS-84-1011, Aug. 1984.

Cheriton et al., *Performance of the V Storage Server: A Preliminary Report*, Proceedings of the 1985 ACM Computer Science Conference—Agenda for Computing Research: The Challenge for Creativity, Mar. 12-14, 1985, pp. 302-308.

Cheriton et al., *Process Identification in Thoth*, Dept. of Computer Science, The University of British Columbia, Technical Report 79-10, Oct. 1979.

Cheriton, *Sirpent™: A High-Performance Internetworking Approach*, Dept. of Computer Science, Stanford University, Report No. STAN-CS-89-1273; Jul. 1989, 17 pages.

Cheriton et al., *Software-Controlled Caches in the VMP Multiprocessor*, Dept. of Computer Science, Stanford University, Report No. STAN-CS-86-1105, Mar. 1986, pp. 1-12.

Cheriton, *UIO: A Uniform I/O system Interface for Distributed Systems*, Dept. of Computer Science, Stanford University, Report No. STAN-CS-86-1134, Nov. 1986, pp. 1-30.

Cheriton, *The Unified Management of Memory in the V Distributed System*, Dept. of Computer Science, Stanford University, Report No. STAN-CS-88-1192, Aug. 1988, pp. 1-24.

Cheriton, *The V Distributed Operating System: Principles and Principal Experiences*, Dept. of Computer Science, Stanford University, Apr. 1986, pp. 1-3.

Cheriton et al., *The VMP Multiprocessor: Initial Experience, Refinements and Performance Evaluation*, IEEE, Feb. 1988, 36 pages.

Leach et al., *The File System of an Integrated Local Network*, Proceedings of the 1985 ACM Computer Science Conference—Agenda for Computing Research, The Challenge for Creativity, Mar. 12-14, 1985, pp. 309-324.

*Sun™ Cluster 3.0 Concepts*, Sun Microsystems, Inc., Part No. 806-1424-10, Nov. 2000.

Pfister, G., *In Search of Clusters*, Prentice Hall PTR, ISBN 0-13899709-8, Second Edition, 1998.

Mullender, S., *Distributed Systems*, ACM Press New York, ISBN 0-201-62427-3, Second Edition, 1993.

Davis, R., *VAXCluster Principles*, Digital Press, ISBN 1-55558-112-9, 1993.

EPO, Examination report for European paten application No. 03776614.4-1527, dated Jun. 17, 2008, 6 pages.

E. Lee and C. Thekkath, Petal: Distributed Virtual Disks; $7^{th}$ Int'l Conference on Architectural Support for Programming Languages and operation Systems, Cambridge, MA; Oct. 1-5, 1996; XP000681711, pp. 84-92.

Clive Froud, Response filed Dec. 4, 2008 to Examination report dated Jun. 17, 2008 for European patent application No. 03776614.4-1527, 3 pages.

Japanese Patent Office, English Translation of Official Action dated Jul. 31, 2009, pertaining to Application No. 2004-550258 (PCT/US03)/34495), 4 pages [Japanese Official Action attached, 3 pages].

Thekkath, et al., Frangipani: A Scalable Distributed File System, ACM SIGOPS Operating Systems Review, vol. 31, Issue 5, pp. 224-237.

Shusaku Yamamoto, An English translation of amended claims as filed with the JPO on Feb. 1, 2010, pertaining to Japanese Patent Application No. 2004-550258, 21 pages.

Japanese Patent Office, Notice of Allowance for Japanese Patent Application 2004-550258, dated Mar. 11, 2010, 3 pages.

European Patent Office—Berlin, Germany, Communication pursuant to Article 94(3) EPC, Application No. 03776614.4-1527, dated Apr. 27, 2011, 6 pages.

* cited by examiner

DISTRIBUTED FILE SYSTEM AND METHOD

TECHNICAL FIELD AND BACKGROUND ART

The present invention relates to computer file systems, and in particular to file systems in which file system objects are distributed across multiple self-contained volumes on multiple file system nodes.

SUMMARY OF THE INVENTION

A distributed file system and method for a cluster of Network Attached Storage (NAS) nodes distributes file system objects across multiple self-contained volumes, where each volume is owned by a unique cluster node. Logical links are used to reference a file system object between volumes. Each file system object is implemented by means of a metadata structure called "i-node" that describes where the content of the object is stored, along with a plurality of attributes (including length, ownership information and more). Each cluster node includes a relocation directory in which is maintained hard links to locally-stored file system objects that are referenced from another cluster node using logical links. Various file system operations that involve multiple volumes are performed without having to place a write lock on more than one volume at a time. Various caching schemes allow the various cluster nodes to cache file system object data and metadata.

In one embodiment of the invention there is provided a method for using a plurality of cluster nodes, each of which has access to a plurality of logical storage volumes, to provide access by clients, in communication with the nodes, to data on the volumes. The method involves permitting operations that modify the content of the data or metadata of a given storage volume (referred to herein generically as "writes") to be made only by a unique cluster node deemed to own the volume and maintaining a file system object across a plurality of volumes by causing a first cluster node to store the file system object in a first volume owned by the first cluster node and creating a logical link between the first volume and a second volume owned by a second cluster node, such logical link providing in the second volume a logical identifier for accessing the file system object in the first volume. The file system object may be a file or a directory.

The method may also involve storing the logical identifier in a relocation directory, in the first volume, that lists logical identifiers for all file system objects in the first volume that are logically referenced from volumes other than the first volume. The relocation directory typically has a hierarchical structure. The processes of causing the first cluster node to store the file system object and creating the logical link are typically performed while placing a write-lock on no more than one volume at a time, so that multi-volume locking is avoided. One cluster node is typically assigned to role of write-lock manager for the various volumes in the course of performing such processes. The write-lock manager is typically assigned in a semi-static fashion such that the node is assigned the role of write-lock manager from the time the node joins the plurality of cluster nodes until the first node leaves the plurality of cluster nodes.

The process of creating the logical link typically involves assigning an identifier that is unique, at least in the first volume, as the logical identifier. The unique identifier is typically assigned based on the count of previously assigned logical identifiers for file system objects in the first volume.

Whether access to a file system object is done directly within a given volume or through a logical link from another volume is totally hidden from client software interacting with the NAS cluster.

The method may also involve permitting reads to a given storage volume to be made by any of the nodes. Each volume is typically associated with a volume cache, and each node is typically associated with a cluster node cache. The method may further involve handling a request, to read a sector in a selected volume, that has been received by an operative cluster node that owns a volume distinct from the selected volume by causing the operative cluster node to issue a first read request, for the sector, with a read-only lock to the cluster node that is the owner of the selected volume and a second read request, for the sector, to the selected volume; having the cluster node that is the owner of the selected volume determine whether it has the sector in its cache; and if not, granting the read-only lock and letting the selected volume satisfy the request; if so, and if the sector is not write-locked, granting the read-only lock and sending the sector content from cache, of the node owning the selected volume, to the operative node and aborting the communication of the selected volume with respect to the request; and if so, and if the sector is write-locked, stalling affirmative action on the request until the read-only lock can be granted and then resuming processing as for when the sector is not write-locked. Granting the read-only lock typically involves recording the identity of the operative cluster node and of the sector, so that caching states may be tracked.

The method may also involve storing in a directory of the second volume a logical reference to the logical identifier stored in the relocation directory in the first volume. The logical reference typically includes the logical identifier and a numeric value ("e-number") that encodes a numeric string representing a name of the referenced file system object in the relocation directory of the first volume. The logical reference is typically restricted to be the one and only logical reference to the logical identifier stored in the relocation directory in the first volume.

The method may also involve deleting the logical reference from the second volume and deleting the logical identifier from the relocation directory of the first volume.

The method may also involve deleting the file system object from the first volume and deleting the logical reference from the second volume.

The method may also involve determining that the logical reference references a non-existent file system object, for example, using a scavenger process to examine the logical reference from time to time to determine whether the file system object it references exists, and deleting the logical reference from the second volume.

The method may also involve determining that the file system object in the first volume is no longer referenced by any logical references in the other volumes, for example, using a scavenger process to examine the relocation directory from time to time to determine whether the file system object is referenced by at least one logical reference in another volume, and deleting the file system object from the first volume. The scavenger process would typically operate on those references and file system objects that were being modified at the time one of the volumes involved in the operation shut down or crashed.

The method may also involve mapping a " . . . " directory entry in the first volume to the directory containing the logical reference in the second volume. This typically involves storing in the i-node that implements the directory in the relocation directory of the first volume a reference to the directory containing the logical reference in the second volume. The reference to the directory containing the logical reference in the second volume may include a volume identifier associated with the second volume and a node identifier associated with the directory containing the logical reference in the second volume. The second volume will implement a file-based mapping table between a pair made of the ID of the first volume and the unique number (e-number) that identifies the directory in the first volume and the number of the i-node that implements the directory referencing the target directory in the first volume. When the " . . . " entry for a directory in the first volume must be resolved to the directory pointing to it in the second volume, a look-up operation will be performed through the mapping table in the second volume that will yield the desired reference. The file-based mapping table must be updated every time a new logical link is created between the second volume and an entry in the relocation directory of another volume. The mapping table can be reconstructed exclusively by scanning the second volume.

Alternatively, the reference to the directory containing the logical reference in the second volume may include a variable-length pathname to the directory containing the logical reference in the second volume. Mapping the " . . . " directory entry in the first volume to the directory containing the logical reference in the second volume typically involves storing in the first volume a separate file containing a reference to the directory containing the logical reference in the second volume. This however, would require extensive rewrites of the logical references if any directory in the stored reference is moved or renamed.

The method may additionally involve logically relocating the file system object from the first volume to a third volume owned by a third node by deleting the logical identifier from the relocation directory of the first volume; storing a new logical identifier in the relocation directory of the first volume; and storing in a directory of the third volume a new logical reference to the new logical identifier stored in the relocation directory in the first volume. The logical reference is typically deleted from the directory of the second volume.

The method may additionally involve referencing the file system object by a third volume by storing a new logical identifier in the relocation directory of the first volume; and storing in a directory of the third volume a new logical reference to the new logical identifier stored in the relocation directory in the first volume.

Creating a logical link between the first volume and the second volume typically involves creating a hard link to the file system object in a relocation directory of the first volume; and creating a logical link to said hard link in a directory of the second volume, wherein the hard link and the logical link form a physical namespace invisible to the clients of the plurality of cluster nodes, the physical namespace implemented through the plurality of volumes each with its own internal hierarchy that connects file system objects through hard links including the hard link in the relocation directory of the first volume; and a logical namespace visible to the clients of the plurality of cluster nodes that spans the entire file system across volumes and is made of file system objects connected via hard links and logical links such that the difference between hard links and logical links is hidden from the clients.

The method may additionally involve receiving by the second cluster node a request to write to the file system object; forwarding the request by the second cluster node to the first cluster node; and writing to the file system object by the first cluster node.

The method may additionally involve receiving by the first cluster node a request to write to the file system object; and writing to the file system object by the first cluster node.

The method may additionally involve modifying the file system object by a third cluster node by causing the third cluster node to store a modified file system object in a third volume owned by the third cluster node; and creating a logical link between the second volume and the third volume, such logical link providing in the second volume a logical identifier for accessing the file system object in the third volume.

Creating the logical link between the first volume and the second volume may involve sending by the first cluster node to the second cluster node a request to create the logical link; and creating the logical link by the second cluster node upon receiving the request.

Causing the first cluster node to store the file system object in the first volume may involve receiving by the first cluster node a request to create the file system object in the second cluster node.

Causing the first cluster node to store the file system object in the first volume may involve receiving by the second cluster node a request to create the file system object in the second cluster node; and determining by the second cluster node that the file system object should be created in the first cluster node.

The method may additionally involve causing the second cluster node to create a file handle for the file system object, the file handle including a unique volume identifier associated with the first volume.

The method may additionally involve receiving a request to delete the file system object by a cluster node other than the second cluster node; directing the request to the second cluster node; and deleting the file system object by the second cluster node.

The method may additionally involve receiving a request to delete the file system object by the second cluster node; causing the logical link to be removed from the second cluster node; sending by the second cluster node to the first cluster node a request to delete the file system object; and deleting the file system object by the first cluster node.

The method may involve automatically relocating the file system object from the first volume to a third volume.

The method may additionally involve relocating the file system object from the first volume to a third volume owned by a third cluster node by causing the file system object to be copied from the first volume to the third volume; removing the logical identifier from the relocation directory of the first volume; removing from the second volume the logical reference to the logical identifier stored in the relocation directory of the first volume; creating a new logical link between the second volume and the third volume, such new logical link providing in the second volume a new logical identifier for accessing the file system object in the third volume; and deleting the file system object from the first volume. The new logical identifier is typically stored in a relocation directory of the third volume. The method typically also involves storing in the directory of the second volume a new logical reference to the new logical identifier stored in the relocation directory in the third volume. Causing the file system object to be copied from the first volume to the third volume typically involves copying the file system object from the first volume to the third volume using a lazy copy technique.

The method may additionally involve relocating the file system object from the first volume to the second volume by causing the file system object to be copied from the first volume to the second volume; removing the logical identifier from the relocation directory of the first volume; and removing from the second volume the logical reference to the logical identifier stored in the relocation directory of the first volume.

The method may additionally involve maintaining a copy of data relating to the file system object by at least one cluster node other than the first cluster node; modifying the data relating to the file system object by the first cluster node; and causing the at least one other cluster node to invalidate the data relating to the file system object. The method typically also involves causing the at least one other cluster node to reacquire the data relating to the file system object from the first volume. Causing the at least one other cluster node to invalidate the copy of the portion of the file system object typically involves maintaining by the first cluster node a list of other cluster nodes having a copy of data relating to the file system object; and sending to each other cluster node an indication that the data relating to the file system object was modified. The data relating to the file system object may include metadata, in which case maintaining the copy of data relating to the file system object by at least one cluster node other than the first cluster node typically involves maintaining, by the at least one other cluster node, a metadata cache for storing the metadata, the metadata cache operating independently of any other cache used for storing a copy of file system object data. Maintaining the copy of data relating to the file system object by at least one cluster node other than the first cluster node further typically involves requiring the at least one other cluster node to obtain a read lock from the first cluster node before reading metadata relating to the file system object from the first cluster node. The data relating to the file system object may include file system object data and metadata, in which case maintaining the copy of data relating to the file system object by at least one cluster node other than the first cluster node typically involves maintaining a data cache for storing file system object data; maintaining a metadata cache for storing metadata; and mapping each datum in the data cache to corresponding metadata in the metadata cache.

The file system object may be renamed when it is relocated from the first volume to a third volume.

One cluster node is typically designated as the coordinator for a multi-volume operation affecting the file system object. The coordinator is typically the owner of one of the volumes involved in the multi-volume operation.

The method may additionally involve maintaining for each volume a local directory for temporarily storing references to file system objects and logical links that have been removed from a volume and replaced with a logical link to the file system object or with another logical link; and using a local directory to recover from a failure during a multi-volume operation that affects the corresponding volume.

In another embodiment of the invention there is provided an apparatus for operating as a cluster node in a file server cluster having a plurality of interconnected cluster nodes, each of which has access to a plurality of logical storage volumes, to provide access by clients, in communication with the cluster nodes, to data on the volumes. The apparatus includes a data storage volume for storing file system objects, each file system object having a unique parent file system node, the data storage volume deemed to be owned by the apparatus such that only the apparatus is permitted to write to the data storage volume; at least one directory for storing references to file system objects stored in the various data storage volumes; and object storage logic for storing file system objects in the data storage volume and for storing, in the at least one directory, logical references to file system objects stored in data storage volumes owned by other cluster nodes for which the apparatus is considered to be the parent node and hard references to file system objects stored in the data storage volume for which another node is considered to be the parent node. Each of the logical references typically includes a logical identifier for accessing the corresponding file system object stored in a data storage volume owned by another node, and each of the hard references typically includes a logical identifier for accessing the corresponding file system object by the corresponding parent node. The object storage logic typically stores the file system objects in the data storage volume and stores the references in the at least one directory while placing a write-lock on no more than one volume at a time, so that multi-volume locking is avoided. The object storage logic may be assigned the role of write-lock manager for the various data storage volumes in the course of performing such operations. The at least one directory typically includes a relocation directory, having a hierarchical structure, for storing the hard references. The object storage logic typically assigns the logical identifier for each hard reference so that each such logical identifier is unique within the data storage volume. The object storage logic typically assigns the unique identifier based on the count of previously assigned logical identifiers for file system objects in the data storage volume. The object storage logic typically permits reads to the data storage volume to be made by any of the nodes.

The apparatus may include a node cache and a volume cache associated with the data storage volume. The object storage logic typically handles a request to read a sector in a data storage volume owned by another node by issuing a first read request, for the sector, with a read-only lock to the other node and a second read request, for the sector, to the data storage volume owned by the other node. The object storage logic typically handles a read request, for a sector in the data storage volume, with a read-only lock, by determining whether the sector is stored in the volume cache; if not, granting the read-only lock and satisfying the request; if so, and if the sector is not write-locked, granting the read-only lock and sending the sector content from cache; and if so, and if the sector is write-locked, stalling affirmative action on the request until the read-only lock can be granted and then resuming processing as for when the sector is not write-locked. The object storage logic typically records the identity of the other node and of the sector upon granting the read-only lock, so that caching states may be tracked.

Each logical reference typically references a corresponding entry in a relocation directory of a data storage volume in another node. Each logical reference typically includes a numeric value that encodes a numeric string representing a name of the referenced file system object in the relocation directory of the data storage volume in the other node.

The object storage logic typically maintains, for each logical reference to a directory (not to a file), a reference back to the corresponding virtual parent node. The reference back to the corresponding virtual parent node may include a volume identifier associated with the data storage volume where the virtual parent node resides. As an alternative, the reference back to the corresponding virtual parent node may include a variable-length pathname to the directory containing the logical reference in the data storage volume in the virtual parent node. The object storage logic may store the reference back to the corresponding virtual parent node in the i-node that implements the logically referenced file system object. The object storage logic may store a mapping table between <referenced volume ID, referenced e-number> pairs and i-node numbers for the logically referring directory as a separate file system object in the data storage volume. The mapping will be performed strictly in the context of the referencing volume and exhaustive scanning of the logical references in the volume will be able to reconstruct the mapping table, without any access to foreign volumes, whenever appropriate.

The object storage logic may create a new file system object by storing a new file system object in the data storage volume; assigning a logical identifier for a hard reference to the new file system object; storing the hard reference to the new file system object in the at least one directory; and providing the logical identifier to another cluster node for creating a logical reference to the new file system object by a data storage volume owned by the other cluster node.

The object storage logic may delete a file system object referenced from an external volume from a volume for which the apparatus is considered to be the owner cluster node by deleting the hard reference to the file system object from the at least one directory. This may cause the actual deletion of the file system object if the hard reference is the only outstanding hard reference to the node. The object storage logic may cause the corresponding virtual parent node to delete the logical reference to the deleted file system object.

The object storage logic may delete a file system object for which another node is considered to be the parent node by deleting the logical reference to the deleted file system object from the at least one directory.

The object storage logic typically deletes the hard reference for a file system object that no longer exists in the data storage volume, for example, using a scavenger process for examining the hard references from time to time to determine whether the file system objects they reference exist.

The object storage logic typically deletes the logical reference for a file system object that no longer exists in a data storage volume of another node, for example, using a scavenger process for examining the logical references from time to time to determine whether the file system objects they reference exist.

The object storage logic may relocate a file system object stored in the data storage volume to another node by assigning a logical identifier for a hard reference to the file system object; storing the hard reference to the file system object in the at least one directory; and providing the logical identifier to the other node for creating a logical reference to the file system object by a data storage volume owned by the other node.

The object storage logic may relocate a file system object stored in a data storage volume of another node by obtaining a logical identifier from the other node; and storing in the at least one directory a logical reference including the logical identifier.

The apparatus typically includes at least one cache for storing a copy of data relating to file system objects stored in other nodes, and the object storage logic typically invalidates the copy of data relating to a particular file system object upon learning that the file system object was modified by the node in which the file system object is stored. The object storage logic typically reacquires the data relating to the file system object. The at least one cache may include a metadata cache for storing a copy of metadata associated with a file system object, in which case the object storage logic may operate the metadata cache independently of any other cache used for storing a copy of file system object data, and may require another node to obtain a read lock before reading metadata relating to a file system object stored in the data storage volume. The at least one cache may include a data cache for storing file system object data and a metadata cache for storing metadata, in which case the object storage logic typically maps each datum in the data cache to corresponding metadata in the metadata cache.

The object storage typically maintains, for each file system object stored in the data storage volume, a list of other nodes having a copy of data relating to the file system object and to notify each such other node upon modifying a particular file system object.

The at least one directory typically includes a local undo directory, and the object storage logic temporarily stores in the local undo directory references to file system objects and logical references that have been replaced with a logical reference or another logical reference and to use the local undo directory to recover from a failure during a multi-volume operation that affects the data storage volume.

In another embodiment of the invention there is provided an apparatus for operating as a cluster node in a file server cluster having a plurality of interconnected cluster nodes, each of which has access to a plurality of logical storage volumes, to provide access by clients, in communication with the nodes, to data on the volumes. The apparatus includes a data storage volume for storing file system objects, each file system object having a unique parent node, the data storage volume deemed to be owned by the apparatus such that only the apparatus is permitted to write to the data storage volume; at least one directory for storing references to file system objects stored in the various data storage volumes; and means for maintaining file system objects across multiple volumes including means for storing in the at least one directory hard references to file system objects stored in the data storage volume for which another node is considered to be the parent node; and means for storing in the at least one directory logical references to file system objects stored in data storage volumes owned by other cluster nodes for which the apparatus is considered to be the parent node.

The apparatus may also include means for creating a file system object across multiple volumes.

The apparatus may also include means for deleting a file system object across multiple volumes.

The apparatus may also include means for relocating a file system object from one volume to another volume.

The apparatus may also include means for renaming a file system object across multiple volumes.

The apparatus may also include means for controlling access to file system objects across multiple volumes including means for reading from a file system object owned by another node; means for writing to a file system object owned by another node; means for providing read access by another node to a file system object owned by the apparatus; and means for providing write access by another node to a file system object owned by the apparatus. The apparatus may also include means for caching file system object data owned by another node and means for caching metadata related to a file system object owned by another node.

The apparatus may also include means for manipulating a file system object across multiple volumes while placing a write-lock on no more than one volume at a time, so that multi-volume locking is avoided.

The apparatus may also include means for recovering from failures affecting the file system objects that occur across multiple volumes.

In another embodiment of the invention there is provided an apparatus comprising a computer readable medium having embodied therein a computer program for operating a cluster node in a file server cluster having a plurality of interconnected cluster nodes, each of which has access to a plurality of logical storage volumes, to provide access by clients, in communication with the nodes, to data on the volumes. The computer program includes program code means for maintaining file system objects across multiple volumes including program code means for storing in at least one directory of the cluster node hard references to file system objects stored in a data storage volume owned by the cluster node for which another node is considered to be a parent node; and program code means for storing in the at least one directory logical references to file system objects stored in data storage volumes owned by other cluster nodes for which the cluster node is considered to be the parent node.

The computer program may also include program code means for creating a file system object across multiple volumes.

The computer program may also include program code means for deleting a file system object across multiple volumes.

The computer program may also include program code means for relocating a file system object from one volume to another volume.

The computer program may also include program code means for renaming a file system object across multiple volumes.

The computer program may also include program code means for controlling access to file system objects across multiple volumes including program code means for reading from a file system object owned by another node; program code means for writing to a file system object owned by another node; program code means for providing read access by another node to a file system object owned by the apparatus; and program code means for providing write access by another node to a file system object owned by the apparatus. The computer program may also include program code means for caching file system object data owned by another node and program code means for caching metadata related to a file system object owned by another node.

The computer program may also include program code means for manipulating a file system object across multiple volumes while placing a write-lock on no more than one volume at a time, so that multi-volume locking is avoided.

The computer program may also include program code means for recovering from failures affecting the file system objects that occur across multiple volumes.

In another embodiment of the invention there is provided a method for maintaining metadata related to a file system object by a cluster node in a file server cluster having a plurality of interconnected cluster nodes, each of which has access to a plurality of logical storage volumes, to provide access by clients, in communication with the nodes, to data on the volumes. The method involves maintaining, for each node, a data cache for storing file system object data; maintaining, for each volume, a separate metadata cache for storing metadata; storing, for each node, file system object data obtained from other nodes in the data cache; and storing, for each volume, metadata obtained from other nodes in the metadata cache.

The method may involve operating the metadata cache as a slave of the data cache. Operating the metadata cache as a slave of the data cache may involve mapping each datum in the data cache to corresponding metadata in the metadata cache. Operating the metadata cache as a slave of the data cache may involve obtaining metadata associated with a file system object by a node from another node by requesting a read lock for reading metadata stored in the other node and reading the metadata from the other node only after being granted the read lock. Operating the metadata cache as a slave of the data cache may involve maintaining, by a node, a list of any other nodes having a read lock on a file system object owned by the node; and modifying the file system object by the node by causing all read locks to be relinquished and modifying the file system object only after all read locks are relinquished.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

1 Introduction

Figure 1:
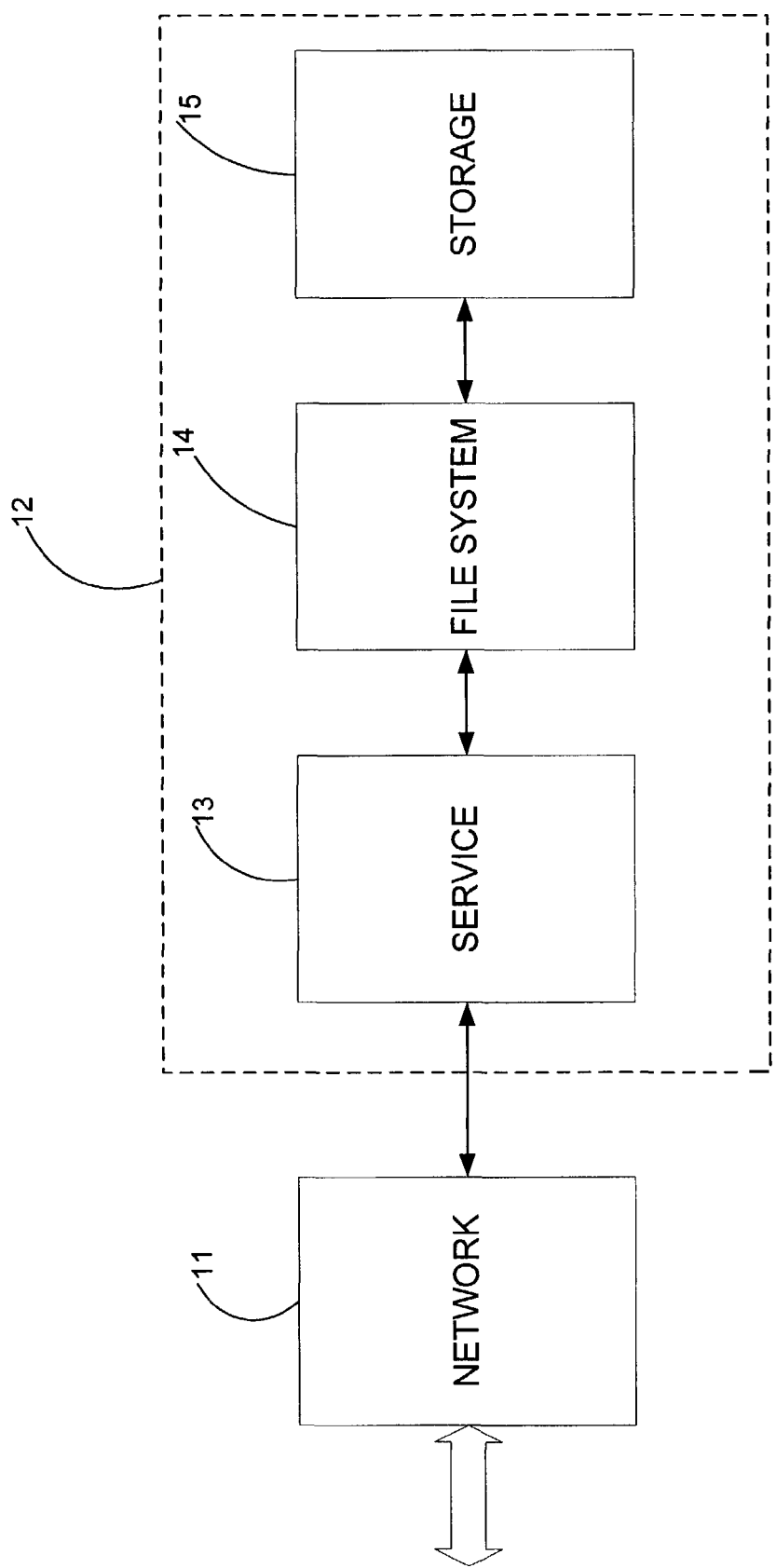
FIG. 1 is a block diagram of an embodiment of a file server to which various aspects of the present invention are applicable.

Embodiments of the present invention provide a file system clustering solution. Key components of a file system cluster include the individual servers that are interconnected to implement the cluster and that perform the processing of the client requests they receive (nodes), and the individual file system partitions managed as single entities (volumes).

1.1 Definitions

As used in this description and the accompanying claims, the following terms shall have the meanings indicated, unless the context otherwise requires:

CDM Configuration Database Module: a replicated, cluster-wide, always-on configuration database.

FSM File System Module: a module devoted to managing the file system APIs and data structures.

FSO File System Object: any object that can be individually referenced within a file system.

IHM Interconnect Hardware Module: this is the module that provides the basic datagram mechanism with both unreliable and reliable, in-order message delivery.

IMF Inter-node Messaging Facility: provides reliable messaging delivery and heartbeating.

LUD Local Undo Directory: special directory available in each volume and invisible to clients, where file system objects replaced by the creation of a new squidgy link (see below) are temporarily saved to ease recovery.

MM Messaging Module: provides unicast/multicast, synchronous/asynchronous messaging primitives and event handling.

NIM Network Interface Module: a hardware module devoted to dealing with the network interface, by providing support for the TCP/IP front-end.

PN Physical Node: a node that provides the physical infrastructure where cluster code is executed and that supports the Virtual Node (VN) abstraction. A PN has a physical name and a physical IP address. PNs carry out the services expected of VNs, by being "bound" to VNs. A PN can be bound to multiple VNs.

QM Quorum Module: provides the cluster quorum mechanism, as well as the cluster join/leave mechanisms. The actual cluster membership information is kept within the IMF.

RD Relocation directory: a special directory existing in all volumes that is hidden from clients and is used to contain FSOs referenced through squidgy links.

SAN Storage Area Network.

SIM Storage Interface Module: a hardware module devoted to managing the sector cache and to interact with the SAN backend.

SL Squidgy Link: a link that acts as a hard link but can point across file system volumes.

VN Virtual Node: a logical abstraction that encompasses a virtual IP address, a virtual node name, some resources (mainly storage volumes), and possibly a collection of services. Each VN is associated with a PN, and multiple VNs can be associated with the same PN.

VPD Virtual Parent Directory: a directory that contains an SL to a directory in a different volume. It must behave as the latter's parent directory, although it is not its physical parent.

WFS VLSI File System: this module is the VLSI implementation of the File System support functions. This is not exactly an acronym, but the original VFS acronym was changed to WFS to avoid ambiguities with the Virtual File System layer in Unix systems.

"Data storage system" may be any suitable large data storage arrangement, including but not limited to an array of one or more magnetic or magneto-optical or optical disk drives, solid state storage devices, and magnetic tapes. For convenience, a data storage system is sometimes referred to as a "disk" or a "hard disk".

A "hardware-implemented subsystem" means a subsystem wherein major subsystem functions are performed in dedicated hardware that operates outside the immediate control of a software program. Note that such a subsystem may interact with a processor that is under software control, but the subsystem itself is not immediately controlled by software. "Major" functions are the ones most frequently used.

A "hardware-accelerated subsystem" means one wherein major subsystem functions are carried out using a dedicated processor and dedicated memory, and, additionally (or alternatively), special purpose hardware; that is, the dedicated processor and memory are distinct from any central processor unit (CPU) and memory associated with the CPU.

"TCP/IP" are the protocols defined, among other places, on the web site of the Internet Engineering Task Force, at www.ietf.org, which is hereby incorporated herein by reference. "IP" is the Internet Protocol, defined at the same location.

A "file" is a logical association of data.

A protocol "header" is information in a format specified by the protocol for transport of data associated with the user of the protocol.

A "SCSI-related" protocol includes SCSI, SCSI-2, SCSI-3, Wide SCSI, Fast SCSI, Fast Wide SCSI, Ultra SCSI, Ultra2 SCSI, Wide Ultra2 SCSI, or any similar or successor protocol. SCSI refers to "Small Computer System Interface," which is a standard for parallel connection of computer peripherals in accordance with the American National Standards Institute (ANSI), having a web URL address at www.ansi.org.

Reference to "layers 3 and 4" means layers 3 and 4 in the Open System Interconnection ("OSI") seven-layer model, which is an ISO standard. The ISO (International Organization for Standardization) has a web URL address at www.iso.ch.

"Metadata" refers to file overhead information as opposed to actual file content data.

"File content data" refers to file data devoid of file overhead information.

"Write" refers to an operation that modifies the content of the data or metadata of a given storage volume.

1.2 References

The following references, all of which are hereby incorporated herein by reference, are cited throughout this description using the reference in brackets:

[Karamanolis 2001] Karamanolis, C., Mahalingam, M., D., Zhang, Z., "DiFFS: A Scalable Distributed File System", HP Laboratories Palo Alto, Jan. 24, 2001.

[Thekkath 1997] Thekkath, C. A., Mann, T., Lee, E. K., "Frangipani: A Scalable Distributed File System", In Proceedings of the 16$^{th}$ ACM Symposium on Operating Systems Principles, October 1997.

[Levy 1990] Levy, E., Silberschatz, A., "Distributed File Systems: Concepts and Examples", ACM Computing Surveys, Vol. 2, No. 4, December 1990.

[Preslan 1999] Preslan, K. W., et al., "A 64-bit, Shared Disk File System for Linux", Sixteenth IEEE Mass Storage Systems Symposium, Mar. 15-18, 1999, San Diego, Calif.

[Cisco 1999] Cisco, "The CISCO Dynamic Feedback Protocol—White Paper", 1999.

[Alteon 1999] Alteon, "The Next Step In Server Load Balancing—White Paper", 1999.

[Pai 1998] Pai, V. S., et al. "Locality-Aware Request Distribution in Cluster-Based Network Servers", 8$^{th}$ International Conference on Architectural Support for Programming Languages and Operating Systems (ASPLOS-VIII), San Jose, Calif., October 1998.

[Cherkasova 2000] Cherkasova, L., "FLEX: Load Balancing and Management Strategy for Scalable Web Hosting Service", in Proceedings of the Fifth International Symposium on Computers and Communications (ISCC'00), Antibes, France, Jul. 3-7, 2000, p. 8-13.

[Microsoft 1999] Microsoft, "Microsoft Windows NT Load Balancing Service—White Paper", 1999.

[Cheriton 1999] Cheriton, D., "CS244B—Distributed Systems Course Reader", Volume 1, Stanford University, 1999.

[Davis 1993] Davis, Roy G., "VAXCluster Principles", Digital Press, 1993, ISBN 1-55558-112-9.

[GarciaMolina 1982] Garcia-Molina, Hector, "Elections in a distributed computer system", IEEE Transactions on Computers, C-31(1):47-59, January 1982.

[HalpernMoses 1986] Halpern J., Moses Y., "Knowledge and Common Knowledge in a Distributed Environment", IBM Research Journal 4421, 1986.

[Microsoft 1997] Microsoft Corp., "Microsoft Windows NT Clusters," White Paper, 1997. NOTE: As of 2002, Microsoft Corp. has renamed this paper as "Microsoft Exchange 5.5 Windows NT Clustering White Paper". It can be found at the following URL: http://www.microsoft.com/exchange/techinfo/deployment/2000/clusters.doc

[Mullender 1993] Mullender, S. (Editor), "Distributed Systems", 2" Edition, Addison-Wesley, 1993, ISBN 0-201-62427-3.

[Pfister 1998] Pfister, G., "In search of Clusters", Revised Updated Version, Prentice Hall Inc., 1998, ISBN 0-13-899709-8.

[Siemens 2001] Siemens Inc., "PRIMECLUSTER—Concepts Guide", 2001.

[Sistina 2001] Sistine Inc., "GFS Howto", 2001.

[Stoller 1997] Stoller, Scott D., "Leader Election in Distributed Systems with Crash Failures", Ind. University CS Dept., 1997.

[Sun 1996] Sun Microsystems Inc., "Solstice HA 1.2 Software Administration Guide", Appendix C, 1996.

[Sun 2000] Sun Microsystems Inc., "Sun Cluster 3.0 Concepts", Part Number 806-1424, Revision A, NOVE-2000.

[Tanenbaum 1996] Tanenbaum, A., "Computer Networks", Third Edition, Prentice Hall Inc., 1996, ISBN 0-13-349945-6.

1.3 Exemplary File Server Architecture

Pertinent to subject matter described herein is commonly-owned U.S. patent application Ser. No. 10/286,015 (U.S. Pat. No. 7,457,822) entitled "Apparatus and Method for Hardware-Based File System," which was filed on even date herewith in the names of Geoffrey S. Barrall, Simon L. Benham, Trevor E. Willis, and Christopher J. Aston, and is hereby incorporated herein by reference in its entirety.

Figure 3:
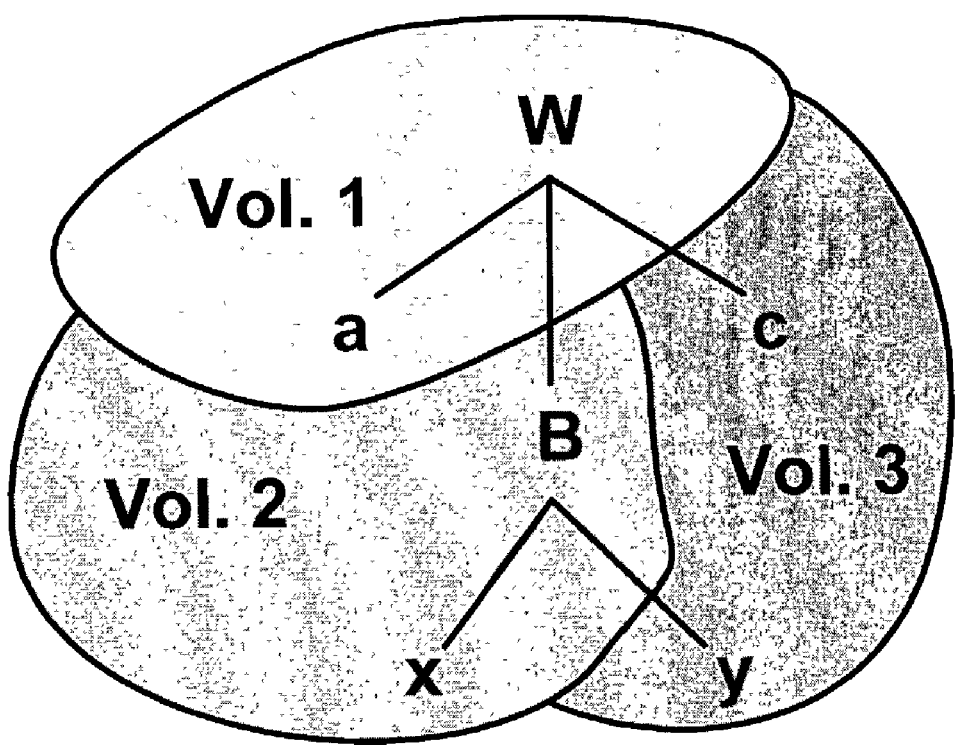
FIG. 3 is a diagram depicting a single file system image supported across multiple volumes in accordance with an embodiment of the present invention.

FIG. 1 is a block diagram of an embodiment of a file server to which various aspects of the present invention are applicable. A file server of this type is described in PCT application publication number WO 01/28179 A2, published Apr. 19, 2001, entitled "Apparatus and Method for Hardware Implementation or Acceleration of Operating System Functions"—such document, describing an invention of which co-inventors herein are also co-inventors, is hereby incorporated herein by reference. The present FIG. 1 corresponds generally to FIG. 3 of the foregoing PCT application. A file server 12 of FIG. 1 herein has components that include a service module 13, in communication with a network 11. The service module 13 receives and responds to service requests over the network, and is in communication with a file system module 14, which translates service requests pertinent to storage access into a format appropriate for the pertinent file system protocol (and it translates from such format to generate responses to such requests). The file system module 14, in turn, is in communication with a storage module 15, which converts the output of the file system module 14 into a format permitting access to a storage system with which the storage module 15 is in communication. The storage module has a cache for file content data that is being read from and written to storage. As described in the foregoing PCT application, each of the various modules may be hardware implemented or hardware accelerated.

Figure 2:
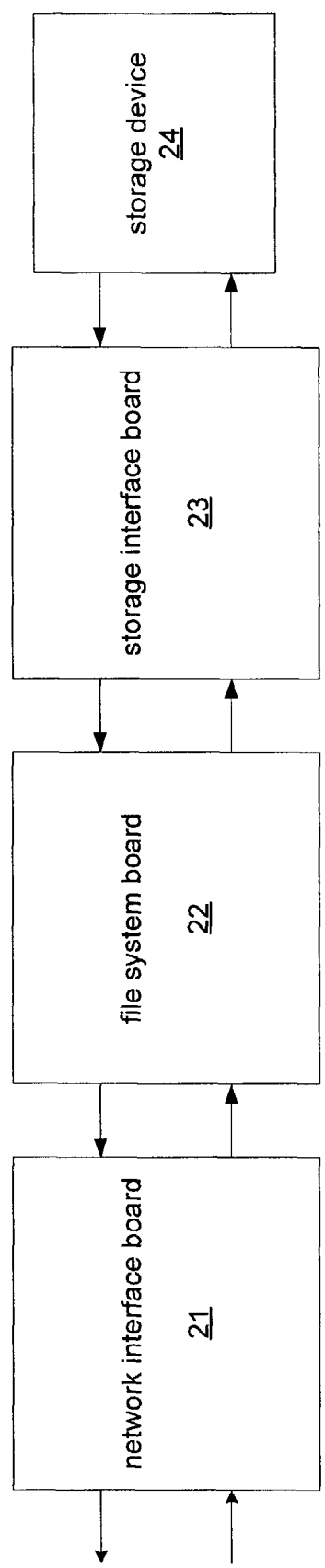
FIG. 2 is a block diagram of an implementation of the embodiment of FIG. 1.

FIG. 2 is a block diagram of an implementation of the embodiment of FIG. 1. In this implementation, the service module 13, file system module 14, and storage module 15 of FIG. 1 are implemented by network interface board 21, file system board 22, and storage interface board 23 respectively. The storage interface board 23 is in communication with storage device 24, constituting the storage system for use with the embodiment. Further details concerning this implementation are set forth in U.S. application Ser. No. 09/879,798, filed Jun. 12, 2001, entitled "Apparatus and Method for Hardware Implementation or Acceleration of Operating System Functions," which is hereby incorporated herein by reference.

1.4 Types of Clusters

Generally speaking, there are two types of clusters:

1. N+1 HA (Failover) Clusters. In these types of clusters, the application or service (the word "application" is used hereinafter as a synonym for "service" when applied to a special purpose device, such as a NAS head) tends to run in "active" mode on one node and in "standby" mode on another node. These types of clusters provide for availability, but not for scalability (although there is not always a clear distinction between availability and scalability).

2. Parallel Clusters. In these types of clusters, the application or service runs in a distributed manner on two or more cluster nodes. This provides for both availability and scalability.

The exemplary file system clustering solutions described below are based on the parallel cluster model, and are expected to scale performance with respect to the number of cluster nodes (within limits) and to be highly available (HA) so that file system objects (FSO) will remain accessible regardless of possible crashes of one or more members of the cluster. On the other hand, the exemplary file system clustering solutions described below are neither expected to provide general-purpose computer clusters, capable of running applications, nor fault-tolerant platforms. It should be noted that these criteria represent requirements placed upon specific embodiments of the invention, and are not limitations of the invention as a whole.

1.5 Issues

The main issues discussed below are:

An indication of the capabilities to be provided by the proposed clustering solution, along with a list of limitations and inherent constraints and expectations in terms of both performance and availability.

Key technical issues to be addressed by the solution, namely:

Which cluster nodes manage which components of the clustered file system and how the clustered global name space is aggregated.

How the various types of requests (read accesses, modifications) are handled within the cluster, to enhance performance.

How the monitoring of the clustered nodes is performed, in order to diagnose failure and provide high availability.

How the take-over of the storage volumes managed by a failed node occurs.

How the cluster is managed and configured.

Various components for an exemplary implementation.

The subsequent sections describe exemplary embodiments of the present invention in more detail. Section 2 addresses requirements and potential boundaries of a solution. Section 3 outlines a detailed solution. Section 4 addresses various implementational issues. Section 5 presents a formal fault analysis of multi-volume operations.

2 Requirements and Overall Architecture

This section outlines requirements in more detail. It also outlines basic architectural choices, as well as some of the key technical issues to be addressed.

2.1 Requirements

On the basis of the previous discussion, the requirements to be met by this architecture are the following:

1. The described solution is targeted for a particular file server of the type described above in section 1.3, although the present invention is in no way limited thereto, and it will be apparent that the various elements discussed herein can be applied to file server clusters generally.

2. The aggregated performance achievable with a clustered solution is to be such that quasi-linear scaling will occur, with respect to the number of nodes that are part of the cluster. Note, however that the goal of the solution is not unbounded scalability, since it is expected that the maximum number of nodes to be clustered will be limited.

3. The clustering scheme is to provide high availability. This should include the accessibility of any FSO in the logical volumes managed by the cluster. The availability for such a system will have to be no less than 0.99999 (sometimes referred to as the "five 9's" criterion). This in turn entails detection of cluster node failures and subsequent recovery to be performed by limiting the downtime to about 5 minutes per year.

4. An implicit consequence of the high availability requirement is that cluster nodes should be able to dynamically join and leave the cluster. This is particularly important for node failure and recovery, but can also be used in general to provide a more flexible environment.

5. The management and configuration of the entire cluster as a unit should be possible, as opposed to configuring each of the cluster nodes individually.

6. The file system image the cluster will provide will be made of a single tree and will be homogeneous regardless of the cluster node to which a client is connected.

7. Implementation cost/effort, as well as overall complexity, are considered in formulating a file system clustering solution.

2.2 Overall Architectural Choices

In the following, it is assumed that appropriate mechanisms (such as a front-end switch, or a static partitioning of clients to cluster nodes) will be interposed between the cluster nodes and the network (this is a logical view—in practice, if a switch is used, it will typically be duplicated in order to satisfy High Availability requirements). Its purpose is one of balancing the load among the cluster nodes. This is discussed in more detail in section 3.

It is also assumed that any of the cluster nodes will view the file system obtained through the aggregation of the logical volumes as a single entity (see requirement 6, above).

2.2.1 Possible Alternatives

Clustering solutions of the "shared nothing" nature, as implemented in the Microsoft Clustering product, are able to support the high availability (HA) requirements by providing cluster nodes that manage mutually exclusive subsets of the storage. Only in case one of the servers crashes, other servers would take over the handling of the storage volumes that are no longer available because of the crash. Of course, this keeps the design simple and increases availability.

This scheme implies that in the case of multiple concurrent accesses to the same storage volume, they all have to be funneled through the same cluster node, which then would become the bottleneck. Thus, the scheme does not provide any enhancement in terms of performance, with respect to the situation in which one is using separate servers, each dealing with its own storage volumes.

On the other hand, this type of architecture provides a fail-over capability and implements a High Availability (HA) solution. However, since a key focus of the file system clustering solution is that of increasing the scalability of the solution, with respect to performance, this approach is not particularly well-suited to embodiments of the present invention.

At the other extreme, it is possible to envision clustering schemes based on distributed file systems with fully shared volume ownership. This means that any cluster member can act upon each FSO at any one time, without any static or semi-static ownership allocation policies. Several architectures have been devised to do this. However, most of these solutions (references [Thekkath 1997] and [Preslan 1999]) are heavy-duty and complex and are based on complex distributed locking protocols, which are hard to develop, debug and deploy.

Because of requirement 7, this document describes a scheme that strikes a reasonable balance between development costs/complexity and achievable benefits, as perceived by the client applications and the end-user.

2.2.2 DiFFS

The described solution is loosely based on the DiFFS architecture (reference [Karamanolis 2001]). The DiFFS proposal greatly simplifies the issues related to distributed locking and cache consistency by devising an architecture that implements the following concepts:

1. Only one active cluster node is responsible for the changes to a file system logical volume. In the following, this node is referred to as the "volume owner".

2. Multiple cluster nodes have read access to all FSOs and are able to serve directly read requests from clients, by accessing the SAN backend.

3. A streamlined inter-node protocol is available to support intra-cluster coherency.

4. FSO references (directory links) can span logical volumes.

5. FSO relocation is available and is, in fact, used to dynamically relocate FSOs from hot spots so as to achieve better scalability.

6. Ordering in file system operations makes sure the only possible file system inconsistencies amount to "orphan" files (i.e., files that use disk space but cannot be accessed any longer, since any directory references have been removed) that will be routinely removed via asynchronous garbage collection. A full specification of the protocols involved is available.

These are not the only concepts embedded in DiFFS. However, they are the ones that have the most relevance for the subsequent discussion, since this architecture relies on the first four and, to a lesser extent, on the last two.

In the following, the term "read" will be loosely used to identify accesses to a FSO that do not cause it to be updated. Examples are file reads, directory searches and requests for file attributes or ownership information. Likewise, the term "write" will be used to identify any modification of the object. It will apply to file writes, creation and deletion of new objects, changes in attributes and so on.

2.2.3 Basic Assumptions

This architecture envisions volumes that would be fully self-contained. This means that no physical cross-references between logical volumes (such as Unix "hard links") will exist. In other words, each file system tree within a volume would have no physical pointers outside itself. Having logical volumes physically self-contained simplifies the model, makes integrity checking simpler and lends itself to an efficient implementation. In addition to this, it provides better fault-isolation (a key attribute for a highly available platform).

The apparent negative consequences of this are the following:

No references may exist from the file system within one logical volume to FSOs implemented within a different volume.

It seems impossible to expand a tree in one volume by allocating some of the FSOs in a different volume.

Note that, despite the appearance, none of these consequences is in fact true because:

As it will be shown, symbolic and a special variant of hard links can be used wherever logical links across volumes are expected to exist. The latter will in fact implement the semantics of hard links across volumes, for the benefit of NAS clients. The semantics of symbolic links and that of the special hard links is such that cross-volume references do not have impact on the file system integrity rules.

As it will be shown, space limitations on individual volumes can in fact be overcome by simply allocating new file system objects within other volumes.

Note that since this architecture supports a single file system image (see FIG. 3) across multiple volumes and, because of the issues just discussed, although this clustering scheme does not implement a single huge volume, it appears to and retains all of the useful attributes of such a scheme.

In most practical cases, it is assumed that each cluster node will manage at least one of the volume that implement the global file system. So, the typical minimum number of volumes is equal to the number of cluster nodes. Note however that this is not a strict requirement of this architecture and that the number of cluster nodes can be greater, equal or less than the number of the volumes the form the clustered file system.

Based on DiFFS criterion 1, individual volumes are owned by a single cluster node. Such owner nodes are the only ones allowed to modify the content of the volume. However, based on criterion 2, all nodes are allowed to access any volume in read-only mode. This implies that all read accesses to a volume can be performed in parallel, whereas any modifications to a volume have to go through its owner node.

In addition to the above, this architecture divorces the logical pathname used to reference a given FSO from the actual location where the FSO physically resides. As it will be seen, this ability allows the cluster architecture to provide high throughput.

The above choices have some relevant implications. By funneling all modification requests for a given logical volume to the volume owner, it is clear that this can potentially become a bottleneck. The obvious resulting advantages are the streamlining of the protocol and the reduction in complexity. However, in evaluating how much of an impact on performance this might have, it is certainly appropriate to expect that the great majority of the traffic would in fact be made of read operations. This has to be qualified further for the following reasons:

1. Caching implemented on the client side makes it possible to satisfy read requests from the client-side cache. This in fact tends to reduce the actual unbalance between reads and writes, in favor of writes.

2. Reads are synchronous, writes mostly asynchronous. Thus, since any cluster node can directly process reads, good response time can be expected.

3. Read operations have the side effect that the access time for the i-node that represents the FSO being accessed has to be updated. The i-node is the equivalent of a file record in Windows NT, and is the file system data structure that stores the metadata information for the file system object it describes. This side-effect would in fact turn any read operation into a write operation that would have to be handled by the logical volume owner. This is extremely undesirable, as it would effectively transform all read accesses into write accesses and would turn this scheme into a severe bottleneck.

However a way out relies on a less stringent criterion in updating the i-node access time and the use of lightweight, asynchronous calls to the volume owner. This could be done in such a way that access times would exhibit "session semantics" (reference [Levy 1990]):

a. The access time in the copy of the i-node in the local cache could be modified, without invalidating it.

b. A notification would then be sent to the volume owner to do the same and to mark the i-node as dirty (without requesting a flush).

c. The master copy of the i-node would accumulate the changes and would be flushed when appropriate, thus invalidating all of its cache copies throughout the cluster.

3 The Clustering Framework

The issues outlined in the previous section provide at least an overall framework for discussion. However, they barely scratch the surface of the problems to be analyzed in detail. This section looks at some of the specific problems to be addressed.

The underlying assumptions in this architecture are the following ones:

1. It is assumed that an appropriate load-balancing mechanism is available to partition the clients of the cluster among the cluster nodes. This functionality might be implemented through a switch, with the partitioning done in terms of the identity of the users (more on this ahead). Load balancing is discussed further in section 4.1.

2. A high-speed interconnection among the cluster nodes will be available. This will be used to support intra-cluster cache coherency and replication, as well as to relay operational requests and deliver replies to other cluster nodes. The intra-cluster interconnect is discussed further in section 4.2.

3. High-availability modules will be in charge of guaranteeing the redundancy of the system and its continuous operation.

The following subsections describe the architecture in greater detail.

3.1 The Architecture

A detailed description of the architecture requires an explanation of the structure of the file system namespace, of caching, and of locking.

3.1.1 The Namespace

As it will be clear after reading the rest of this document, the architecture defined here allows one volume to act as the root of the entire file system. All other directories and files could be allocated within other volumes but would be referenced through pathnames starting at such a root. This is elegant, simple and adequate for the typical needs of the clients of this architecture.

After the cluster is set up, if one wishes to add a previously independent cluster (or previously standalone unit) to it, the net result would be that all the pathnames in the added node/cluster would have to change since they would have to be based off the new cluster root. However, shares, exported mount point and cross-volume links can avoid this.

Each volume in the cluster should be identified through a unique numeric ID, called: "volume-ID". This unique ID should not be reused, ever.

The act of making a volume accessible through the global file system hierarchy is known as "mounting".

The mount order for the individual volumes will only be relevant in that an index number shall be assigned to each volume with respect to the order in which it was mounted ("mount index"). This index is valid until the volume is unmounted and is used to implement a total order relation among the volumes. This might be useful in case it is necessary to lock multiple FSOs residing in different volumes by increasing mount index values to eliminate circularities and prevent possible deadlocks.

Logical volumes are self-contained, meaning that no physical cross-references between logical volumes need exist. In other words, despite the fact that a global root volume may or may not actually lump together all the trees in the forest supported by the cluster, each tree has no pointers outside itself. Note that symbolic links (and the "squidgy links" introduced below) implement the ability to point to FSOs external to a volume. However, this is not done in terms of physical storage, but rather in terms of symbolic references. Therefore, such pointers are subject to interpretation in the appropriate context and do not violate the criterion of keeping volumes self-contained (this is a major departure from the Scheme implemented in DiFFS). This attribute of having logical volumes entirely self-contained simplifies the model, makes integrity checking simpler and lends itself to an efficient implementation.

So, despite the fact logical volumes are self-contained, cross-volume references will be available in the form of symbolic links and a variant of hard links named "squidgy links." The latter fully implement the hard link semantics across volumes for NAS clients. They are defined in subsection 3.1.2.1, below.

Because of the above, this clustering scheme is able to implement the single file system image semantics across multiple volumes. Note that logical hierarchies like the one depicted in FIG. 1, are beyond the capabilities of pure nesting of mounted volumes, yet they are well within the reach of the architecture described here. For example, file "C" and "y" are part of the same volume, yet they are not part of a common subtree.

3.1.2 Local and Foreign References

A design like the one that is described here simplifies the problem of managing the logical volume updates, since it assigns the role of "Volume Owner" to just one cluster node for each logical volume, in a semi-static fashion (i.e., from the time the node joins the cluster until the node leaves the cluster for whatever reason, such as a shutdown or crash). At the same time, it requires non-mutually-exclusive caching across cluster nodes. This is so because, even though only one node is the logical volume owner, multiple nodes may concurrently access a volume for reading. Thus, the main resulting problem is one of making sure that data read in through the SAN backend and cached within a node with read-only access does not become stale with respect to modifications being carried out by the logical volume owner. This will be dealt with in detail in the section about caching and locking.

Whenever incoming requests from a client are processed, it is necessary to distinguish between "local" references and "foreign" references. Local references are I/O requests addressed to logical volumes whose owner is the recipient of the request. Foreign references are requests that are addressed to logical volumes whose owner is not the recipient of the request.

Early on in the processing of these requests, the code must distinguish between the two cases. Moreover, foreign requests must also be discriminated depending on whether they are of the read or of the write type. The following is a summary of the actions to be taken in each case:

For a local read or write, carry out the request directly.

For a foreign read, carry out the request directly.

For a foreign write, redirect the request to the volume owner.

The negative characteristics of this design are the following ones:

It does not scale well when workloads are dominated by foreign write accesses to one volume, because in such cases volume owners could become the bottleneck. Possible user scenarios where something like this could be possible are the following ones:

The case in which multiple clients will be very active in "write" operations within the same volume.

The case in which lots of files in the same volume are multiply edited by different clients.

The content of the SIM (Storage Interface Module—the system board that interfaces the SAN backend and hosts the sector cache) cache gets replicated across all the nodes that are accessing the same sectors. This somewhat limits the overall effectiveness of the aggregated cluster cache. Although this negative attribute is present in this design, it is shared by most cluster designs.

On the positive side:

Read operations are effectively handled in parallel across cluster nodes, regardless of the volume involved in the request.

Although the actual write operations within the file system have to be carried out by the volume owner, most of the protocol processing is performed within the node that receives the requests. This limits the load on the volume owner.

The rule on the owner of a volume being the only node allowed to update the volume content greatly simplifies the file system architecture, since it need not be based on a distributed design. This lowers the development costs and the risks involved.

However, by divorcing the notion of a FSO pathname from its location (i.e., the to volume the FSO resides in) it is possible to enhance the scaling of this design. This can be done through the already mentioned "squidgy links".

3.1.2.1 Squidgy Links

A squidgy link (SL, in the following) is a hybrid between a symbolic link and a hard link. It is used to provide a symbolic reference to FSOs stored in a different volume.

SLs always reference FSOs stored in a well-known directory that is available within each volume (the "relocation directory", RD in the following). This directory is hidden from the NAS clients. All the FSOs in the RD have names that encode hexadecimal values and are called: "relocated FSO." Note that such values are generated automatically when a new RD entry is created and should increase monotonically. The values will map to a 64-bit address space. The value 0 will be used as null.

SLs can be implemented by extending directory entries so as to include a volume-ID. So, "normal" directory entries (hard links) point to local FSOs anywhere in a volume and contain the local volume-ID and a local i-node number (i.e., "i-number"). SLs, on the other hand, point to a different volume-ID and the i-number is replaced by a numeric value that encodes the numeric string representing the name of the referenced FSO in the RD of the target volume. In the following, this numeric ID will be called the "external number" or "e-number." Thus, SLs are in a symbolic form and avoid the allocation of a separate i-node. By containing a symbolic reference, SLs have no physical knowledge of details of the volume they point to. By avoiding the allocation of a separate i-node, they save storage and are more efficient.

By using this approach, SLs end up having the following attributes:

They can be used to reference either a file or a directory (as symbolic links do).

On the client side, they are indistinguishable from hard links.

They only embed symbolic information. Thus they have no explicit internal knowledge of the target volume and do not violate the constraint that volumes be self-contained. For example, no knowledge exists of the i-node that supports the FSO, thus if at any time the i-number changes, this has no effect on the SL, as long as the name of the FSO in the RD stays the same.

An SL pointing to a relocated FSO does not increase the link count for the FSO. Only hard links are counted under this respect and they are always local to the volume. So, again, the integrity of a volume is not affected by what happens outside of it.

Any file can be referenced by both hard links (locally) and SLs (through appropriate hard links set up in the RD).

Each link in the RD has exactly one SL pointing to it (a given relocated file can have multiple hard links in the RD, but each such hard link can only be pointed by only one SL). This is necessary to keep the integrity of the link count for the FSO, without having to create integrity constraints across multiple volumes.

When a client deletes an SL, this should cause both the deletion of the SL entry from the directory it is in and that of the name of the FSO it references. This may or may not entail the deletion of the FSO itself, depending on the resulting FSO reference count.

An SL should not be left dangling. A dangling SL may arise temporarily if a crash occurs between the time the FSO is deleted and the referencing SL is deleted (because of the fact that the SL references an FSO on a volume that is not the one where the link resides), although dangling links will cause no harm, will remain invisible to clients, and will be removed as soon as they are detected, if they are handled as explained. An SL, like a symbolic link, may in fact point to an object that does not exist. This may occur on a temporary basis, for example before the volume the SL references is mounted. The node that detects a permanent dangling link (the volume is accessible, but the leaf is inaccessible) should take care of it by removing the SL.

The "separation of concerns" among volumes supports the following:

Enforcement of volume integrity and consistency is much easier and system integrity checkers can be run in parallel over different volumes.

Fault isolation is much better and the catastrophic failure of a volume would not take down the entire file system. Rather it would make the files and directories in the failed volume inaccessible.

The use of SLs enables the usage of one or more cluster nodes as pure metadata servers for the directory information. This can be meaningful in certain application scenarios and can be obtained by assigning no user connections to the node or nodes that should only deal with the directory hierarchy.

SLs allow divorcing pathnames from actual FSO locations. Because of this, it may happen that, as a result of node faults, either SLs end up pointing to inexistent FSOs on other volumes or that FSOs created in the RD are in fact orphans, by no longer being referenced through an SL. Note that these are not catastrophic failures, in that they cause some storage space to be temporarily wasted, but they do not compromise the integrity of the volumes themselves. Thus they do not inhibit volumes from being remounted after a fault. At the same time, it is desirable to remove such possible inconsistencies. This can be done on the fly, as such dangling references are detected by the file system.

In addition to this, special scavenger processes can accomplish this by asynchronously removing such inconsistencies in the background, as the volumes (whose integrity can be checked individually) are being used. There is enough information redundancy to detect the fact that either a relocated FSO should be deleted or its should be reconnected to the owning SL. Permanently dangling SLs will be detected when accessed and will be reported as a "file not found" error and will be removed as needed. Such scavenging will be performed in a directed fashion in case of system crashes in that it will only be applied to FSOs being modified at the time the crash occurred.

In addition to this, there are some other behavioral rules that must apply to SLs, in order to make full use of them in the cluster architecture. This will be discussed in the following subsection. Also, SLs can fully generalize the notion of hard links for cross-volume references, as described in the subsequent section and in section 3.1.2.1.2, below.

3.1.2.1.1 Squidgy Links and Directories

When the creation of SLs to directories is enabled, to make sure SLs behave strictly as hard links to the clients, it is necessary to handle the " . . . " directory entry correctly. This implies that " . . . " should be always mapped to the directory that contains the SL (the "Virtual Parent Directory", or VPD), rather than to the RD containing the entry (the physical parent).

Since there can only be a single link (hard or SL) pointing to a directory, the directory itself can have only one VPD. Thus, it is possible to embed a reference to the VPD within the directory i-node. This reference will be identified as the "VPD backlink".

The easy way to do this would be that of embedding the volume ID and the i-number in the referenced directory i-node. However, by doing this, specific information of a volume would be embedded within another one, which is something that should be avoided. Thus, it is better to proceed according to one of the following ways:

1. By using a file stored in the referencing volume, that supplies the necessary mapping, as follows:
   The relocated directory i-node stores the volume-ID of the referencing VPD, as well as the e-number for the RD link that identifies the directory itself. Note that since the object is a directory, it can only have one link, in addition to: " . . . " and " . . . ". Thus a single e-number need be stored.
   Each volume provides a system file that stores the association between the local i-number of the directory that contains the VPD and the <volume-ID, e-number> pair that identifies the relocated directory. Let's call this the "backlink file". Note that this file only stores information based on data related to the local volume and can be checked or reconstructed through a scan of the local volume only.
   When a relocated directory i-node is cached, the " . . . " entry can be resolved through the volume-ID in the relocated directory i-node, the e-number of the relocated directory and the backlink file in the appropriate volume, by indexing it via the <volume-ID, e-number> of the relocated directory. The resulting <volume-ID, i-number> pair for the parent directory can then be cached (this is not stored on disk).
   When an access to " . . . " is attempted, this can be trapped and the cached reference can be returned.
2. By placing the VPD backlink inside the referenced directory i-node as a pathname. This saves the need to have a separate file, simplifies updates and reduces the number of indirections. On the other hand it needs to embed a variable-length pathname within the i-node and requires a full pathname lookup to get to the VPD. Although this is logically simpler and requires a single object to be updated to keep the reference to the VPD, it has the significant drawback that in case the VPD (or any directory in its pathname) is renamed, all the relocated directories that have that component as part of the stored VPD backlink, need be updated as well. This may be an expensive operation.

The first approach is a bit more complex. However, since it has no impact on renames, this is preferable. It is not expected that this will cause significant performance penalties, since the lookup of VPDs should be a relatively infrequent operation. However, should this be the case, appropriate strategies can be devised, by implementing a hybrid scheme that stores pathnames within the directory i-nodes (as in scheme 2) as a hint and relies on the first approach, should the hint be invalid.

Note that this scheme only performs the caching when the relocated directory is accessed and does not embed foreign volume information within i-nodes.

3.1.2.1.2 Squidgy Links and Cross-Volume References

Once the concept of an SL is defined, it can be usefully employed to implement the semantics of hard links across volumes. This is really beneficial, in that this is last step in hiding from the clients the notion that the global file system is implemented in terms of individual volumes. In other words, a client will always be able to create what it perceives to be a hard link from any directory to any file in the file system, regardless of the volume they reside in.

The key issue here is the implementation of the Unix 1 ink( ) system call that NAS clients can apply to create hard links only to files. Effectively hard links can be emulated when cross-volume linkage is desired, by using SLs. It is assumed that, as in the case of deletions, the node that owns the volume where the link is to be added will always perform the operation. In case the receiving node is not the owner, it should forward the request to the owner. The possible cases are as follows:

1. When a hard link is to be created, that points to a file it is "co-resident" with (meaning they reside in the same volume), this requires the creation of the hard link within the volume. This is the standard behavior expected of the link( ) system call.
2. When a hard link to a file is to be created and the two are not co-resident, then first a hard link to the target file must be added in the RD of the volume where the target file is located, then a new SL referencing this new link should be created in the appropriate directory. Note that by simply creating a new link in the RD in the same volume, the file is not moved, and other references to the file are not affected.
3. When a new hard link must point to a file referenced through an SL, then the file system should create a new hard link in the RD that contains the target file (the one the existing SL is pointing to). The link count for the target file would thus be increased by 1. Finally an SL embedding a reference to the new hard link should be created in the appropriate directory.

No additional functionality must exist in the file system to fully support this, with respect to the functionality that must be present to implement the basic SL functionality described in subsection 3.1.2.1.

Handling the various cases this way results in the following useful attributes:

Since an SL can only reference a hard link to a relocated file, the removal of an SL is still done as explained earlier. Basically there is no need to add reference counts for SLs that would tie together data structures in different volumes. The removal of the SL would cause the removal of the hard link in the RD. This would cause the file reference count to be decremented and, in turn, the file would be deleted when the number of references reaches 0. So no additional code would have to be provided, to deal with this and the file reference counting mechanism would be unaffected.

Since each hard link (=name) in the RD is still referenced by just one SL, the hard link name can embed the information needed to embed a reference to the associated SL.

Note that this completely generalizes the ability to provide a mechanism that implements cross-volume links with the full hard link semantics to NAS clients. This way, there exist two different namespaces:

A physical namespace (seen only by the system) implemented through a collection of volumes each with its own internal hierarchy that connects FSOs through hard links and includes the FSOs in the RD.

Figure 4:
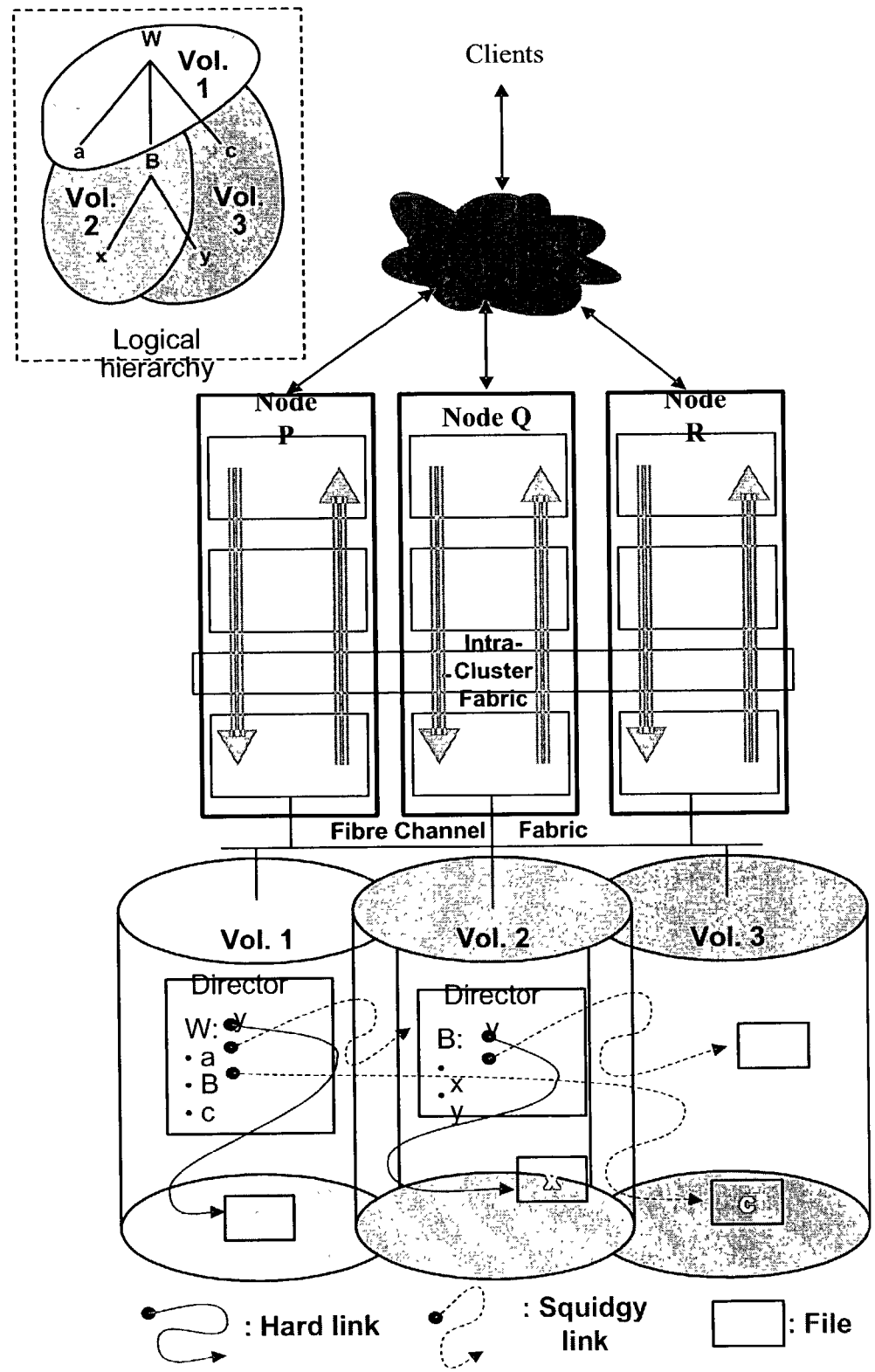
FIG. 4 is a diagram depicting a logical namespace implemented in terms of hard links and squidgy links in accordance with the logical hierarchy of FIG. 3.

A logical namespace (seen by the NAS clients), that spans the entire file systems across volumes, is made of FSOs connected via hard links and squidgy links, and hides the difference between hard links and SLs from clients, along with the existence of volume boundaries and RDs. FIG. 4 depicts this namespace, implemented in terms of hard links and SLs, with reference to the logical view (top left). Notice that, in FIG. 2, it can be assumed that the client(s) that created directory "W" and file "a" did so through node P (the owner of volume 1), the client(s) that created directory "B" and file "x" did so through node Q (the owner of volume 2) and that files "c" and "y" were created through node R (the owner of volume 3).

3.1.2.1.3 Squidgy Link Operations

This section provides more details on operations implemented over SLs.

3.1.2.1.3.1 Squidgy Link Creation

Incoming FSO creation requests should automatically cause the creation of an SL when one (or more than one) of the following conditions is true:
  The FSO is a file and the creation should occur within a directory in a foreign volume.
  There is not enough space in the local volume for the file.
  An appropriate configuration parameter dictates that the creation of SLs should apply also to directories (it always applies to files) and:
  Either the FSO is a directory that should be created within a directory in a foreign volume.
  Or there is not enough space in the local volume for the directory.

The creation should occur as follows:

1. The file system software in the cluster node will create the FSO in the local RD. The name used for the FSO should be chosen as described earlier.

2. Immediately after the FSO is created, the file system software in the cluster node will create a squidgy link through the owner of the foreign volume which will then insert the new name into the parent directory. It will also update the content of the SL with the appropriate symbolic reference to the file/directory just created in the local volume.

From then on, all accesses to the FSO should occur in the local volume through the SL and write accesses would be funneled through the volume owner.

3.1.2.1.3.2 Squidgy Link Lookup and Access

A symbolic reference contained in a SL looked up to obtain a handle for a specified name within a certain parent directory. This is always a normal lookup, and the returned handle will include the object number and volume number for the required object, as specified in the directory entry.

If the call is successful and the returned volume number is the same as the volume number of the parent directory, then this is in fact the "normal" case (i.e., no SL is involved). If the returned volume-ID is not the same as the volume-ID of the parent directory, then this is in fact the SL case.

The file system software will implement the behavior explained in section 3.1.2.1.1, with respect to " . . . " entries within relocated directories.

The file system should also detect the inability to perform the interpretation and should distinguish the possible causes:
  In case the leaf cannot be found, this should be diagnosed as a case in which the FSO no longer exists.
  In case the first pathname component cannot be reached, this should be diagnosed as a failure (presumably) due to the fact the volume is not currently mounted.

In case of failure, on the basis of the above, the file system should take appropriate recovery actions and should not enter a panic mode.

When an existing FSO that is not physically allocated within the logically containing volume is accessed, the access should follow the SL that points to the appropriate RD. If this is a read access or a directory access, it should proceed as discussed earlier. A write access to a directory (setting of attributes, entry removal, creation of a new directory, etc.) should be performed through the owner of the volume where the directory physically resides. These are likely to be "single-shot" operations that should not create any serious performance problems or bottlenecks per se.

3.1.2.1.3.3 Squidgy Link Deletion

When an incoming delete request is received, then there are two FSOs that need to be modified—the parent directory and the target of the delete. Each of these FSOs may be either local or foreign giving rise to the following four cases:
  For a local parent directory and local target, normal delete.
  For a foreign parent directory and a local target, redirect to the owner of the parent directory.
  For a local parent directory and a foreign target, proceed as described below.
  For a foreign parent directory and a foreign target, redirect to the owner of the parent directory.

The "special" case is therefore the delete of an FSO whose parent directory is local but whose target is foreign. The file system software detects this case and will then i remove the link from the local parent directory and destroy the SL.

When this has completed the file system software will then issue a "delete" call to the owner of the foreign volume, which contains the target FSO. This owner will then delete the link to the target itself and will reclaim the FSO space, if the hard link count to the FSO has reached 0.

3.1.2.1.4 Automatic File Relocation

An optional mechanism enabled by an appropriate configuration parameter could drive the automatic relocation of files based on the usage statistics gathered during the system operation. In order to reduce complexity and extensive tree copies, this would probably only be applied to files and not to directories, although it could be applied to directories. This would be done through a mechanism similar to the one outlined for the creation of an FSO in a foreign directory. A background task would perform this, so as to allow the further distribution of hot spots and the balancing of the load across the cluster nodes. The steps involved in relocating each file would be the following ones:
  Each file would be locked, blocking writes until the relocation is over.
  Each file would be copied into the RD of one of the volumes owned by the node performing the relocation.
  The volume owner would be asked to rescind the directory reference in the containing directory, to replace it with a SL to the relocated copy, to release the lock and to delete the original file.

An important caveat is the following: because of the way SLs work, a file with multiple hard links cannot be transformed into a SL pointing to a different volume because otherwise it would be necessary to trace all the links, to transform them into SLs to the same file and this is potentially a full-scale search within the volume. Thus, files with more than one hard link would generally not be relocated at all, although this rule could be relaxed if the existing links are readily detected, such as when they are all within the same directory.

When a cluster node tries to gain write access to a file which has already relocated and is represented by a SL in the original containing directory, no further attempt is made to relocate the file to a volume owned by the local cluster node. The reason is to prevent continuous relocations and that the first relocation already served the purpose of avoiding the concentration of multiple heavily accessed files within the same volume. Besides, assuming the load balancer already bases connections on user identities, the file should have reached its most appropriate destination.

Note that the automatic relocation scheme is based on knowledge of the nodes through which the users connect to the cluster. In order for the relocation to add value beyond the pure scattering of files across multiple volumes (which is itself valuable), it is desirable that the file relocation be stable. This means that a given user should always connect through the cluster through the same cluster node.

A further cluster configuration option (which might be disabled entirely or conditionally allowed on the basis of certain thresholds, based on configuration settings), subject to certain thresholds in file size could allow automatic file relocation on the first write access. If the write access entails modifying the content of an existing file, then two cases may occur:

If the file is currently open, i.e., the file is being shared, since there is file contention, all write accesses would be funneled through the owner of the volume where the file is physically allocated. So, this case would be handled through the volume owner.

If the file is not in use, the local node that is processing the operation could:

Lock the file, blocking writes until the relocation is over.
Cache the file locally, by creating a copy in the RD.
Ask the volume owner to rescind the directory reference in the containing directory, replace it with a SL to the copy, release the lock and delete the original file.
Note that the actual copy of the file could be dealt with in a lazy fashion: in other words, it would not be necessary to perform the copy at the time the file is opened, but rather, the file could me made invisible in the original volume and the file sectors would be copied as necessary. At the time the file would be eventually closed, the blocks not copied so far would be copied and the original version would be deleted.

The mechanisms outlined here effectively perform selective relocation of files within the cluster. This has the merit of spreading out files to the various volumes in an automatic fashion, without giving that perception to the users.

3.1.3 Caching and Concurrency

In order to guarantee adequate performance, along with data consistency and integrity in the cluster, appropriate caching in each node must be supported. This should make sure that the cached data in a node with read-only access does not become stale with respect to modifications being carried out by the logical volume owner.

This issue is closely tied to that of internal system locking and calls for the ability to use appropriate communications mechanisms to request the update of a volume with new data and to make sure that cached data and metadata in the cluster members are promptly discarded, when stale. This means that it is necessary to:

Make sure that when a node updates a page in its cache, any copies kept in the other cluster nodes are invalidated. The timing of this is critical, in that the owner of the stale cache page may have to reacquire the page and this should happen in such a way that the obtained view is coherent with that of the volume owner. The page should be flushed only when the updated version is available on disk or the new version should be acquired directly from the volume owner.

Flush multiple metadata cache pages together, when this is required to make sure the resulting view is consistent.

The system-level lock manager can be integrated with the cache management since the breaking of a read-lock because of a write and the flushing of the relevant cache page are in fact related events. The actual lock manager for a volume is run within the node that is the owner of that volume.

3.1.3.1 Caching and Locking

The architecture expects two caches to be logically available. One is a metadata cache and it operates on the FSM (File System Module) board (i.e., a system board that runs the file system). Another one is the sector cache, operating on the SIM board.

Figure 5:
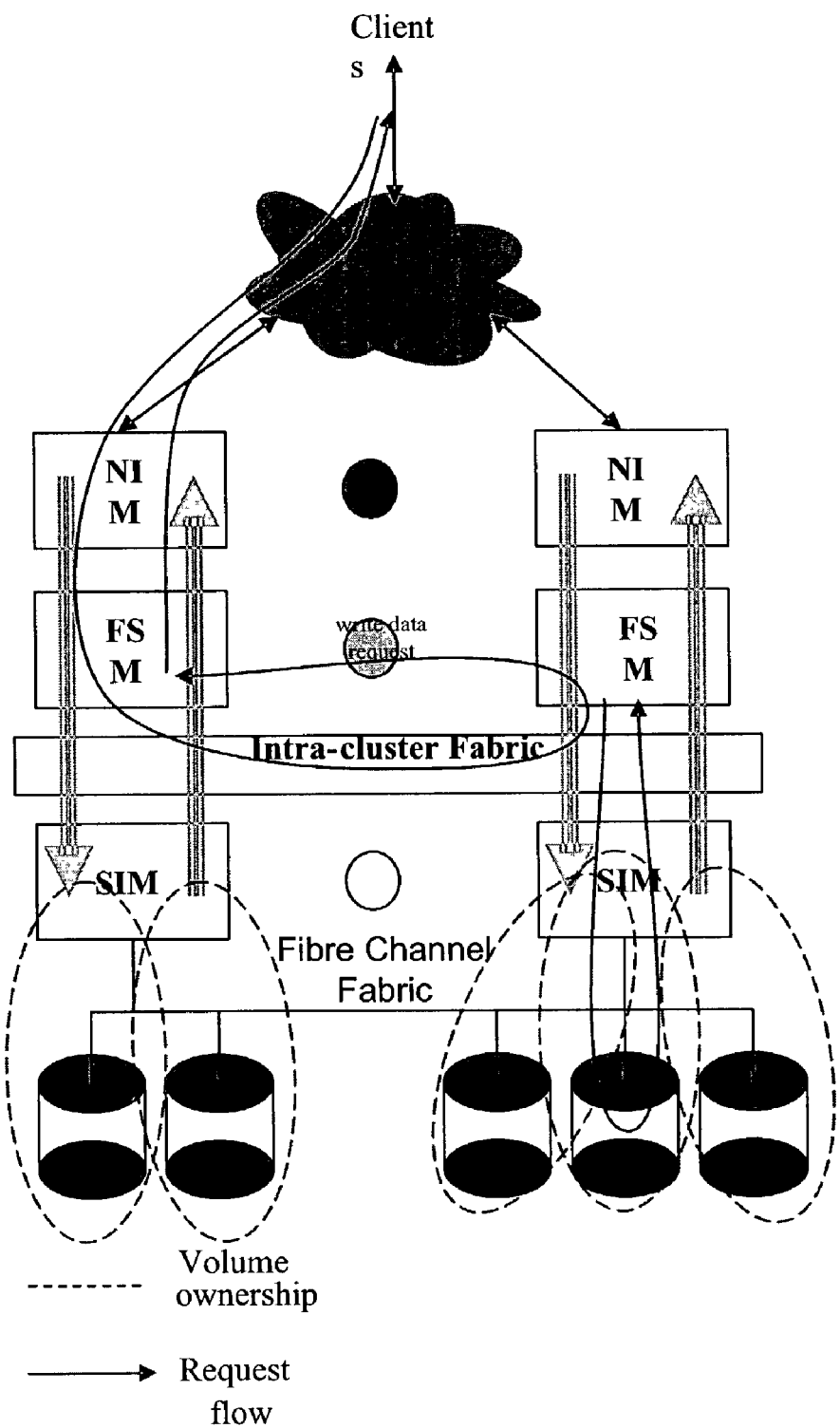
FIG. 5 is a diagram depicting the handling of foreign write requests that bypass local caches as they are forwarded to the node that owns the target volume in accordance with an embodiment of the present invention.
Figure 6:
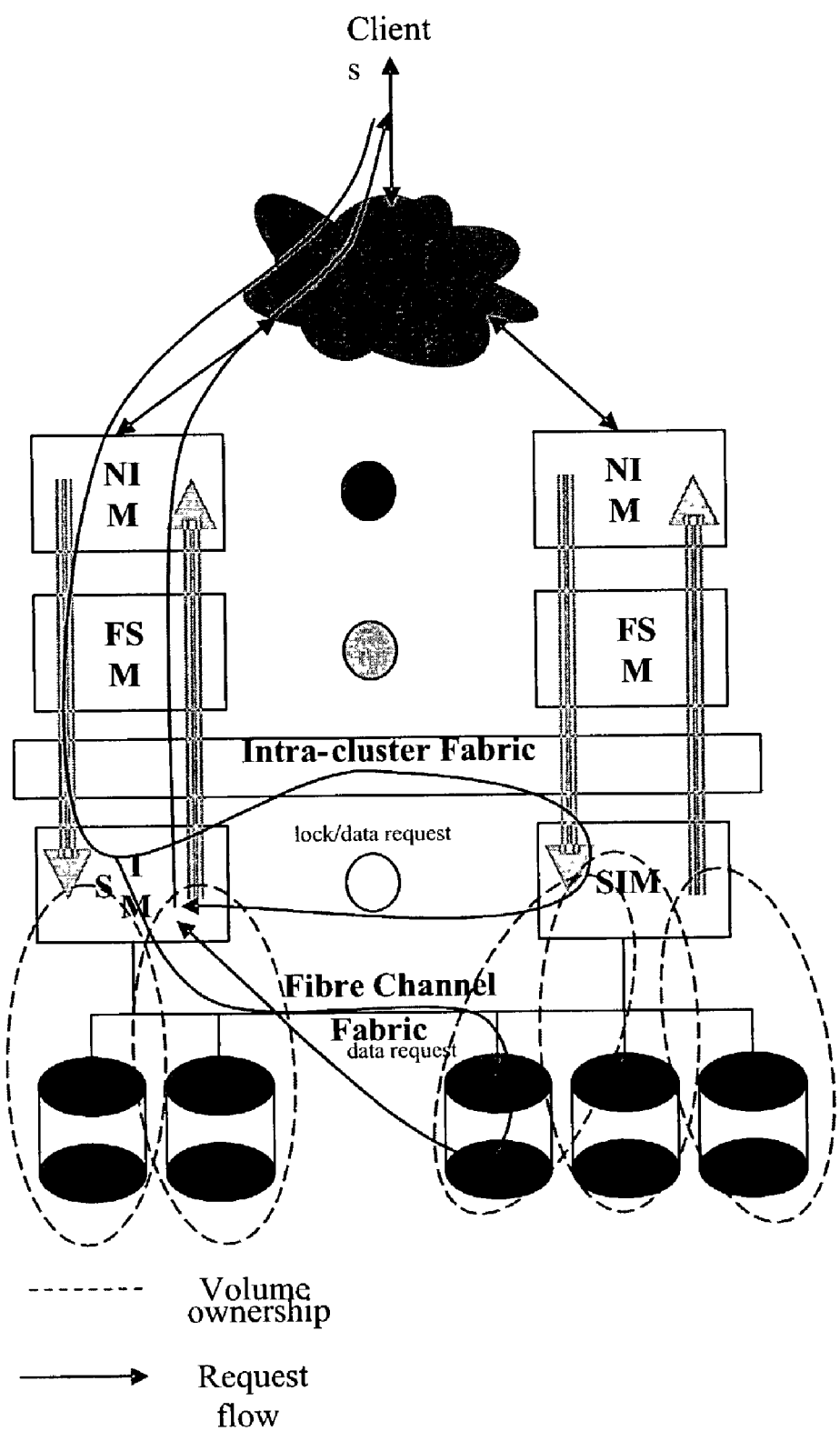
FIG. 6 is a diagram depicting the handling of foreign read requests using both the local metadata and the local sector cache in accordance with an embodiment of the present invention.

Local requests would be handled essentially in the metadata and sector caches. However, foreign requests should be handled differently. Foreign write requests would totally by-pass the local caches (see FIG. 5), as they are forwarded to the node that owns the target volume. Foreign read requests (see FIG. 6), on the other hand would be using both the local metadata and the local sector cache.

3.1.3.1.1 The Sector Cache

The scheme to be used for the sector cache should allow foreign volume sectors to be cached in read-only mode when a read-lock is valid on them. Thus, when a cluster node ("requestor") needs read access to a sector belonging to a foreign volume and that is not already in cache, it should issue one read request with a read-only lock to the volume owner and another read request for the same sector to the SAN backend (see FIG. 5). The requestor should block until it receives both the sector and the read-only lock for it. There are two cases:

1. If the volume owner does not have the sector in its cache, it should grant the lock, should record the cluster node that requested it and the sector number and should let the SAN backend satisfy the request. At this point, the requestor would get the lock and should wait for the sector to be available from the SAN. Then it would satisfy its client's read request.

2. If the volume owner has the sector in its cache, then there are two subcases:

a. If the sector is not write-locked, the volume owner should reply by granting the read-only lock and sending the sector content with it. The requestor then would satisfy its client's request and would drop the sector, whenever it is returned by the SAN backend (or should abort the SAN command).

b. If the sector is write-locked, then the requestor should be stalled until the lock is granted, which goes back to case a.

When the volume owner needs to write-lock a sector, it first should break the outstanding read-locks in the other nodes. This has also the effect of invalidating the cache entries for that sector in the other nodes. At this point, any node needing that particular sector should go back to execute the above algorithm.

3.1.3.1.1.1 Sector Cache Consistency

Every logical volume (which will actually consist of a number of physical disks) is 'owned' by a particular cluster node, and only that node may write to the volume. However, every other node in the cluster can potentially cache read data from volumes which it doesn't own, and so it is necessary to have a scheme to ensure that when the volume is written to by the owner all the cached data on other nodes can be invalidated in order to maintain data consistency.

In a typical embodiment of the present invention, every node in the cluster contains a sector cache lock manager. This manages the caching of data in all the sector caches in the cluster from the volumes which are owned by the node. The sector cache is made of cache pages (32 Kbytes in size, in a typical embodiment) and it is these pages which are managed by the lock managers.

Each cache page managed by the lock manager can be in one of two states:

Read-locked—this page is cached in the sector cache of at least one of the non owner nodes.

Write-locked—this page is cached in the sector cache of the owner node and may contain dirty data (the data in the sector cache is potentially newer than the data on the disks).

There is a question as to how many cache pages an individual lock manager should be able to manage. Obviously in the worst case all nodes in the cluster could have their sector caches full of different blocks of read data from a single volume. One solution to this is to specify the memory on the lock managers wants to cope with this worst case.

There are three different sector cache operations that can occur. The implications on the lock manager for each of these are discussed below.

3.1.3.1.1.1.1 Owner Read

When the volume owner receives a request to read data on a volume it owns then it is free to read the data from the volume into its owner sector cache without taking out any locks or checking the state of the lock. If the page was previously write-locked, then it will remain write-locked.

3.1.3.1.1.1.2 Non-Owner Read

When a non-owner receives a read request it first checks to see if it already has a read-lock for the page. If it has, then it can just read the required data. If not, then it must apply to the lock manager for a read-lock. There are two possible outcomes of this request:

1. If the page isn't currently cached anywhere in the cluster, or is read-locked by another node or nodes, then the lock manager will mark the page as being read-locked by this node and grant a read-lock to the node so that it can read the data from the volume into its sector cache. Note that it is important that when the node removes the cache page from the sector cache it informs the lock manager so that it can properly keep track of who has what cached.

2. If the page is currently write-locked, then the lock manager will tell the node that the read-lock request has failed. In this case the node must then submit the read request across the cluster port to the owner node which will return the read data back across the cluster port. Then the requesting node may or may not cache the fact that it couldn't get a read-lock and submit all read requests to the owner node until the next checkpoint has taken place (and the read-lock may have been relinquished).

3.1.3.1.1.1.3 Owner Write

When the owner node gets a write request there are three things that can happen:

1. If the page isn't currently cached, then the lock manager will mark the page as being write-locked.

2. If the page is currently read-locked, then the lock manager sends a request to each of the nodes which hold a read-lock, in order to break their read-lock. Each of these nodes will then wait for any outstanding reads to complete and tell the lock manager that the read-lock has now been broken. When all of these break lock requests have completed, then the cache manager will mark the page as being write-locked.

3. If the page is already write-locked then do nothing.

Once the write-lock has been obtained the data can be written to the sector cache.

Each time a write-lock is taken out on a page, the lock manager records the checkpoint number, which was being used to do the write. If when this checkpoint has successfully been written to disk the page hasn't been written to with a later checkpoint number the write-lock is relinquished and the page is removed from the lock manager tables.

3.1.3.1.2 The Metadata Cache

Possible implementation schemes for the metadata cache are either one in which the metadata cache implements a mechanism that is very similar to the one provided by the sector cache and is in fact independent, or another one in which the metadata cache is a slave of the sector cache and does not need special machinery.

To implement a slave metadata cache, the basic assumption is that the sector cache has a mechanism to perform reverse mappings from sector numbers to the metadata objects they implement.

The metadata objects are higher-level abstractions with respect to sectors. However, in the end they contain sector data, although higher-level semantics is associated to them. The slave scheme can be based on the following concepts:

A foreign cluster node never has the need to read-lock an entire volume. Therefore, the volume lock can be totally local to the volume owner.

When a volume owner needs to update an FSO, it must gain a write-lock to the FSO. Foreign nodes can never directly update an FSO and have no need for a i-node lock. However, the risk exists that the content of a directory or that of a file or a mapping may be changed while the foreign node is reading it. What is trickier is the case in which the foreign node needs to take into account multiple items as it is performing its read accesses. In order to cope with such cases, a rule may be established that if the volume owner needs to gain a write-lock to a FSO, it should first break any outstanding read-lock to the first sector representing the i-node for the FSO (even if this sector is not going to be modified per se), in addition to that, any sectors to be modified must be write-locked. Note that breaking read-locks implies that the sector caches of foreign nodes are informed. In turn, they can inform their FSM counterpart for the sectors that are cached in the metadata cache.

Thus, if the FSM code within a cluster needs access to metadata to perform a given operation, it has to get the i-node for the FSO and then get the appropriate data sectors. When it has done this, just before performing the requested read operation, it checks that the first sector of the i-node for the object it is dealing with is still read-locked. Otherwise, it will abort and restart the entire operation from scratch. More in general, in case several items must be consistent, their validity must be checked in reverse order with respect to the one they were acquired in. If so, the operation may proceed. Otherwise, it must be aborted and restarted from scratch. A possible alternative in such a case (that could, in fact, be considered an exception because of the contention) is that of forwarding the request to the volume owner, as in the case of a write operation. Note that:

An inquiry into the sector cache can be used to check read-locks. A possible alternative is that of allowing the SIM sector cache to propagate an appropriate flag to the FSM cache buffer if/when the sector is invalidated.

If the operation has to be restarted, the acquisition of the relevant sectors will involve blocking of the requesting thread until the write-lock on the volume owner node is released.

It is desirable to prevent the metadata cache in the FSM board from having to discard foreign metadata when the SIM is doing so to make room for other data. To obtain this, it is expected that the foreign metadata be kept in the FSM cache until either it is no longer needed (or needs to be flushed to make room for other metadata) or when it becomes invalid. Thus, when a SIM cache entry containing foreign metadata is flushed to make room for other data, the SIM board would avoid informing the owner that it has flushed metadata. So when an invalidation request comes in from the owner, instead of processing the request directly, the SIM board would relay it to the FSM metadata cache, that would take appropriate action.

Thus, metadata locks need not be implemented as a separate mechanism. Also, this avoids the need for a cumbersome synchronous protocol in which a volume owner requests all read—locks for a given sector to be invalidated and blocks until all the nodes that had a copy acknowledge this.

The volume owner is the only one that handles writes to volumes (even on behalf of other nodes) and always has a consistent view. Thus, the issue of guaranteeing a consistent view only applies to foreign reads.

3.1.3.2 Attributes of this Approach

Note that, because of the scheme used:

Stale copies of the sector cache entries are never used.

Sectors cached by the volume owner are always preferred.

Some extra reads from the SAN backend may be requested and then simply dropped. In fact less blind behavior can be achieved by aborting pending requests. Otherwise, the decision on whether a read should be issued ahead of time, with respect to a reply by the volume owner may be conditioned by the amount of traffic the SAN backend is handling on that volume.

Only the volume owner administers locks. This simplifies the design (and reduces its scalability).

Write-locks always enjoy a higher priority than foreign read-locks.

There is a potential duplication of volume sectors within multiple node caches, if clients connected to separate nodes are accessing the same file.

The complicated part of deadlock management is related to the use of write-locks. This does not change on the side of the volume owner. So, it does not require a distributed design. On the foreign nodes, read-locks can always be broken/released and reacquired. This removes one of the necessary conditions for deadlocks. So there should be no deadlocks.

This scheme by itself does not guarantee unbounded scalability. In fact, it is going to work best when:

The overhead in managing read-lock/data requests in the cluster owner is limited. Among other things, the protocol is expected to be extremely simple and limited to read-lock requests (to the volume owner), read-lock replies with or without data attached (from the volume owner) and flush/read-only lock breaks (from the volume owner).

The number of cluster nodes interacting with the volume owner is bounded.

Most foreign accesses are of the read type.

However, the decoupling of the pathnames from the volumes where FSOs are allocated can in fact provide a significant distribution of hot spots across all the volume and would tend to reduce the bottlenecks.

If the sector-cache interaction between cluster nodes described here is handled in VLSI, it is reasonable to expect that this scheme should not limit the cluster scalability to a small number of nodes.

The sharing semantics implemented in the caches is such that the system can always guarantee a consistent view to the client. After the metadata and the sectors are cached in a way that they are consistent (verified by checking the validity of the cache entries), the information offered to the client is always consistent, although its content may change immediately after that. This is indeed sufficient as long as synchronization on data is solely based on the use of a common locking protocol among the clients cooperating within a common application or environment. However, if a distributed application uses the acknowledgment of NAS writes to trigger synchronization with other clients through separate channels (e.g., socket communication) this assumption may not hold. Thus it might be appropriate to support the asynchronous notification that data is to be cached as the default rule, allowing a synchronous mode to be enabled through a configuration switch in case specific applications rely on this behavior.

The size and effectiveness of the metadata cache is not limited in any way by the size of the sector cache.

The cache manager must be able to register/unregister new cluster nodes as they dynamically join/leave the cluster. The hardware status monitor (part of the High Availability software) will notify the relevant events.

The metadata cache consistency scheme just described can be built upon the sector cache consistency scheme and relies on a "reverse mapping" to relate a sector cache page to all the metadata objects that are contained within that cache page.

3.1.4 Multi-Volume Operations

So far, internal locking has been looked at with respect to the management of the metadata cache and the sector cache. This is exactly what is needed for operations entirely within a volume, where the locking is entirely within the responsibility of the volume owner and this should in fact be handled in ways that conform to those employed in a standalone node.

The more complex multi-volume operations all deal with the management of the global file system namespace. Of course, namespace operations local to an individual volume are dealt with in the context of the volume and have no additional complexity.

Note that the complexity of some multi-volume operations can be reduced considerably by the use of SLs. An example is the rename of a directory from a volume to another one: if I want to rename directory "X" (which is a real directory, not an SL) from volume "A" to "Y" in volume "B", this can be accomplished as follows:

Perform a local rename of "X" to the RD of volume "A", assigning it a numeric name and updating the VPD backlink within the i-node.

Create an SL named "Y" in the appropriate directory of volume "B" that points to the relocated directory.

In case "X" is already an SL, it is necessary to do the following:

The directory entry for "X" must be removed from volume "A", without removing the referenced directory (this entails the update of the in the target directory).

The i-node of the referenced directory must be updated to have the VPD backlink point to the new VPD.

The new SL for the referenced directory must be created in the appropriate directory of volume "B".

This latter operation may involve up to 3 nodes.

Note that this scheme applies to files, directories and SLs, so that no real data copying need be performed. Since aspects related to where FSOs are physically stored in the cluster are hidden from clients, any rename or move operation can be handled this way.

In all cases, the operations can be handled in steps, which are self-contained (i.e., each namespace operation within a volume is atomic) and require no multi-volume locking. Recovery in case of failure in intermediate steps is either handled automatically by garbage collecting the orphan FSOs or is coordinated by the entity that is executing the operation.

A scavenger process is required to deal with the removal of orphan SLs and FSOs stemming from operations not completed because of node failures. In any case, by logging the identities of the objects involved in a multi-volume operation, the scanning by the scavenger can be reduced to these objects and would be minimized. More on this in section 3.1.7.

The multi-volume operations below are performed within the cluster fabric. This means that they are implemented in terms of primitives that are totally inaccessible to the NAS clients and are protected from the outside world. Thus, no special checking of privileges is necessary, apart from the standard file system protection checks that verify that the clients that cause the operations to be carried out have enough privileges to modify the file system objects involved.

Note that the multi-volume operations discussed in this section implement special multi-volume cases of more common operations normally entirely handled within a single volume by server code. Thus, the creation of an FSO within a foreign directory is just the multi-volume case handled by the code that creates a new FSO. In this sense, these multi-volume operations simply extend the basic local operations volumes already support.

The multi-volume namespace operations of interest are the following ones:
  Create FSO within foreign directory: a special case for the creation of a file or directory.
  Create SL to existing file: a special case for the link primitive.
  Rename/move file or directory to non-co-resident directory: special case for the generic rename/move operation.
  Rename/move SL pointing to existing file or directory: additional special case for the generic rename/move operation.
  Remove SL to file or directory: special case for the generic remove.

When such operations can be entirely dealt within a single volume, they require no further analysis in this context, since they do not differ from the operations a single-node file system implementation should perform.

The following subsections explain in detail what each of the multi-volume operations is to accomplish and the implications in terms of integrity and recovery for the global file system.

Two facilities are needed to implement this: a set of primitives that are discussed in the following and a mechanism that allows multi-volume transactions to revert to a previous state in case crashes affect the parties involved. The latter is based on an automatic undo facility on the remote side and a "Local Undo Directory" (LUD, in the following) that is invisible to the NAS clients. This is discussed in section 3.1.4.6.

The pseudo-code for the multi-volume operations is constructed in terms of the following eight primitives that can be invoked remotely, yet are atomically executed entirely within one volume:
  const char*CreateFSO(VID volID, FSOTP type, const char*vpdBacklink);

This primitive creates a new file or directory (depending on the value of the 'type' argument) in the RD of the volume identified through 'volID'. The name of the FSO is a numeric string obtained by bumping up by one the last numeric name created so far. A pointer to the new name is returned as the functional value. The 'vpdBacklink' argument is only used to create the VPD backlink for directories. In the case of files, it is ignored or possibly saved for debugging.
  int CreateSL(VID fVol, const char*fName,
  VID tVol, const char*tName, FSOTP type);

This primitive creates a new SL of type 'type' with the pathname 'fName' in the volume identified through 'fVol'. The referenced FSO is identified through the pathname 'tName' within volume 'tVol'. If the target name does not exist yet, the call succeeds. In case the target name exists, is an SL and is dangling, the dangling reference is replaced with the new one and the call succeeds. Otherwise, if the name already exists and is not that of a dangling SL, 'type' has to agree with the type of the existing object, in order to succeed. If the existing object is an SL, 'type' has to agree with the type of the object the SL points to, in order to succeed. If the type of the existing object or of the object pointed by the existing SL is a directory, the existing target directory must be empty. If the above conditions are met and the existing target is an SL, the SL's reference is replaced with the new one. Then the existing target name is moved to the subdirectory of the LUD associated to volume 'tVol' (this also applies to existing non-dangling SLs) and the operation succeeds (see section 3.1.4.6, for further details).
  int CleanupLUD(VID tVol, VID vol, const char*name, int restore);

This primitive is called when operations including the creation of an SL succeed or to perform the cleanup of the LUD. It checks that the SL identified through the (vol, name) pair contains a sound reference to an existing object. If so, it removes the entry created in the LUD subdirectory associated to volume 'tVol' by the overwriting of the directory entry identified through the (vol, name) pair. If the 'restore' flag is set (this would be the case when a full LUD clean-up is performed after a crash) and the SL identified through the (vol, name) pair is dangling, the LUD entry is restored replacing the dangling SL.
  const char*CreateLink(VID volID, const char*name);

This primitive creates a new link in the RD of the volume identified via 'volID'. The new link references the file identified through the pathname 'name' in the same volume (this need not be already in the RD). The new link is automatically assigned a new numeric name. A pointer to the new name is returned as the functional value.
  int GetFSOInfo(VID volID, const char*name, VID*pVol, char*pName);

This primitive returns the ID of the volume and the pathname for a FSO identified through 'volID' and 'name'. The returned information is in the variables 'pVol' and 'pName' point to. Note that only in the case 'volID' and 'name' reference an SL, the returned values differ from the input parameters.
  const char*Relocate(VID volID, const char*name,
  const char*vBl, int tmo, ID*opID);

This primitive renames the link identified through 'volID' and 'name' to a new numeric name in the RD of the volume 'volID' points to. The referenced FSO stays in the same volume and only the link moves from the original directory to the RD. A pointer to the new numeric name is returned as the functional value. Note that this applies also when the original (volID, name) pair referred to an FSO that already was in the RD of the volume. The 'opID' argument points to a location where a unique ID assigned to the operation must be returned. The 'vBl' argument is only used to create the VPD backlink for directories. In the case of files, it is ignored. This operation has a time-out specified as 'tmo' and logs the original identity of the FSO locally to the volume where the operation takes place. Unless the 'RelocateCompleted( )' primitive (see below) is invoked before the time-out expires, the relocation is automatically undone. Note that an undo entry is created immediately so that the relocation will be automatically undone if the time-out expires. Subsequently, the actual relocation is performed. This insures that the original directory entry is no longer accessible. The undo entry is also logged within the volume so that, in case of a crash of the volume owner, it will be executed as the volume is brought back on line.

int RelocateCompleted(ID opID, int abort);

This primitive takes two parameters: the 'opID' returned by a previous invocation of the 'Relocate( )' primitive and the 'abort' token. If 'abort' is not null, the operation performed by the invocation of 'Relocate( )' that 'opID' refers to will be undone. Otherwise, it is committed and the pending undo operation is deleted. This primitive would return an error if the previous invocation of the 'Relocate( )' primitive 'opID' refers to is unknown (this may mean that the time-out may have expired and the relocation was undone).

int Delete(VID volID, const char*name, int force);

This primitive takes three parameters: the (volID, name) pair identifies the object to be deleted; the 'force' flag is set to specify that deletion is mandatory. The primitive acts on the link or the SL to an FSO. If the 'force' flag is set, the referenced link is always deleted. If it is a hard link and the reference count for the object it points to reaches 0, the object itself is deleted. If it is an SL, only the SL is deleted. If the 'force' flag is not set, the primitive does not perform the deletion unless the FSO it points to is a dangling SL.

All the above primitives are synchronous, meaning that a reply is returned only when the requested operation is completed.

This is just one possible scheme and is only used to illustrate the pseudo-code in the following subsections.

The possible errors the multi-volume operations could potentially cause because of node failures are in the following categories:

- Dangling SL: when this happens, the dangling SL should be garbage-collected either when the name is referenced or as the scavenger process detects the inconsistency.
- Unreferenced link name within an RD: as in the previous case, an unreferenced link in the RD should be garbage-collected. Note that this implies that the object the link points to must be removed only when this is the last link to it.
- Link name in RD referenced by multiple SLs: this case will not occur, as names in the RD are numerical and monotonically increasing. For each new SL, the link is recreated with a new numeric name.
- FSOs whose original SL was removed while a new one could not be created: this case requires the ability to undo a partially successful operation.

These will be evaluated in the operations described below. It is assumed that the failures that may occur are due to hardware or software failures of the cluster nodes. Because of the way internal cluster operations are performed and because of the way the cluster interconnect is set up, it is not possible for clients to directly interfere with cluster nodes below the NAS level. Thus, attempts to inject inconsistencies can only occur by using the NAS network interfaces, which are protected.

Multi-volume operations will involve a coordinator (the node that coordinates the whole operation) and one or more remote nodes that own the other volumes the operation affects. The coordinator is the owner of one of the volumes affected by the operation. Normally this is the node that initiates the operation itself. In case an operation is requested to a node that is not directly involved (i.e., it owns none of the affected volumes), the request will be forwarded to the appropriate coordinator through a remote synchronous call. Each of the cases discussed below specifies which of the parties involved in the operation will act as a coordinator. Note that the scheme described below is just one possible scheme. In principle, the coordinating role could be assigned to any other node directly involved in the operation.

3.1.4.1 Create FSO within Foreign Directory

The coordinator for this operation is the node that owns the volume where the new FSO is to be created. Note that this makes sure the FSO is created within the volume of the executing node and optimizes the allocation of the new FSO with respect to local access.

This operation is typically done when a new file or directory is being created through a node that does not own the volume that contains the parent directory for the FSO.

The operation involves the volume the coordinator owns and the remote node that owns the volume where the parent directory for the FSO is. The coordinator creates a file or directory within the volume it owns. Then the remote node where the containing directory resides is requested to create an SL that points to the new FSO.

Note that the new target name may already exist. In this case, if the object being created is not compatible with that of the existing target (one is a file, the other one is a directory), the operation fails. The same happens if the objects are both directories and the target is not empty. Otherwise, the original target FSO will be moved to the LUD and the SL will point to the newly created FSO.

The pseudo-code for this on the executing node is the following:

```
1 fNm=CreateFSO(theVol, type, vpdBacklink);
2 if (fNm=0)
3 return ERROR;
4
5 if ((result=CreateSL(slVol, slNm, theVol, fNm, type))
!=OK) 6 Delete(theVol, fNm, 1); 7 else 8 CleanupLUD
(theVol, slVol, slNm, 0);
9
10 return result;
```

The coordinator creates a local FSO (statement 1). To do this, only the local volume need be involved. If the call fails (statement 2) the execution aborts. If it succeeds, the SL on the remote volume must be created (statement 5). If the coordinator fails between statements 1 and 5, the newly created FSO (if any) will be an orphan when the volume is reactivated and thus it will be garbage-collected in due time.

The operation in line 5 is performed through the remote node that owns the volume where the SL must be created. If the coordinator does not receive a successful reply, this may be so because either the SL creation failed for some reason or because the remote node crashed. The HA subsystem will detect such a crash. In any case, the coordinator will delete the new FSO. The worst-case situation is one in which the remote node crashes after creating the SL, but before it could reply to the coordinator. In this case, the coordinator would delete the FSO, the remote SL would be left dangling and would be garbage-collected. In any case, the functional value returned in line 5 must be able to discriminate among a successful creation, the case in which the SL could not be created because and SL with that name already exists and the case in which the creation failed for other reasons. The return code will be dealt with accordingly.

The operation in line 8 is a remote operation. Note that the operation on line 8 is not strictly needed. It's just an optimization.

The operation in line 6 is just an optimization, since garbage collection could take care of removing the unreferenced FSO.

The semantics of the operation may require an existing FSO with the same name to be truncated to zero length.

Note that the FSO created through this operation is tied to its subsequent use. If the node crashes, the application state is lost and the application will have to re-execute the entire operation. The requested FSO may or may not exist, when the application restarts.

Note that this operation cannot cause multi-volume conflicts and does not require multi-volume locking since:
  It creates a new FSO within the RD of the local volume. The name of this FSO is new and cannot be known to or referenced by any SL in the cluster. This object is not known outside the RD until it is linked to an SL. Thus, no other entity in the cluster can interfere with this object.
  The creation of a new SL that references the new FSO is an atomic operation. Thus, once again, no interference from other processes or nodes is possible. If after the creation of the FSO, the SL cannot be created as the name is in use, the new FSO must be deleted.
Possible outcomes (the FSO contains no useful data):
Success.
Success but node crashed before the client received notification of success. The application state is lost and the operation must be re-executed, yet the FSO will already exist.
The FSO exists but the SL was not created: the unreferenced FSO, will be garbage-collected.
The remote node crashed without creating the SL. The coordinator detected this and removed the FSO.
The remote node crashed after creating the SL, but before notifying the coordinator. The coordinator will remove the FSO and the SL will be left dangling. If the client tries to repeat the operation, the dangling SL will be replaced with a proper one. Otherwise, the SL will be garbage-collected
FSO not created.

3.1.4.2 Create SL to Existing File

The coordinator is the node that owns the directory where the new SL must be placed. The operation involves this node and the owner of the volume containing the file. Note that a similar call that can be applied to directory is not available, since any directory can only have one SL pointing to it.

The sequence is as follows: the coordinator requests the remote owner for a new link to be created to the target file within the RD; then it creates a local SL that points to it.

The pseudo-code for this is the following:
1 GetFSOInfo(srcVol, srcName, &fVol, &fRef);
2 lNm=CreateLink(fVol, fRef);
3 if (lNm=0)
4 return ERROR;
5
6 if ((result=CreateSL(theVol, slNm, fVol, lNm, T_FILE)) !=OK)
7 Delete(fVol, lNm, 1);
8 else
9 CleanupLUD(fVol, theVol, slNm, 0);
10
11 return result;

The first action (statement 1) is the one of retrieving the volume and the pathname for the file to be referenced. In case the retrieved information (fVol, fRef) matches the input data (srcVol, srcName), the pathname used was that of a real file, otherwise it was an SL. In any case, it is the (fVol, fRef) pair, that points to the real file that must be used.

The operation in 2 is highlighted because the link to the existing file is created remotely through the node that owns the volume where the file is located. If the file to be linked no longer exists at the time the remote call is done, the execution aborts (statements 3 and 4).

If a failure occurs that makes it impossible to receive the reply, or if the coordinator crashes between statements 2 and 6, the execution aborts and the new link in the RD is garbage-collected.

If the call in 2 succeeds, the new name is returned and the coordinator creates the local SL (in 6). In case of a failure to do so, a remote deletion of the link is requested. Even if it does not succeed immediately, the link will be garbage-collected.

If statement 6 succeeds and the executing node fails immediately afterwards, it will not be able to report the outcome to the client, yet the SL will be in place.

The primitive in statement 7 is just an optimization, since garbage collection could take care of removing the unreferenced link.

The invocation in 9 is a mere optimization.

Note that if the node crashes while the operation is being performed, the application state is lost and the application will have to re-execute the entire operation. The requested name may or may not exist, when the application restarts.

Note that this operation cannot cause multi-volume conflicts and does not require multi-volume locking since:
  It creates a new link within the RD to an existing file. This operation is atomic. If the source file exists at the time the creation of the link is attempted, the creation succeeds. Otherwise, the entire operation is aborted. After the link is created, once again, the name of this link is new and cannot be known to or referenced by any SL in the cluster. The old link can even be deleted at this point by any entity, since the object it references has a positive reference count and will not disappear. The new link name is not known outside the RD until it is linked to an SL. Thus, no other entity in the cluster can interfere with it.
  The creation of a new SL that references the new FSO is an atomic operation. Thus, once again, no interference from other processes or nodes is possible.
Possible outcomes:
Success.
Success but coordinator crashed before notification of success was returned.
The new link is created but either the coordinator crashed or the reply was lost. Thus the SL was not created: the unreferenced new link will be garbage-collected.
The new link was created, the creation of the SL link failed, but the new link could not be deleted. Same as above.
Link not created.

3.1.4.3 Rename/Move File or Directory to Non-Co-Resident Directory

The coordinator owns the directory where the FSO must be moved. The call involves this node and the owner of the volume containing the FSO.

The sequence is as follows: the coordinator renames the FSO (it is not an SL) to a numeric name in the RD directory. Then the requesting node creates a local SL that points to the remote link in the RD.

Figure 7:
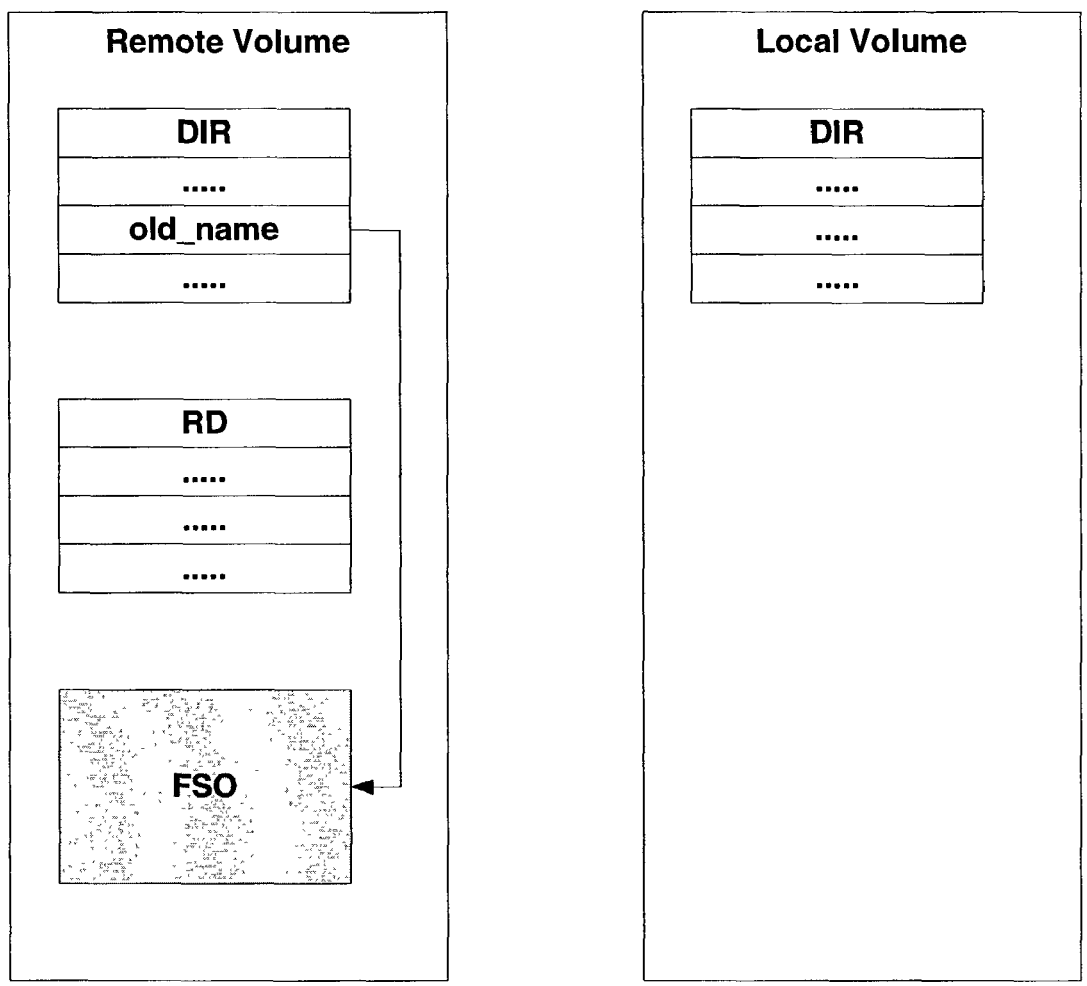
FIG. 7 is a diagram depicting the states of a local volume and a remote volume in which a file system object is pointed by an entry in a "normal" directory in the remote volume prior to renaming the file system object by the local volume in accordance with an embodiment of the present invention.
Figure 8:
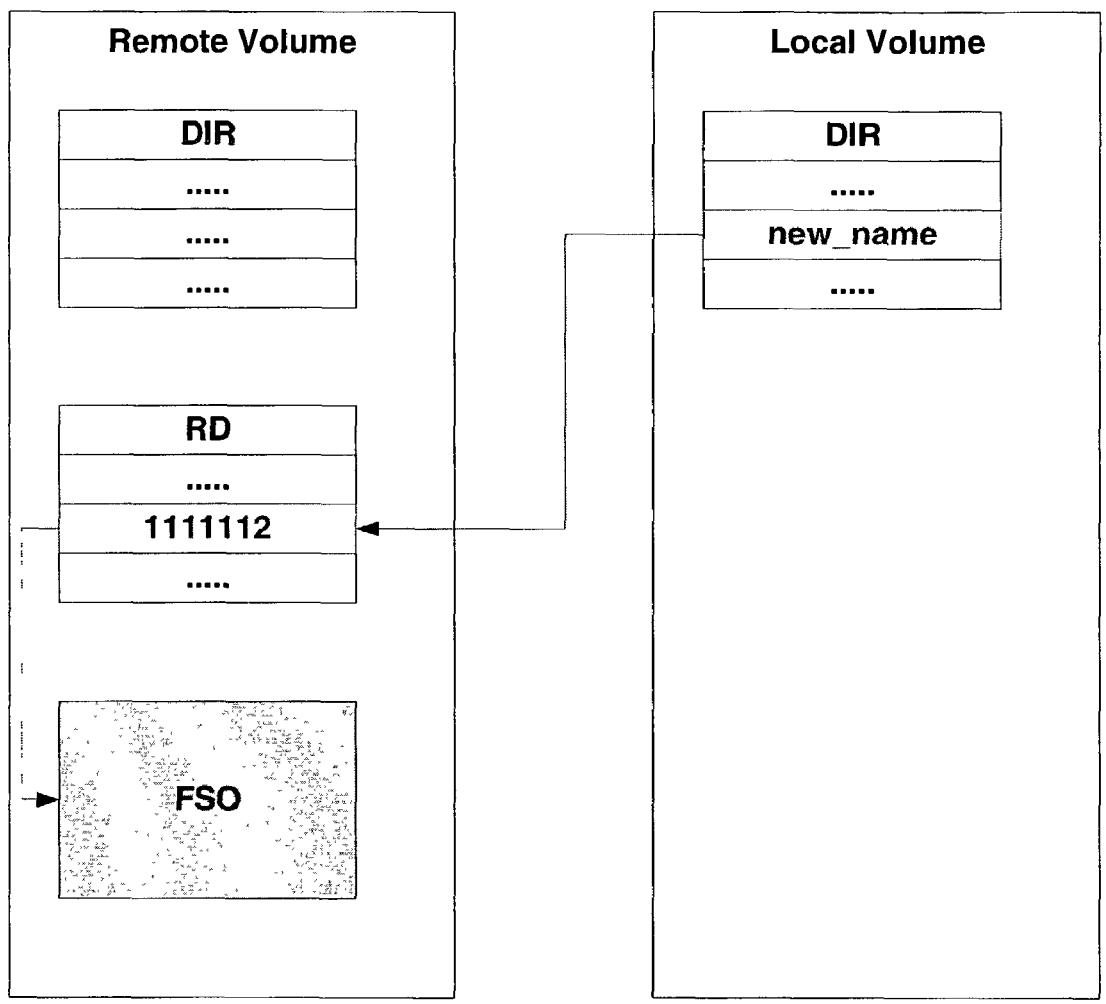
FIG. 8 is a diagram depicting the states of the local volume and the remote volume of FIG. 7 after renaming the file system object in accordance with an embodiment of the present invention such that the file system object is pointed by an entry in the RD of the remote volume and the local volume includes a squidgy link that points to the link in the RD of the remote volume.

The initial state is as shown in FIG. 7. (The FSO is pointed by an entry in a "normal" directory.) The final state is as shown in FIG. 8. (The FSO is now pointed by an entry in the RD directory.)

Note that in case the target name is that of an existing directory, or that of an SL pointing to a directory, the execution will fail and the following code will not apply.

The pseudo-code for this is the following:

```
1 linkName=Relocate(rmtVol, srcName, vpdBacklink, tmo, &opID);
2 if (linkName=0)
3 return ERROR;
4
5 result=CreateSL(thisVol, slName, rmtVol, linkName, type);
6 if ((res=RelocateCompleted(opID, (result !=OK))) !=OK) {
7 Delete(thisVol, slName, 0);
8 result=res;
9 }
10
11 CleanupLUD(rmtVol, thisVol, slName, (result !=OK));
12
13 return result;
```

The first action is remote (highlighted). The owner of the remote volume is requested to relocate the target to the RD (statement 1). The VPD backlink is only used for directories. A time-out is specified, such that unless statement 9 is executed before the time-out expires, this action will be undone.

The request on 1 may fail and thus the operation may abort (statements 2 and 3). It may succeed and a successful reply is returned which leads to statement 5. If the remote node crashes before a reply is received or the reply is lost or the coordinator crashes before statement 6, then there may be a relocated FSO that is inaccessible. However, as the time-out expires without the execution of statement 6, the remote node will revert the FSO to its previous state.

If the call in 1 succeeds, the new name is returned and the coordinator creates the local SL (in 5). In case of failure to do so, statement 7 restores the FSO to its previous name.

If statement 5 succeeds and the executing node fails immediately afterwards, it will not be able to execute statement 7, nor to report the outcome to the client. Thus the FSO will revert to its previous name after the time-out and there will exist a dangling SL on the local volume that will be garbage-collected. However, when the volume owned by the coordinator is on-line again, if the SL overwrote an existing name, this object would be unavailable. This is where the LUD mechanism takes over. The restart of the volume caused the LUD recovery to take place. Since in this case, the remote FSO would revert to its previous state, the recovery function for the LUD would not detect a valid reference for the newly created SL and would overwrite it with the object previously associated with that name saved in the LUD.

If the invocation of 'RelocateCompleted( )' is unsuccessful (this may be so because the time-out expired), the new SL will be deleted (it is dangling) and the state will revert to what it was before this code started executing.

The primitive in statement 7 is just an optimization, since garbage collection could take care of removing the unreferenced FSO.

In case of success, statement 11 removes the object saved in the LUD that was replaced by the new SL (if any). In case of failure, the saved object is restored.

Note that this operation cannot cause multi-volume conflicts and does not require multi-volume locking since:

It renames an existing FSO link to the referenced object from the directory it is in to the RD. This operation is atomic and either succeeds or it doesn't. After the rename, once again, the name of this link is new and cannot be known to or referenced by any SL in the cluster. The new link name is not known outside the RD until it is linked to an SL. Thus, no other entity in the cluster can interfere with it.

The creation of a new SL that references the new FSO is an atomic operation. Thus, once again, no interference from other processes or nodes is possible.

Possible outcomes (FSO has useful content):

Success.

Success but node crashed before notification of success was returned.

FSO relocated but SL was not created: unreferenced FSO with useful content. The expiration of the time-out will revert the FSO to its original state and the LUD mechanism will restore any object overwritten by the new SL.

FSO relocated and SL created, but coordinator crashed before executing statement 7. In this case, despite the fact that everything is done, the FSO will revert to its previous state.

FSO relocation not performed.

3.1.4.4 Rename/Move SL Pointing to Existing File or Directory

The coordinator will be the owner of the volume where the target parent directory (or VPD) for the FSO is located.

Figure 9:
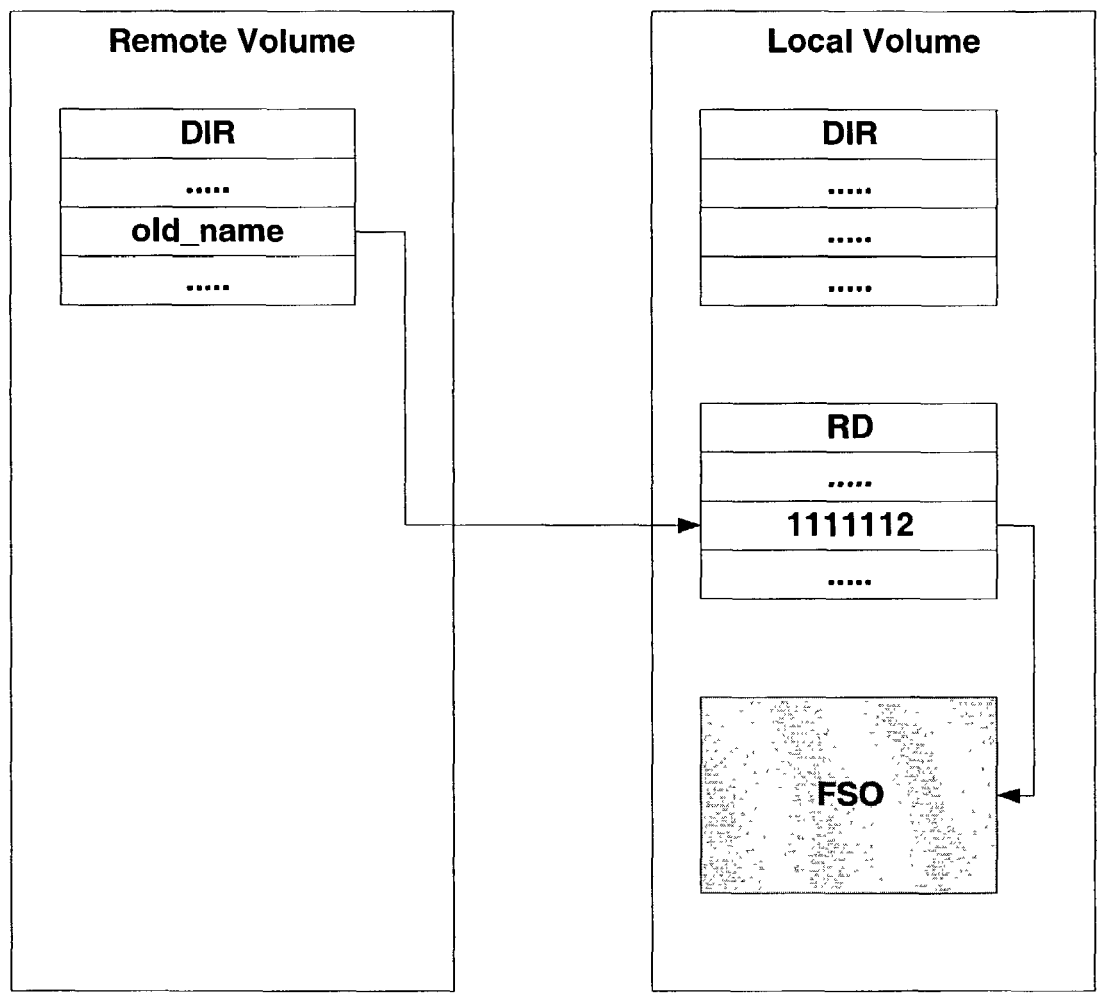
FIG. 9 is a diagram depicting the states of a local volume and a remote volume in which a file system object is pointed by an entry in the RD of the local volume and the remote volume has a squidgy link that points to the link in the RD of the local volume prior to renaming the squidgy link from the remote volume in accordance with an embodiment of the present invention.
Figure 10:
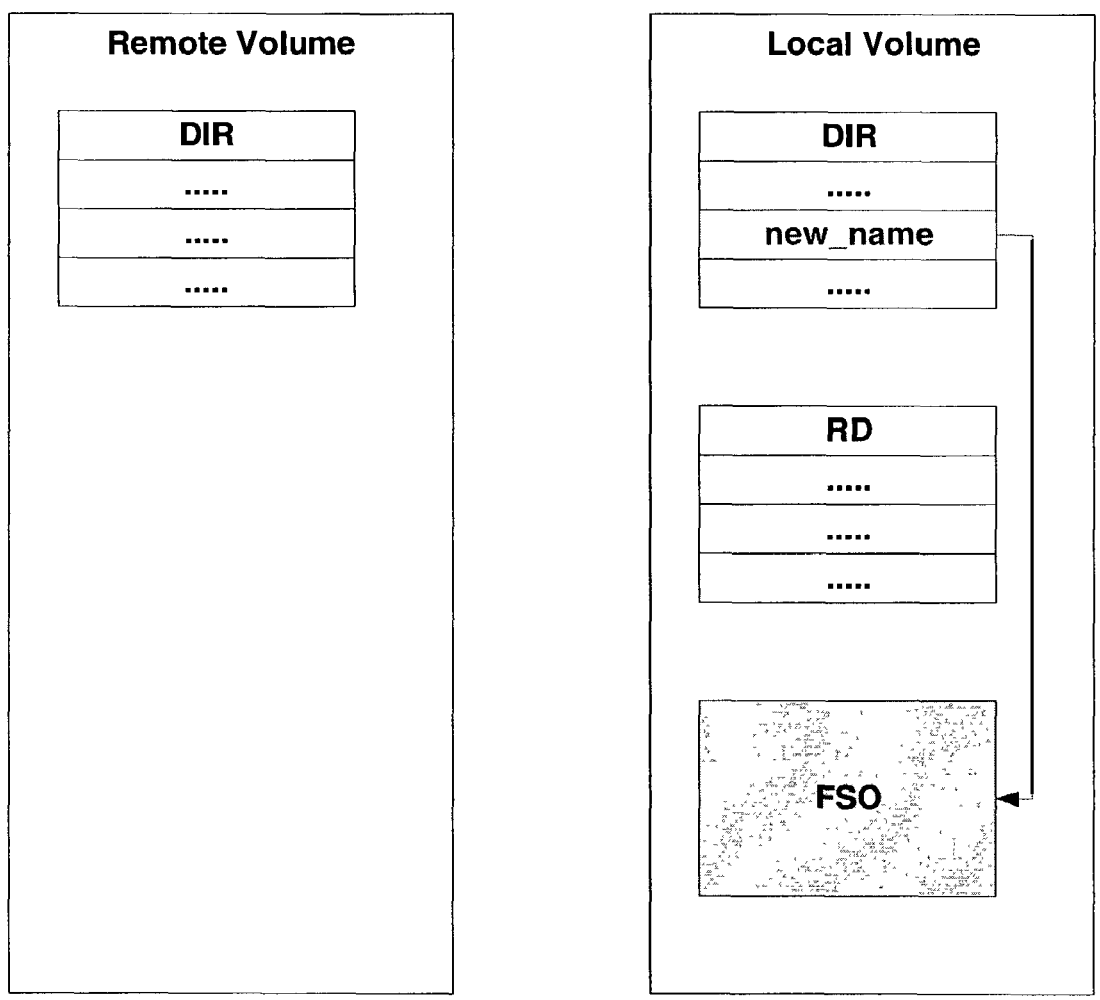
FIG. 10 is a diagram depicting the states of the local volume and the remote volume of FIG. 9 after renaming the squidgy link to become co-resident with the existing file system object in accordance with an embodiment of the present invention such that the file system object is pointed by an entry in a "normal" directory in the local volume and the squidgy link is removed from the remote volume.

There are two cases:

If the rename of the SL causes the SL become co-resident with the existing FSO, the operation amounts to a rename local to the volume where the FSO resides followed by the removal of the original SL. Note that this is just an optimization, in that a co-resident SL, as managed in the next case, would be functionally equivalent. In this case, the initial state is as shown in FIG. 9. The final state is as shown in FIG. 10.

Figure 11:
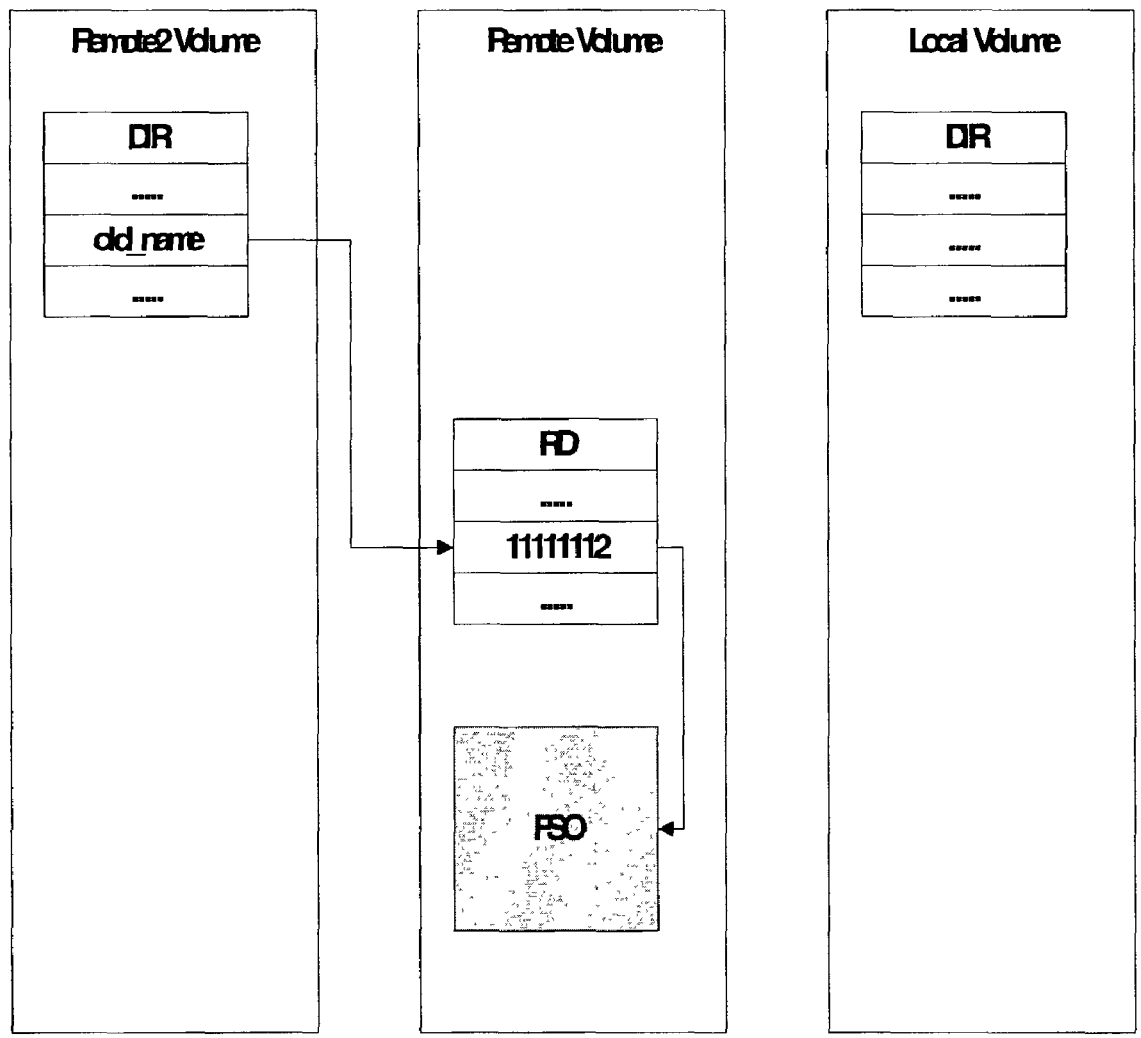
FIG. 11 is a diagram depicting the states of a local volume, a first remote volume, and a second remote volume in which a file system object is pointed by an entry in the RD of the first remote volume and the second remote volume has a squidgy link that points to the link in the RD of the first remote volume prior to renaming the squidgy link from the second remote volume in accordance with an embodiment of the present invention.
Figure 12:
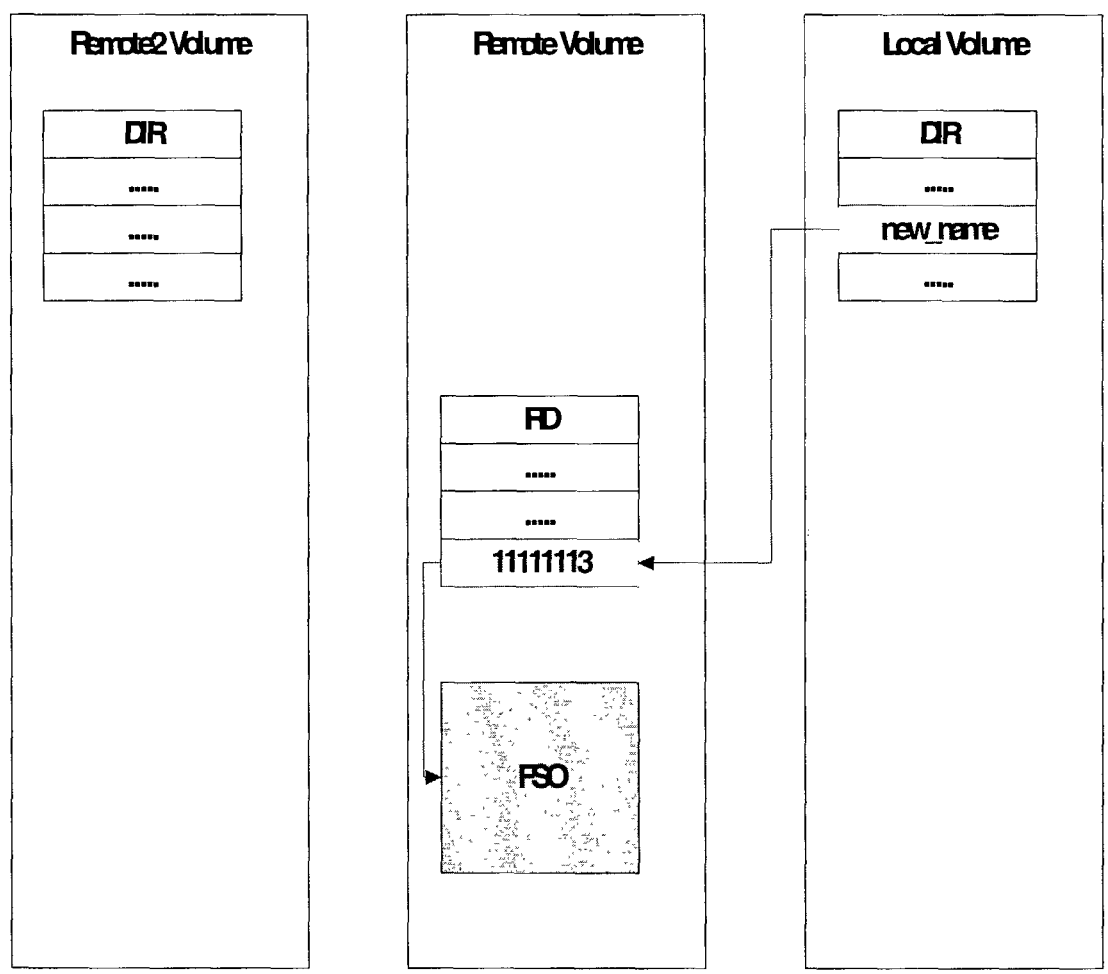
FIG. 12 is a diagram depicting the states of a local volume, a first remote volume, and a second remote volume after renaming the squidgy link so as to not be co-resident with the file system object in accordance with an embodiment of the present invention such that the squidgy link is removed from the second remote volume and a new squidgy link is created in the local.

If the rename causes the SL not to be co-resident with the referenced FSO, then first the FSO is relocated (this would only entail a rename within the RD), then a new SL is created that embeds a reference to the target FSO. Finally, the old SL is deleted. Note that the first step may or may not be local to the coordinator node, depending on whether the old and the new SL are in the same volume. In this case the initial state is as shown in FIG. 11. The final state is as shown in FIG. 12.

Note that in case the new target name is that of an existing directory, or that of an SL pointing to a directory, the execution will fail and the following code will not apply.

The pseudo-code for this is the following:

```
1 GetFSOInfo(oldVol, oldName, &fsoVol, &fsoRef);
2 if (newVol=fsoVol) {
3 if (Rename(fsoVol, fsoRef, newName))
4 return ERROR;
5 Delete(oldVol, oldName, 0);
6 return OK;
7 }
8
9 newLink=Relocate(fsoVol, fsoRef, vpdBacklink, tmo, &opID);
10 if (newLink=0)
11 return ERROR;
12
13 result=CreateSL(newVol, newName, fsoVol, newLink, type);
14 if ((res=RelocateCompleted(opID, (result !=OK))) !=OK) {
15 Delete(newVol, newName, 0);
16 result=res;
17 }
18
```

19 CleanupLUD(fsoVol, newVol, newName,
(result !=OK));
20
21 if (result=OK)
22 Delete(oldVol, oldName, 0);
23
24 return result;

First the real FSO information is retrieved (statement 1).

If the new volume and the FSO volume are one and the same, the FSO is simply renamed to the new name (statement 3). Note that this is a local action since the coordinator is the owner of the volume for the new parent directory. If this is successful, the old SL is deleted (statement 5). Note here that if the rename operation is successful, yet the deletion of the old SL is not accomplished, the latter will be garbage-collected.

If the two volumes do not match, first relocate the FSO to a new name (statement 9). This will be automatically undone unless statement 14 is executed before the time-out expires. If the relocation is unsuccessful, the operation aborts (statements 10 and 11). Then the new SL is created (statement 13). The subsequent statement (14) either commits the relocation or it undoes it, depending on whether statement 13 was successful.

If statement 13 succeeds and the coordinator fails immediately afterwards, it will not be able to execute statement 14, nor to report the outcome to the client. Thus the FSO will revert to its previous name after the time-out and there will exist a dangling SL on the local volume that will be garbage-collected. However, when the volume owned by the coordinator is on-line again, if the SL overwrote an existing name, this object would be unavailable. This is where the LUD mechanism takes over. The restart of the volume caused the LUD recovery to take place. Since in this case, the remote FSO would revert to its previous state, the recovery function for the LUD would not detect a valid reference for the newly created SL and would overwrite it with the object previously associated with that name saved in the LUD.

If the invocation of 'RelocateCompleted( )' in statement 14 is unsuccessful (this may be so because the time-out expired), the new SL will be deleted (it is dangling) and the state will revert to what it was before this code started executing.

In case of success, statement 19 removes the object saved in the LUD that was replaced by the new SL (if any). In case of failure, the saved object is restored.

Otherwise, the old SL is deleted (statement 22) since at this point it should be dangling. Note that if, meanwhile the (oldVol, oldName) pair has been reused, it will not be deleted. Finally, a reply is returned to the client.

The primitive in statement 3 is the remote invocation of the standard file system rename call.

As in the previous cases, this operation cannot cause multi-volume conflicts and does not require multi-volume locking.

Possible outcomes (FSO has useful content):
Success.
Success but node crashed before notification of success was returned.
The link is renamed within same volume, but the old SL is not deleted (and remains dangling), independently of whether the coordinator is notified: the old SL will be garbage-collected.
The FSO is relocated but the new SL is not created, due to coordinator crash or missed notification to the coordinator: the FSO will revert to its previous name after the time-out expires and the LUD mechanism will restore any object overwritten by the new SL.
The FSO is relocated and the new SL is created, but statement 14 is not executed due to coordinator crash: the FSO will revert to its previous name after the time-out expires and subsequently, the dangling new SL will be garbage-collected.
The FSO is relocated and the new SL is created, but the old SL is not deleted (and remains dangling), due to coordinator crash or to crash of the remote node: the old SL will be garbage-collected.
Failure, no changes.

3.1.4.5 Remove SL to File or Directory

The coordinator is the owner of the SL.

The operation consists of removing the SL and removing the link in the RD the SL was pointing to. Depending on the reference count this may or may not entail the actual deletion of the FSO.

The pseudo-code for this is the following:
1 GetFSOInfo(vol, name, &fsoVol, &fsoRef);
2
3 if ((result=Delete(vol, name, 1))=OK)
4 Delete(fsoVol, fsoRef, 1);
5
6 return result;

First the reference FSO for the SL is retrieved (statement 1). Then, the SL is deleted locally (statement 3). If successful, the FSO link the SL referenced is deleted as well on the remote volume (statement 4).

Possible outcomes:
Success.
Success but node crashed before notification of success was returned.
The SL is deleted, but the link in the RD is not deleted and is unreferenced: the link will be garbage-collected (if it is the only link, the FSO will be deleted).
Failure, no changes.

3.1.4.6 CreateSL and the Role of the LUD

The LUD is invisible to NAS clients, like the RD. It has a number of subdirectories: one for each volume in the system the local volume has references to through SLs that replaced local FSOs.

Each entry in one of these subdirectories is a link to the FSO, or a SL that had to be replaced with a new SL. Each pathname for the entries in this directory encodes the original pathname for the FSO, along with the e-number referenced in the SL that replaced the FSO., When a volume comes up, as others volumes reach the on-line state, an appropriate recovery process goes through all such entries and checks to see whether the SL that replaced it (whose pathname is known) contains a valid reference (i.e., it points to an existing FSO). If so, it deletes the LUD entry. Otherwise, it deletes the SL and replaces it back with the link/SL saved in the LUD. This takes care of undoing the clobbering of an existing FSO in case the node carrying out a volume operation crashed and is performed through repeated invocations of CleanupLUD( ), with the 'restore' argument set.

3.1.5 Client Locking

Client locking is involved in client operations that explicitly request a lock at the time a given service is invoked. This may include the locking of an entire file or the locking of some portions of it in shared or exclusive mode.

Client locking support must be able to fully support the semantics of NH-style locking, as well as that of Windows "oplocks" and sharing mode throughout the cluster.

The natural approach to handling this is that of centralizing this level of locking, by having all locking calls redirected to the same node. This would simplify the mechanism and should not create problems by itself, in the sense that if file contention occurs among clients in the context of a locking protocol, requests of this sort are to be considered out of the fast data path.

Two options in the handling of this are:

The first node to access an FSO could become the lock manager for that FSO, until the time all clients relinquish access to that file. This would tend to provide a better spreading of the lock management role among the cluster nodes and would make this fairly dynamic.

Otherwise, the owner of the FSO the lock is being applied to could always exercise the role of the lock manager for that FSO. This second approach has the advantage that the only entity that can modify the FSO is the one that handles its locking protocol. This is not dynamic and may further increase the load of the volume owner.

The second option is in fact preferable, since it makes the choice of the lock manager for a given FSO deterministic, rather than established on the basis of dynamic negotiations. Thus, it is the option of choice.

3.1.6 Cluster-wide Retained Checkpoints

Retained checkpoint mechanisms, as designed for a standalone server, work with respect to individual volumes. If files are allowed to be relocated to foreign volumes, a retained checkpoint will not guarantee that the content of a file is in sync with the view of the entire cluster at the time the retained checkpoint is taken. Therefore, the Cluster Services will implement a cluster-wide retained checkpoint that will take care of suspending the I/O on all volumes and of taking the retained checkpoints on each volume (this can be done in parallel). The Clustering Services must globally coordinate the suspending of the I/O through a Two-Phase Commit mechanism, by:

1. Suspending I/O until the retained checkpoint is taken.
2. Taking the local retained checkpoint and resuming I/O.
3. Properly synchronizing the checkpoint numbers on all volumes when a cluster wide retained checkpoint is taken.

The Clustering Services will take care to properly invoke, the relevant APIs on each node.

3.1.7 Global File System Integrity Checking

As outlined earlier, because of the fact that the integrity of individual volumes can be checked independently of that of any other volumes, the programs used to do this can be run in parallel on the various volumes.

Thus, each volume owner will run such checks, if needed, before making the volume available to the clients.

Once this is done for all volumes, a global integrity checker (scavenger) will complete the work, by running in the background and looking at SLs and at FSOs within RDs. It should make sure neither such FSOs are orphans, nor dangling SLs exist.

In order to make sure that garbage collection does not affect multi-volume operations still in progress and that it takes into account the temporary unavailability of crashed nodes, the scavenger should only look at FSOs and SLs that satisfy the following conditions:

An SL can be examined if the volume it references is on-line. An FSO within an RD is looked at if the volume where its SL should be is active. For example, an SL that points to a volume off-line should not be looked at.

The FSO or the SL to be looked at is at least X minutes old. X should be large enough to guarantee the completion of any multi-volume operation.

Note that this strategy is effective because the e-numbers (i.e., relocated FSO references) are always bumped up and are effectively never recycled (assuming one million new RD names are created per second, the 64-bit address space would not wrap around before approximately 585,000 years), so stale SLs become dangling.

The algorithm will scan all candidate SLs in the global file system that match the above conditions and will match them to appropriate entries in the RDs. Dangling SLs and unreferenced FSOs in RDs will be deleted.

Note that the duration and complexity of scavenging can be greatly minimized if the identities of the objects involved in multi-volume operations are logged before each multi-volume operation is carried out. This way, the scanning can be restricted to such entities, rather than being applied to entire volumes. Of course, after the checking is performed and the appropriate recovery actions are taken (if any), the log entries can be safely deleted.

FSOs that become candidates for garbage-collection will be handled in such a way that, in case they contain data, their deletion will consist of a rename to a directory from which they can be recovered. After they have been in such a directory for a long enough duration, they will be permanently removed.

3.1.9 The Distributed Services (DS)/High Availability (HA) Subsystem

Each cluster node includes a DS/HA subsystem. The DS/HA subsystem provides the necessary membership, messaging, and configuration infrastructure for the distributed file system. The requirements and assumptions for the DS/HA subsystem are fairly generic and include the following ones:

1. The DS/HA subsystem assumes that a logical circular topology for communication is implemented in the cluster. This is done to insure that each node has an updated copy of the NVRAM data of its left (or right) neighbor in this topology so that, in case a node fails, its neighbor can take over without data loss. Also, the node that has a copy of the NVRAM of its neighbor is the natural candidate to take over its neighboring node's responsibilities, if the latter fails. This topology can be implemented through the intra-cluster interconnect (discussed below). However, it is useful to have redundant channels implementing this same topology for status monitoring. These should be relatively low-bandwidth channels. Thus, they can be implemented via low-cost means.

2. Reliable cluster membership mechanism. This is a crucial feature for shared storage. In particular, the membership mechanism should guarantee that (a) every node will reach the same decision as the state of every other node regarding the cluster membership and (b) in the event of a network partition (sometimes referred to as the "split-brain" scenario), at most one partition will survive.

3. In-order, reliable delivery of unicast or multicast messages. For efficiency reasons, it is expected that the cluster interconnect will provide at least reliable unicast delivery.

4. Always-on configuration. That is, cluster configuration will be replicated across all nodes, to insure maximum survivability.

5. Byzantine failures are not considered, since it is assumed that the cluster will operate in a secure environment. An assumption is made that insane-type failures will not occur.

6. The cluster architecture has to provide high availability. As a consequence, no single point of failure should exist. Besides, the ability to perform early fault detection is crucial if the availability must satisfy the five 9's criterion. Note that the high availability requirement does not dictate that failures that make a resource unavailable should go undetected by the clients, as long as any single failure does not cause the inability of the clients to access the resource, when a retry is attempted after the recovery action is terminated.

The DS/HA subsystem performs the following functions:
It monitors the health of each PN.
It establishes and maintains the cluster quorum, to prevent the split-brain syndrome.
It propagates events to the PNs so as to cause the necessary state transitions.
It takes care of switching VNs (see below) from a failed PN to an active one and back.
It coordinates the start-up of the individual volumes and the execution of the local and global integrity checks, so that orderly start-up can be performed.

In an exemplary embodiment of the invention, the DS/HA subsystem runs on the FSM and possibly on the SIM as well. For convenience, just the FSM board is considered in the following discussion, although interactions with the SIM board should follow more or less naturally. For instance, the DS/HA subsystem should allow communications between any board on one node and any board on another node. This might be done, for example, using an address scheme that includes a board identifier along with a node identifier (or a combination of both) or using a message layer including a "message type" and having different handlers on the FSM and SIM boards register for different services.

Figure 13:
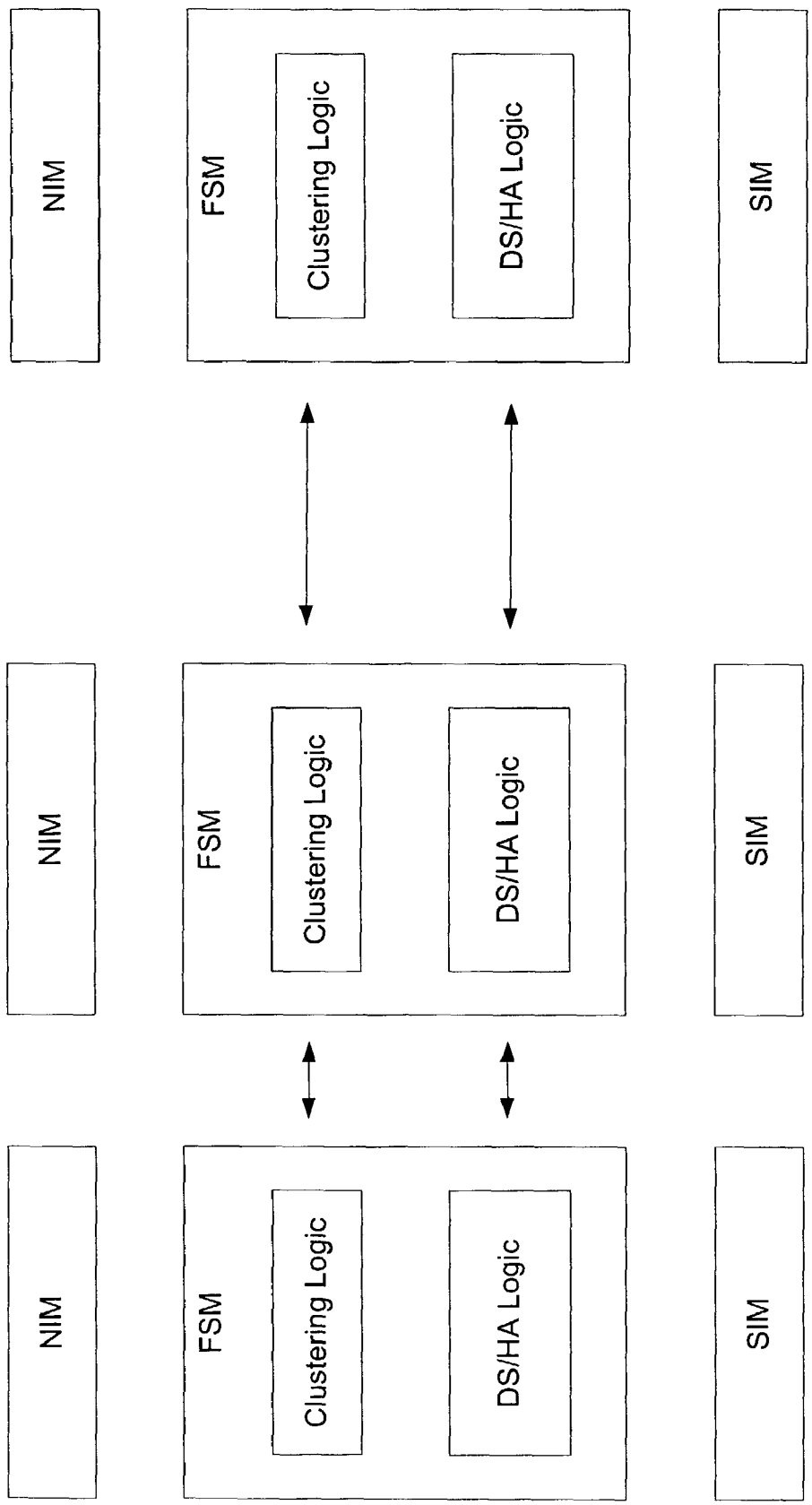
FIG. 13 shows the relationship between a distributed services/high availability subsystem and other components in accordance with an embodiment of the present invention.

FIG. 13 shows the relationship between the DS/HA subsystem and other components. As can be seen, there is a layered relationship between the clustering module, the DS/HA module, and the underlying interconnect. Specifically, the clustering modules of the various nodes communicate with one another through abstractions provided by the DS/HA modules.

Figure 14:
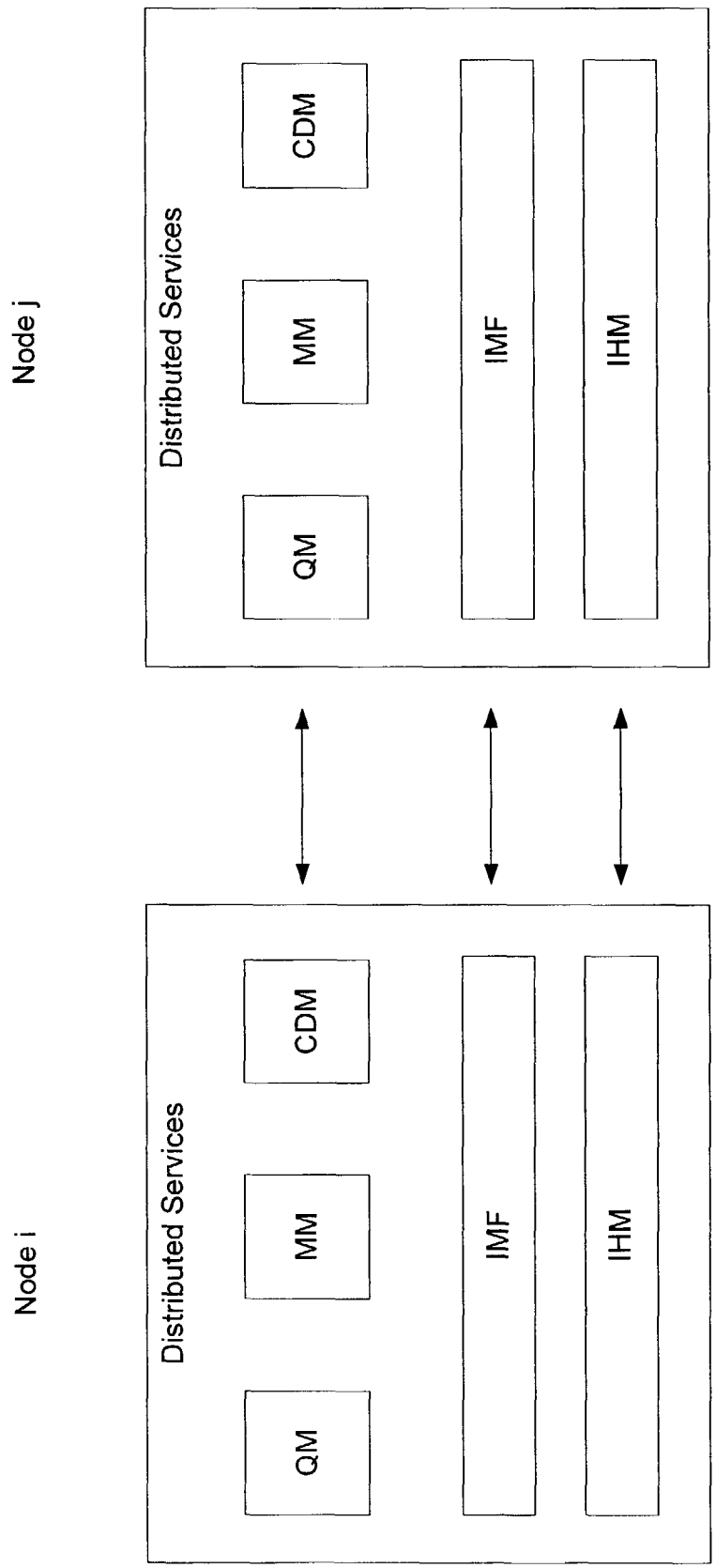
FIG. 14 shows the relevant components of the distributed services/high availability subsystem.

FIG. 14 shows the relevant components of the DS/HA module. The DS/HA module includes the following modules:

Interconnect Hardware Module (IHM): implements the basic datagram mechanism with both unreliable and reliable, in-order message delivery. Any missing semantics, if any, will be implemented in the IMF layer (see below).

Inter-node Messaging Facility (IMF) Module: provides (a) reliable messaging delivery and (b) node heartbeating. It is the lower level component that supports cluster membership.

Quorum Module (QM): provides the cluster quorum mechanism, as well as the cluster join/leave mechanisms. The actual cluster membership information is kept within the IMF.

Messaging Module (MM): provides unicast/multicast, synchronous/asynchronous messaging primitives and event registration and handling for clustering and for other modules. In case the IHM supports reliable unicast messaging, the corresponding MM and IMF functionality is a simple stub or macro.

Configuration Database Module (CDM): provides a replicated, always-on configuration database. Updates made on any node will be automatically replicated on all other nodes using a two-phase-commit mechanism on top of the MM.

As can be seen, there is a layered relationship between the various components of the DS/HA module. In order to support high availability objectives, the components needed for high availability support must be active on each node.

3.1.9.1 Heartbeating

The heartbeating mechanism is responsible for determining whether a given node is dead or alive. In an exemplary embodiment of the present invention, the heartbeating mechanism is part of the IMF module (instead of, for example, the QM module) for the following reasons:

1. In case of a heartbeat timeout, the node is declared dead (upon consulting with the CM module to make sure that the node does not belong to the "wrong" partition), and the IMF module flushes (with an error status) all pending messages for the node. This avoids discrepancies between the CM module and the IMF module.

2. The heartbeating mechanism implements the low-level keep-alive logic that detects node heartbeat timeouts, and is relatively independent of the rest of the cluster algorithms. The QM module actually determines whether the node is still part of the cluster quorum (i.e., the node does not belong to the "wrong" partition). Its workings are tightly connected with the specific cluster implementation. Therefore, it makes sense to keep the two modules separate. A similar approach is used by VAXClusters [Davis 1993].

3.1.9.2 Failure Recovery

Supporting HA and recovery from individual node failures lies in associating storage resources (volumes) to "virtual nodes" (VN) that act as their owners. Each VN has a virtual name and a virtual IP address and is associated with a physical node (PN). When the HA subsystem detects the failure of a PN, the HA subsystem typically shuts down the PN (unless it is already dead), and moves (binds) the VNs associated with the failed PN to other available PNs. This transition will be automatic, yet the failure will not be completely transparent to the applications. In other words, the applications may time-out, as recovery is in progress, and this will be visible to the applications. However, the applications will continue to access the storage they were accessing through the same virtual name and same virtual address, and this pair will be transparently associated to another physical node.

Failback consists of restoring the VNs to the PNs that were supporting them before a fault occurred. It will be possible to cause both automatic and manual failback. This is important to bring back online the repaired nodes and to distribute the functionality among all the running nodes. Note that, since even the automatic failback will cause hiccups that may be detected within the client applications, it is expected that manual failback will be the typical choice, since this will allow activity to quiet down before the failback is performed, thus preventing any form of disruption in the applications.

A cluster with two or more nodes is always redundant. Therefore, a spare unit can be provided to avoid performance degradation, if one unit fails. However it need not be provided just to enhance the availability of the whole cluster.

This structure will lend itself to supporting:
Full-fledge cluster configurations with high redundancy.
Lower-end cluster configurations with limited nodes.
Simple low-end active/active fail-over configurations, in which each node can take over the management of volumes previously managed by failed nodes. However, such configurations may elect to export independent unaggregated volumes directly.

3.2 Summarizing

The architecture described so far is primarily aimed at providing scalable performance by serving requests in parallel on multiple cluster nodes. In addition it will enhance availability.

The solution mainly rests on the idea of divorcing pathnames from physical file allocation, by using SLs, so that the maximum parallelism can be achieved without the cost of complex distributed locking schemes, even for multi-volume operations.

The architecture supports file system integrity that is strict within individual volumes and somewhat looser across volumes. However, the latter never causes inconsistent views, nor data corruption and at most has the effect of delaying the deletion of unreferenced FSOs or dangling SLs.

Future developments, after phase I of the project may target the following:
- The automatic relocation of files based on usage statistics. This can improve file locality taking advantage of measured usage patterns.
- Cluster merging. Methods should exist to coalesce independent clusters into one.
- Various optimizations, based on performance evaluation and the identification of bottlenecks.

4 Implementational Issues

This section addresses various implementational issues.

4.1 Intra-Cluster Interconnect

In order for the cluster members to communicate efficiently, a fast, private communications channel is preferably used to interconnect the cluster nodes. A private (i.e., only available to the cluster nodes and not to the cluster clients) channel streamlines the communication protocols by removing the need to authenticate and check the permissions for the parties involved in any cluster transaction.

Within a cluster, there will be two logically separate intra-cluster links. The first is between FSMs, and the second is between SIMs. There will be two physical interconnects from each cluster node. The mapping of the logical links onto the physical interconnects will depend on interconnect availability and interconnect loading.

Within the cluster, two interconnect switches may be used to interconnect the cluster nodes. Each of the two interconnects from each cluster node will connect to a different interconnect switch. This provides some redundancy of the switches and links.

Each cluster node will have an intra-cluster control block. The intra-cluster control block will typically be implemented on either the FSM or the SIM. The intra-cluster control block will contain an FSM logical link interface, a SIM logical link interface, and two inter-cluster interconnects referred to as inter-cluster interconnect 0 and inter-cluster interconnect 1. The mapping of logical links onto physical interconnects will be implemented dynamically. Some degree of load balancing will thus be provided as well as the required interconnect redundancy.

The link between FSMs will carry messages and data to support such functions as WFS request mirroring (to implement the stable storage solution), metadata cache management (coherency, lock requests and replies, etc.), redirection of write requests to the volume owner, and general cluster management.

The link between SIMs will carry messages and data to support functions for sector data cache management (coherency, lock requests and replies, etc.) including transfer of file data.

4.2 Client Binding

Performance may be improved by making sure that files are always written through specific cluster nodes.

Ideally, this would be done by only opening files for writing through the cluster node that "owns" the volume in which they reside. This is not trivial. The difficulty is in the need to process all of the request packets, so that when a specific file pathname is detected, the request is forwarded to the appropriate cluster node. This could be achieved through a close integration between a non-standard switch and the cluster nodes.

An alternate (less optimal) solution (referred to as the "cluster node affinity" criterion) provides essentially the same benefits by partitioning clients among the cluster nodes so that a given client would always use the same node as its cluster server. The reason why this solution provides essentially the same benefits is that a given client tends to access the same files over and over (i.e., locality of reference).

Clients can be partitioned among the cluster nodes in various ways:
- Through a client-based assignment of cluster nodes.
- Through a hardware-based solution that puts a switch acting as a cluster front-end in charge of providing the appropriate client partitioning.
- Through the appropriate setup of a DNS server.
- Through ad hoc software implemented in the cluster nodes. Some constraints to be met in binding clients to individual cluster nodes are as follows:

1. The solution must partition clients among the cluster nodes so that a given client would always use the same node as its cluster server.
2. The solution must allow the interconnection of clients to servers at wire speed.
3. Purely static binding of clients to physical cluster nodes is not satisfactory, as it does not allow for node failures and subsequent automatic reconfigurations of the cluster, to insure uninterrupted availability. Thus, the solution should be flexible enough to take into account node failures.
4. The ability to insure the binding of clients to cluster nodes, apart from failures, must be such that this will occur consistently over extended periods of time. For example, client-server binding limited to hours or days will not be sufficient to provide a deterministic performance boost.
5. Regardless of whether the chosen solution is hardware- or software-based, in order for high availability requirements to be met, the solution must avoid single points of failure.

In addition to these requirements, it would also be desirable to have sets of clients accessing and modifying common sets of files through the cluster node that "owns" the volume in which they reside and would also share the same cluster node.

In order to partition clients among the cluster nodes, a mechanism is required for recognizing the clients that are originating requests. One way to do this is to have access to the MAC (Media Access Control) address of the requesting client. Unfortunately, the MAC address itself does not make it across routing boundaries. On the other hand, the source IP address (which is routed) can be used, although it raises the following issues:

1. In case multiple clients access the cluster through a proxy, for the source IP recognition to work correctly, it would be necessary for all clients that are funneled through a specific proxy to share the same cluster node. Note that, in case proxies are used to aggregate the clients that should access the same node, the existence of the proxy might be advantageous in lumping together clients with very different source IP addresses.
2. In case DHCP (Dynamic Host Configuration Protocol) is in use, it is necessary to partition the IP address space administered by the DHCP server in small segments, so that address segments are assigned on the basis of cluster node affinity. In other words, each segment should include all the clients that need to deal with a specific cluster node because they tend to access a given set of files and directories. Then, whatever the dynamic assignment of IP addresses is, the range can be fully recognized and dealt with appropriately.

It should be noted that these issues can be dealt with through proper configuration.

4.2.1 A Client-Based Solution

This solution is obtained through proper configuration of the network the cluster is in. It is based on the following principles:

- Each cluster node is assigned a physical IP address as well as a virtual IP address and name. The virtual addresses are initially bound to their owner nodes.
- Clients are partitioned across the cluster nodes according to some criterion. For example, clients may be partitioned across the cluster nodes according to the need clients have to share write access to common files or directories. Each such group of clients is given access to one virtual name that identifies the node that will allocate the shared files and directories within a volume it owns.
- When a cluster node fails, because of the VN/PN relationship, a switch-over will be transparent to the clients as explained in section 3.1.9.

Some advantages of a client-based solution include:

- It is simple and straightforward.
- It is inexpensive and causes no impact on the overall system availability, since it does not require additional equipment.
- It inserts no equipment or software between the client and the server node, so it has no potential performance degradation.
- Since no switches or additional routing equipment is used, there are no issues with compatibility or integration with a client network.
- Cluster reconfiguration is transparent (apart from the short interval of time that is necessary to reconfigure the cluster, which is also present in hardware-based solutions).

Some disadvantages of a client-based solution include:

- The network must be aware of multiple virtual node identities, instead of a single one assigned to a switch that hides the clustering nodes behind it.
- The burden of the solution is shifted to configuration issues. However, whereas in a switch-based solution this is handled by configuring the switch itself, here the clients have to properly set up. This burden could be somewhat lowered by providing appropriate administrative utilities that will ease the configuration process.

4.2.2 A Switch-Based Solution

By using a switch, the clients will be able to address the whole cluster through a single name/IP address, and the switch will manage transparent access to the appropriate node.

Major switch manufacturers supply Ethernet switches capable of distributing clients across a pool of servers and of guaranteeing some form of persistence (or "stickiness").

Most switches that address the issue of Server Load Balancing (SLB) allow the ability of hiding a pool of servers behind the switch and of addressing requests to the various servers in order to balance the load.

One way of doing this is to use the source IP address of a client to send the packet to one particular server. This is a fairly static form of balancing in that it does not take into account the actual load of each server. On the other hand, it does guarantee that a given client is always talking to the same server and does make use of whatever existing context may be already active.

Most switches provide much more sophisticated schemes that balance the load dynamically and provide stickiness, so that one packets from a given source are sent to a given server, all subsequent packets within a predefined time interval also go to that server.

Other schemes often used to provide persistent connections are implemented as follows:

- Through the use of "cookies." Cookies are tokens supplied by the server that the browser stores within the client. They provide enough reference information that they allow a switch to infer context and therefore to establish the appropriate binding to a server. This essentially applies to HTTP traffic.
- Through SSL session IDs. This only applies to SSL sessions.
- Through context-dependent packet inspection. This significantly depends on the application protocol in use and is not limited to Web services.

Since each client needs to be connected to a specific cluster node (rather than to just any node that is a member of a pool), these criteria are not particularly relevant. Binding certain source IP addresses to certain cluster nodes would be adequate, although such a solution may not be supported by switches or may be supported by some switches through appropriate configuration.

Most switches with SLB capabilities enable source IP addresses in packets to be filtered and use to route the packets to one of the servers in a pool that is to provide the requested service. This is done through appropriate configuration entries. In order to take advantage of this, the pool should be limited to a single server for each set of client addresses. The binding should occur in terms of virtual IP addresses administered through the cluster HA subsystem. This would allow the HA subsystem to properly reconfigure the cluster in case of node failures and to let that virtual IP address be reused by the node that takes over the functionality of the failed node.

Some advantages of a switch-based solution include:

- The single IP address/name associated with the switch needs to be published. The switch itself will hide the cluster nodes and will route traffic according to the way it is configured.
- Centralized configuration reduces total cost ownership.
- A switch avoids any meaningful changes to the customer's network set-up, and therefore is highly desirable.

Some disadvantages of a switch-based solution include:

- A switch-based solution is generally more expensive than software- or configuration-based solutions.
- In order to satisfy high availability requirements, the switch arrangement must be redundant, which further increases cost.
- Although the features needed are available from various vendors, as discussed below, they are not standard facility, and there is no assurance of their continued availability.
- The choice of switches from one particular vendor may not be acceptable to users that have standardized on different vendors. On the other hand, qualifying switches from multiple vendors requires extra effort and costs. The following discussion provides details on some SLB switches that are capable of satisfying the above-mentioned client binding requirements.

5 Fault Recovery for Multi-Volume Operations

This section describes exemplary fault recovery procedures for some potential node failures (i.e. node crashes) that may occur during multi-volume operations. For each multi-volume operation described in section 3.1.4, and for each fault, a typical recovery action is shown. In the tables below, the "Local Node" is an alias for "Coordinator Node," which means that the local node is the node executing the requested operation (possibly on behalf of another requester).

This section does not include the actions undertaken in the retry cases, i.e., it assumes that the Application Node will not retry the request (this may happen for NFS soft mounts with retry=1, or if the Application Node crashes right after sending the request to the NAS).

The numbers associated with the actions in the tables are the statement numbers from the corresponding pseudocode in section 3.1.4.

An "X" in a fault column indicates that no recovery action is needed.

A row showing no action represents a failure condition between operations.

5.1 Create (Local) FSO within Foreign (Remote) Directory (3.1.4.1)

| Create (local) FSO within Foreign (remote) Directory (3.1.4.1) | | | | |
|---|---|---|---|---|
| Actions | | Faults | | |
| Local | Remote | Local Failure | Remote Failure | Local & Remote Failure |
| 1. CreateFSO | | X | Orphan Local (RD/FSO) Deleted | X |
| | | Orphan Local (RD/FSO) Garbage Collected | Orphan Local (RD/FSO) Deleted | Orphan Local (RD/FSO) Garbage Collected |
| | 5. CreateSL | X | Orphan Local (RD/FSO) Deleted | Orphan Local (RD/FSO) Deleted |
| | | X | X | X |
| | 8. CleanupLUD | X | X | X |

5.2 Create (Local) SL to Existing (Remote) File (3.1.4.2)

| Create (local) SL to Existing (remote) File (3.1.4.2) | | | | |
|---|---|---|---|---|
| Actions | | Faults | | |
| Local | Remote | Local Failure | Remote Failure | Local & Remote Failure |
| | 2. CreateLink | Orphan Remote(RD) Garbage Collected | X | X |
| | | Orphan Remote(RD) Garbage Collected | X | Orphan Remote(RD) Garbage Collected |
| | 6. CreateSL | Orphan Remote(RD) Garbage Collected | X | Orphan Remote(RD) Garbage Collected |
| | | X | X | X |
| | 9. CleanupLUD | X | X | X |

5.3 Rename/Move (Remote) File or Directory from (Remote) Directory to Non-Co-Resident (Local) Directory (3.1.4.3)

| Rename/Move (remote) File or Directory from (remote) Directory to Non-co-resident (local) Directory (3.1.4.3) | | | | |
|---|---|---|---|---|
| Actions | | Faults | | |
| Local | Remote | Local Failure | Remote Failure | Local & Remote Failure |
| | 1. Relocate | Relocate Remote(FSO) Undo | X | X |
| | | Relocate Remote(FSO) Undo | Relocate Remote(FSO) Undo | Relocate Remote(FSO) Undo |
| 5. CreateSL | | Relocate Remote(FSO) Undo | Relocate Remote(FSO) Undo; Dangling Local(SL) Undo | Relocate Remote(FSO) Undo |
| | | Relocate Remote(FSO) Undo | Relocate Remote(FSO) Undo; Dangling Local(SL) Undo | Relocate Remote(FSO) Undo; Dangling Local(SL) Undo |
| | 6. RelocateCompleted | X | Relocate Remote(FSO) Undo; Dangling | Relocate Remote(FSO) Undo; Dangling |

Rename/Move (remote) File or Directory from (remote) Directory to Non-co-resident (local) Directory (3.1.4.3) -continued

| Actions | | Faults | | |
|---|---|---|---|---|
| Local | Remote | Local Failure | Remote Failure | Local & Remote Failure |
|  |  |  | Local(SL) Undo | Local(SL) Undo |
|  |  | X | X | X |
| 11. CleanupLUD |  | X | X | X |

5.4 Rename/Move SL Pointing to Existing File or Directory (3.1.4.4)

This operation has to different cases. CASE I is the case in which the destination volume is also the volume that holds the FSO. CASE II is the case in which destination, source, and FSO volumes are different.

For CASE I, the initial state is shown in FIG. 9, and the final state is shown in FIG. 10. With this in mind, the failure analysis is as follows:

Rename/Move SL Pointing to Existing File or Directory (3.1.4.4) - CASE I

| Actions | | | Faults | | |
|---|---|---|---|---|---|
| Local | Remote | Local Failure | Remote Failure | Local & Remote Failure | |
| 3. Rename |  | X | Dangling Remote (SL) Garbage Collected | X | |
|  |  | Dangling Remote (SL) Garbage Collected | Dangling Remote (SL) Garbage Collected | Dangling Remote (SL) Garbage Collected | |
|  | 5. Delete | X | Dangling Remote (SL) Garbage Collected | Dangling Remote (SL) Garbage Collected | |

For CASE I, the initial state is shown in FIG. 11, and the final state is shown in FIG. 12. With this in mind, the failure analysis is as follows:

Rename/Move SL Pointing to Existing File or Directory (3.1.4.4) - CASE II

| Actions | | |
|---|---|---|
| Local | Remote | Remote2 |
|  | 9. Relocate |  See Failure Matrix "MF_9" See Failure Matrix "MF_9+" |
| 13. CreateSL |  | See Failure Matrix "MF_13" See Failure Matrix "MF_13+" |
|  | 14. RelocateCompleted | See Failure Matrix "MF_14" See Failure Matrix "MF_14+" |

-continued

Rename/Move SL Pointing to Existing File or Directory (3.1.4.4) - CASE II

| Actions | | |
|---|---|---|
| Local | Remote | Remote2 |
| 19. CleanupLUD |  | See Failure Matrix "MF_19" See Failure Matrix "MF_19+" |
|  | 22. Delete | See Failure Matrix "MF_22" |

Failure Matrix "MF_9"
(Failure events occurring during statement 9)

| Failure Map | | | Recovery Actions | | |
|---|---|---|---|---|---|
| Local | Remote | Remote2 | Local | Remote | Remote2 |
| X |  |  | X | Relocate Remote(RD/FSO) Undo | X |
|  | X |  | X | X | X |
|  |  | X | X | X | X |
| X | X |  | X | X | X |
|  | X | X | X | X | X |
| X |  | X | X | Relocate Remote(RD/FSO) Undo | X |
| X | X | X | X | X | X |

Failure Matrix "MF_9+"
(Failure events occurring during statement 9+)

| Failure Map | | | Recovery Actions | | |
|---|---|---|---|---|---|
| Local | Remote | Remote2 | Local | Remote | Remote2 |
| X |  |  | X | Relocate Remote(RD/FSO) Undo | X |
|  | X |  | X | Relocate Remote(RD/FSO) Undo | X |
|  |  | X | X | X | X |
| X | X |  | X | Relocate Remote(RD/FSO) Undo | X |
|  | X | X | X | Relocate Remote(RD/FSO) Undo | X |
| X |  | X | X | Relocate Remote(RD/FSO) | X |

Failure Matrix "MF_9+"
(Failure events occurring during statement 9+)

| Failure Map | | | Recovery Actions | | |
|---|---|---|---|---|---|
| Local | Remote | Remote2 | Local | Remote | Remote2 |
| X | X | X | X | Undo Relocate Remote(RD/FSO) Undo | X |

Failure Matrix "MF_13"
(Failure events occurring during statement 13)

| Failure Map | | | Recovery Actions | | |
|---|---|---|---|---|---|
| Local | Remote | Remote2 | Local | Remote | Remote2 |
| X | | | X | Relocate Remote(RD/FSO) Undo | X |
| | X | | Dangling Local(SL) Undo | Relocate Remote(RD/FSO) Undo | X |
| | | X | X | X | X |
| X | X | | X | Relocate Remote(RD/FSO) Undo | X |
| | X | X | Dangling Local(SL) Undo | Relocate Remote(RD/FSO) Undo | X |
| X | | X | X | Relocate Remote(RD/FSO) Undo | X |
| X | X | X | X | Relocate Remote(RD/FSO) Undo | X |

Failure Matrix "MF_13+" (Failure events occurring during statement 13+)

| Failure Map | | | Recovery Actions | | |
|---|---|---|---|---|---|
| Local | Remote | Remote2 | Local | Remote | Remote2 |
| X | | | Dangling Local(SL) Undo | Relocate Remote(RD/FSO) Undo | X |
| | X | | Dangling Local(SL) Undo | Relocate Remote(RD/FSO) Undo | X |
| | | X | X | X | X |
| X | X | | Dangling Local(SL) Undo | Relocate Remote(RD/FSO) Undo | X |
| | X | X | Dangling Local(SL) Undo | Relocate Remote(RD/FSO) Undo | X |
| X | | X | Dangling Local(SL) Undo | Relocate Remote(RD/FSO) Undo | X |
| X | X | X | Dangling Local(SL) Undo | Relocate Remote(RD/FSO) Undo | X |

Failure Matrix "MF_14" (Failure events occurring during statement 14)

| Failure Map | | | Recovery Actions | | |
|---|---|---|---|---|---|
| Local | Remote | Remote2 | Local | Remote | Remote2 |
| X | | | Cleanup Local LUD | X | Dangling Remote2(SL) Delete |
| | X | | Dangling Local(SL) Delete | Relocate Remote(RD/FSO) Undo | X |
| | | X | X | X | Dangling Remote2(SL) Delete |
| X | X | | Dangling Local(SL) Cleanup LUD | Relocate Remote(RD/FSO) Undo | X |
| | X | X | Dangling Local(SL) Delete | Relocate Remote(RD/FSO) Undo | X |
| X | | X | Cleanup Local LUD | X | Dangling Remote2(SL) Delete |
| X | X | X | Dangling Local(SL) Clean-upLUD | Relocate Remote(RD/FSO) Undo | X |

Failure Matrix "MF_14+" (Failure events occurring during statement 14+)

| Failure Map | | | Recovery Actions | | |
|---|---|---|---|---|---|
| Local | Remote | Remote2 | Local | Remote | Remote2 |
| X | | | Clean-up Local LUD | X | Dangling Remote2(SL) Delete |
| | X | | X | X | X |
| | | X | X | X | Dangling Remote2(SL) Delete |
| X | X | | Clean-up Local LUD | X | Dangling Remote2(SL) Delete |
| | X | X | X | X | Dangling Remote2(SL) Delete |
| X | | X | Clean-up Local LUD | X | Dangling Remote2(SL) Delete |
| X | X | X | Clean-up Local LUD | X | Dangling Remote2(SL) Delete |

Failure Matrix "MF_19" (Failure events occurring during statement 19)

| Failure Map | | | Recovery Actions | | |
|---|---|---|---|---|---|
| Local | Remote | Remote2 | Local | Remote | Remote2 |
| X | | | Cleanup Local LUD | X | Dangling Remote2(SL) Delete |
| | X | | X | X | X |
| | | X | X | X | Dangling Remote2(SL) Delete |
| X | X | | Cleanup Local LUD | X | Dangling Remote2(SL) Delete |
| | X | X | X | X | Dangling Remote2(SL) Delete |
| X | | X | Cleanup | X | Dangling |

Failure Matrix "MF_19" (Failure events occurring during statement 19)

| Failure Map | | | Recovery Actions | | |
|---|---|---|---|---|---|
| Local | Remote | Remote2 | Local | Remote | Remote2 |
|  |  |  | Local |  | Remote2(SL) |
|  |  |  | LUD |  | Delete |
| X | X | X | Cleanup | X | Dangling |
|  |  |  | Local |  | Remote2(SL) |
|  |  |  | LUD |  | Delete |

Failure Matrix "MF_19+" (Failure events occurring during statement 19+)

| Failure Map | | | Recovery Actions | | |
|---|---|---|---|---|---|
| Local | Remote | Remote2 | Local | Remote | Remote2 |
| X |  |  | X | X | Dangling Remote2(SL) Delete |
|  | X |  | X | X | X |
|  |  | X | X | X | Dangling Remote2(SL) Delete |
| X | X |  | X | X | Dangling Remote2(SL) Delete |
|  | X | X | X | X | Dangling Remote2(SL) Delete |
| X |  | X | X | X | Dangling Remote2(SL) Delete |
| X | X | X | X | X | Dangling Remote2(SL) Delete |

Failure Matrix "MF_22" (Failure events occurring during statement 22)

| Failure Map | | | Recovery Actions | | |
|---|---|---|---|---|---|
| Local | Remote | Remote2 | Local | Remote | Remote2 |
| X |  |  | X | X | X |
|  | X |  | X | X | X |
|  |  | X | X | X | Dangling Remote2(SL) Delete |
| X | X |  | X | X | X |
|  | X | X | X | X | Dangling Remote2(SL) Delete |
| X |  | X | X | X | Dangling Remote2(SL) Delete |
| X | X | X | X | X | Dangling Remote2(SL) Delete |

5.5 Remove SL to File or Directory (3.1.4.5)

Remove SL to File or Directory (3.1.4.5)

| Actions | | Faults | | |
|---|---|---|---|---|
| Local | Remote | Local Failure | Remote Failure | Local & Remote Failure |
| 3. Delete |  | X | Orphan Remote(RD/FSO) Garbage Collected | X |
|  | 4. Delete | Orphan Remote(RD/FSO) Garbage Collected X | Orphan Remote(RD/FSO) Garbage Collected Orphan Remote(RD/FSO) Garbage Collected | Orphan Remote(RD/FSO) Garbage Collected Orphan Remote(RD/FSO) Garbage Collected |

6.0 Miscellany

Although various embodiments of the present invention are described above with reference to specific hardware-based file system platforms including various modules such as a FSM, a SIM, and a NIM, the present invention is in no way limited to the described embodiments or platforms, and it will be apparent to a skilled artisan that the present invention can be embodied differently and applied more generally to other file system platforms.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the logic for managing file system objects across multiple volumes is implemented as a set of computer program instructions that is converted into a computer executable form, stored as such in a computer readable medium, and executed by a microprocessor within the cluster node under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. A method for using a plurality of cluster nodes, each of which has access to a plurality of logical storage volumes, to provide access by clients, in communication with the nodes, to data on the volumes, wherein each volume is restricted to be owned by a single node, wherein only the owner of a volume has permission to write to the volume, the method comprising:

storing, by a first node, a file system object in a first volume owned by the first node; and creating, in the first node and in a second node, a logical link between the first volume and a second volume owned by the second node, said logical link referring to the file system object in the first volume, wherein the process of creating a logical link between the first volume and second volume includes creating a logical identifier in a directory of the second volume that symbolically identifies the file system object which is referenced by the logical link and creating in a relocation directory of the first volume a hard link to the file system object and creating in the first volume a unique association between the hard link and the logical identifier from the second volume with respect to the file system object, wherein the logical link is represented by the hard link, the logical identifier, and the unique association between the hard link and the logical identifier forms; and wherein the hard link increases a reference count associated with the file system object in the first volume independent of the disposition of the logical identifier in the second volume such that the first volume is self-contained while allowing the file system object to be accessed symbolically from the second volume using the logical identifier without a physical cross-volume link;

a physical namespace invisible to the clients of the plurality of nodes, the physical namespace implemented through the plurality of volumes, each volume having an internal hierarchy that connects file system objects through hard links including the hard link in the relocation directory of the first volume; and a logical namespace visible to the clients of the plurality of nodes that spans the entire file system across volumes and is made of file system objects connected via hard links and logical links such that the difference between hard links and logical links is hidden from the clients.

2. The method according to claim 1, further comprising:
storing the logical identifier in the relocation directory, in the first volume, that lists logical identifiers for all file system objects in the first volume that are logically referenced from volumes other than the first volume.

3. The method according to claim 1, wherein storage of the file system object and creation of the logical link are performed while placing a write-lock on no more than one volume at a time, so that multi-volume locking is avoided.

4. The method according to claim 3, wherein the first node assumes the role of write-lock manager for the first and second volumes in the course of storing the file system object and creating the logical link.

5. The method according to claim 2, wherein the relocation directory has a hierarchical structure.

6. The method according to claim 1, wherein creating the logical link includes assigning an identifier that is unique, at least in the first volume, as the logical identifier.

7. The method according to claim 6, wherein assigning a unique identifier includes assigning a number that is based on the count of previously assigned logical identifiers for file system objects in the first volume.

8. The method according to claim 1, further comprising:
permitting reads to a given storage volume to be made by any of the nodes.

9. The method according to claim 8, wherein a volume cache is associated with each of the volumes, and a node cache is associated with each of the nodes, the method further comprising:
handling a request, to read a sector in a selected volume, that has been received by an operative node that owns a volume distinct from the selected volume by causing the operative node to issue a first read request, for the sector, with a read-only lock to the node that is the owner of the selected volume and a second read request, for the sector, to the selected volume;

having the node that is the owner of the selected volume determine whether the sector is in the node cache associated with the node and if not, granting the read-only lock and letting the selected volume satisfy the request;

if so, and if the sector is not write-locked, granting the read-only lock and sending the sector content from cache, of the node owning the selected volume, to the operative node and aborting the communication of the selected volume with respect to the request;

if so, and if the sector is write-locked, stalling affirmative action on the request until the read-only lock can be granted and then resuming processing as for when the sector is not write-locked.

10. The method according to claim 9, wherein granting the read-only lock includes recording the identity of the operative node and of the sector, so that caching states may be tracked.

11. The method according to claim 2, further comprising:
storing in the directory of the second volume a logical reference to the logical identifier stored in the relocation directory in the first volume.

12. The method according to claim 11, wherein the logical reference comprises:
the logical identifier; and
a numeric value that encodes a numeric string representing a name of the referenced file system object in the relocation directory of the first volume.

13. The method according to claim 11, further comprising:
restricting the logical reference to be the one and only logical reference to the logical identifier stored in the relocation directory in the first volume.

14. The method according to claim 4, wherein the first node assumes the role of write-lock manager for the first and second volumes in a semi-static fashion from the time the first node joins the plurality of cluster nodes until the first node leaves the plurality of cluster nodes.

15. The method according to claim 11, further comprising:
deleting the logical reference from the second volume; and
deleting the logical identifier from the relocation directory of the first volume.

16. The method according to claim 11, further comprising:
deleting the file system object from the first volume; and
deleting the logical reference from the second volume.

17. The method according to claim 11, further comprising:
determining that the logical reference references a non-existent file system object; and
deleting the logical reference from the second volume.

18. The method according to claim 17, wherein determining that the logical reference references a non-existent file system object comprises:
running a scavenger process in the second, the scavenger process examining the logical reference from time to time to determine whether the file system object it references exists.

19. The method according to claim 11, further comprising:
determining that the file system object in the first volume is no longer referenced by any logical references in the other volumes; and
deleting the file system object from the first volume.

20. The method according to claim 19, wherein determining that the file system object in the first volume is no longer referenced by any logical references in the other volumes comprises:
running a scavenger process in the first node, the scavenger process examining the relocation directory from time to time to determine whether the file system object is referenced by at least one logical reference in another volume.

21. The method according to claim 11, further comprising:
mapping a "..." directory entry in the first volume to the directory containing the logical reference in the second volume.

22. The method according to claim 21, wherein mapping the "..." directory entry in the first volume to the directory containing the logical reference in the second volume comprises:
storing in the relocation directory of the first volume a reference to the directory containing the logical reference in the second volume.

23. The method according to claim 22, wherein the reference to the directory containing the logical reference in the second volume comprises:
a volume identifier associated with the second volume; and
a node identifier associated with the directory containing the logical reference in the second volume.

24. The method according to claim 22, wherein the reference to the directory containing the logical reference in the second volume comprises:
a variable-length pathname to the directory containing the logical reference in the second volume.

25. The method according to claim 21, wherein mapping the "..." directory entry in the first volume to the directory containing the logical reference in the second volume comprises:
storing in the first volume a separate file containing a reference to the directory containing the logical reference in the second volume.

26. The method according to claim 11, further comprising:
logically relocating the file system object from the first volume to a third volume owned by a third node by deleting the logical identifier from the relocation directory of the first volume;
storing a new logical identifier in the relocation directory of the first volume; and
storing in a directory of the third volume a new logical reference to the new logical identifier stored in the relocation directory in the first volume.

27. The method according to claim 26, further comprising:
deleting the logical reference from the directory of the second volume.

28. The method according to claim 11, further comprising:
referencing the file system object by a third volume by storing a new logical identifier in the relocation directory of the first volume; and
storing in a directory of the third volume a new logical reference to the new logical identifier stored in the relocation directory in the first volume.

29. The method according to claim 1, further comprising:
receiving by the second node a request to write to the file system object;
forwarding the request by the second node to the first node; and
writing to the file system object by the first node.

30. The method according to claim 1, further comprising:
receiving by the first node a request to write to the file system object; and
writing to the file system object by the first node.

31. The method according to claim 1, further comprising:
modifying the file system object by a third node by causing the third node to store a modified file system object in a third volume owned by the third node; and creating a logical link between the second volume and the third volume, such logical link providing in the second volume a logical identifier for accessing the file system object in the third volume.

32. The method according to claim 1, wherein creating the logical link between the first volume and the second volume comprises:
sending by the first node to the second node a request to create the logical link; and
creating the logical link by the second node upon receiving the request.

33. The method according to claim 1, wherein storing the file system object in the first volume comprises:
receiving by the first node a request to create the file system object in the second node.

34. The method according to claim 1, wherein storing the file system object in the first volume comprises:
receiving by the second node a request to create the file system object in the second node; and
determining by the second node that the file system object should be created in the first node.

35. The method according to claim 1, wherein each volume is associated with a unique volume identifier, and wherein the method further comprises:
causing the second node to create a file handle for the file system object, the file handle including the volume identifier associated with the first volume.

36. The method according to claim 1, further comprising:
receiving a request to delete the file system object by a node other than the second node; and
directing the request to the second node; and
deleting the file system object by the second node.

37. The method according to claim 1, further comprising:
receiving a request to delete the file system object by the second node;
causing the logical link to be removed from the second node;
sending by the second node to the first node a request to delete the file system object; and
deleting the file system object by the first node.

38. The method according to claim 1, wherein the file system object comprises one of:
a file; and
a directory.

39. The method according to claim 26, wherein said logically relocating the file system object from the first volume to a third volume owned by a third node is performed automatically under predetermined conditions.

40. The method according to claim 11, further comprising:
relocating the file system object from the first volume to a third volume owned by a third node by
causing the file system object to be copied from the first volume to the third volume;
removing the logical identifier from the relocation directory of the first volume;
removing from the second volume the logical reference to the logical identifier stored in the relocation directory of the first volume;
creating a new logical link between the second volume and the third volume, such new logical link providing in the second volume a new logical identifier for accessing the file system object in the third volume; and
deleting the file system object from the first volume.

41. The method according to claim 40, further comprising:
storing the new logical identifier in a relocation directory of the third volume.

42. The method according to claim 41, further comprising:
storing in the directory of the second volume a new logical reference to the new logical identifier stored in the relocation directory in the third volume.

43. The method according to claim 40, wherein causing the file system object to be copied from the first volume to the third volume comprises:
copying the file system object from the first volume to the third volume using a lazy copy technique.

44. The method according to claim 11, further comprising:
relocating the file system object from the first volume to the second volume by causing the file system object to be copied from the first volume to the second volume;
removing the logical identifier from the relocation directory of the first volume; and
removing from the second volume the logical reference to the logical identifier stored in the relocation directory of the first volume.

45. The method according to claim 1, further comprising:
maintaining a copy of data relating to the file system object by at least one node other than the first node;
modifying the data relating to the file system object by the first node; and
causing the at least one other node to invalidate the data relating to the file system object.

46. The method according to claim 45, further comprising:
causing the at least one other node to reacquire the data relating to the file system object from the first volume.

47. The method according to claim 45, wherein causing the at least one other node to invalidate the copy of the portion of the file system object comprises:
maintaining by the first node a list of other nodes having a copy of data relating to the file system object; and
sending to each other node an indication that the data relating to the file system object was modified.

48. The method according to claim 45, wherein the data relating to the file system object comprises metadata, and wherein maintaining the copy of data relating to the file system object by at least one node other than the first node comprises:
maintaining, by the at least one other node, a metadata cache for storing the metadata, the metadata cache operating independently of any other cache used for storing a copy of file system object data.

49. The method according to claim 48, wherein maintaining the copy of data relating to the file system object by at least one node other than the first node further comprises:
requiring the at least one other node to obtain a read lock from the first node before reading metadata relating to the file system object from the first node.

50. The method according to claim 45, wherein the data relating to the file system object comprises file system object data and metadata, and wherein maintaining the copy of data relating to the file system object by at least one node other than the first node comprises:
maintaining a data cache for storing file system object data;
maintaining a metadata cache for storing metadata; and
mapping each datum in the data cache to corresponding metadata in the metadata cache.

51. The method according to claim 26, wherein the file system object is associated with a first name in the first volume, and wherein logically relocating the file system object from the first volume to the third volume further comprises:
associating the file system object with a second name in the third volume.

52. The method according to claim 1, further comprising:
designating one node as a coordinator for a multi-volume operation affecting the file system object, said coordinator being the owner of one of the volumes involved in the multi-volume operation.

53. The method according to claim 1, further comprising:
maintaining for each volume a local directory for temporarily storing references to file system objects and logical links that have been removed from a volume and replaced with a logical link to the file system object or with another logical link; and
using a local directory to recover from a failure during a multi-volume operation that affects the corresponding volume.

\* \* \* \* \*

UNITED STATES PATENT AND TRADEMARK OFFICE
CERTIFICATE OF CORRECTION

| | | |
|---|---|---|
| PATENT NO. | : 8,041,735 B1 | |
| APPLICATION NO. | : 10/286153 | |
| DATED | : October 18, 2011 | |
| INVENTOR(S) | : Francesco Lacapra et al. | |

It is certified that error appears in the above-identified patent and that said Letters Patent is hereby corrected as shown below:

In Col. 61, line 53, claim 18
replace "second"
with -- second node --

In Col. 62, line 5, claim 21
replace "..."
with -- .. --

In Col. 62, line 9, claim 22
replace "..."
with -- .. --

In Col. 62, line 28, claim 25
replace "..."
with -- .. --

Signed and Sealed this
Third Day of July, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 8,041,735 B1 |
| APPLICATION NO. | : 10/286153 |
| DATED | : October 18, 2011 |
| INVENTOR(S) | : Francesco Lacapra et al. |

It is certified that error appears in the above-identified patent and that said Letters Patent is hereby corrected as shown below:

On title page, item 56 References Cited,
insert --6,044,367  3/2000  Wolff ..... 707/704--

In Col. 59, line 54 cancel the text beginning with "1. A method for using" to and ending "hidden from the clients." in column 60, line 31, and insert the following claim:

1. A method for using a plurality of cluster nodes, each of which has access to a plurality of logical storage volumes, to provide access by clients, in communication with the nodes, to data on the volumes, wherein each volume is restricted to be owned by a single node, wherein only the owner of a volume has permission to write to the volume, the method comprising:
   storing, by a first node, a file system object in a first volume owned by the first node; and
   creating, in the first node and in a second node, a logical link between the first volume and a second volume owned by the second node, said logical link referring to the file system object in the first volume, wherein the process of creating a logical link between the first volume and second volume includes creating a logical identifier in a directory of the second volume that symbolically identifies the file system object which is referenced by the logical link and creating in a relocation directory of the first volume a hard link to the file system object and creating in the first volume a unique association between the hard link and the logical identifier from the second volume with respect to the file system object, wherein the hard link increases a reference count associated with the file system object in the first volume independent of the disposition of the logical identifier in the second volume such that the first volume is self-contained while allowing the file system object to be accessed symbolically from the second volume using the logical identifier without a physical cross-volume link, and wherein the logical link represented by the hard link, the logical identifier, and the unique association between the hard link and the logical identifier forms:
   a physical namespace invisible to the clients of the plurality of nodes, the physical namespace implemented through the plurality of volumes, each volume having an internal hierarchy that connects file system objects through hard links including the hard link in the relocation directory of the first Signed and Sealed this
Thirteenth Day of November, 2012

David J. Kappos
*Director of the United States Patent and Trademark Office* volume; and a logical namespace visible to the clients of the plurality of nodes that spans the entire file system across volumes and is made of file system objects connected via hard links and logical links such that the difference between hard links and logical links is hidden from the clients.